Dec. 9, 1941.  G. P. BENES  2,265,222
MACHINE FOR PREPARING CONTROL DEVICES
Filed July 31, 1940  29 Sheets-Sheet 1
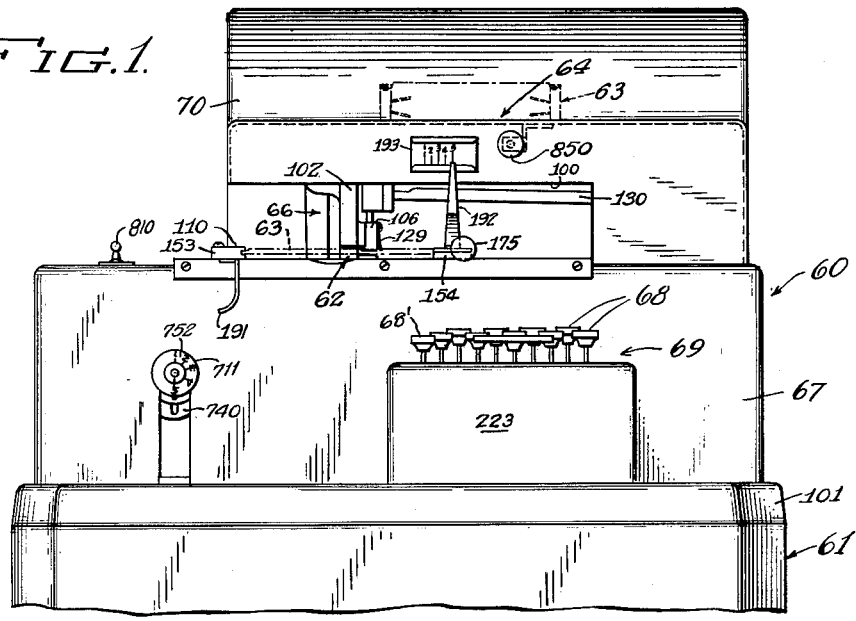
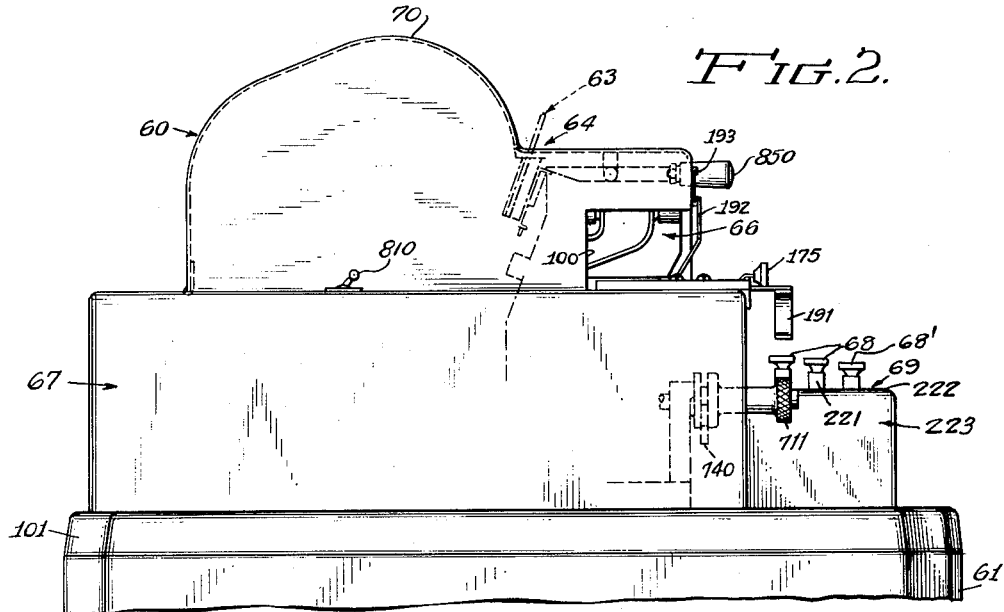
Inventor
Gaspar P. Benes
By Wallace and Cannon
Attys

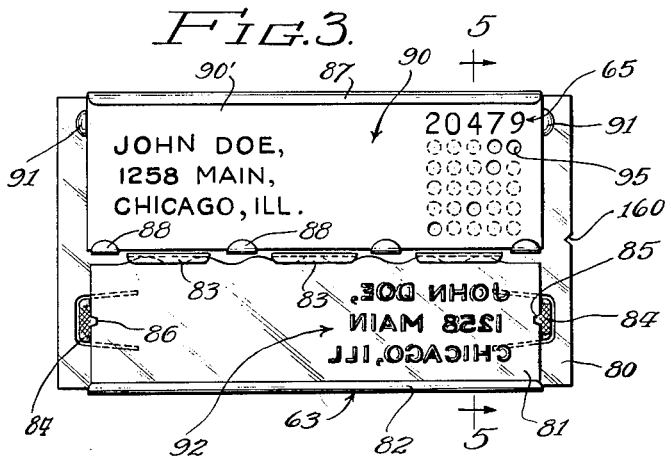
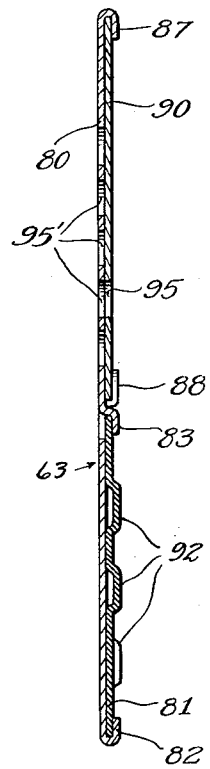
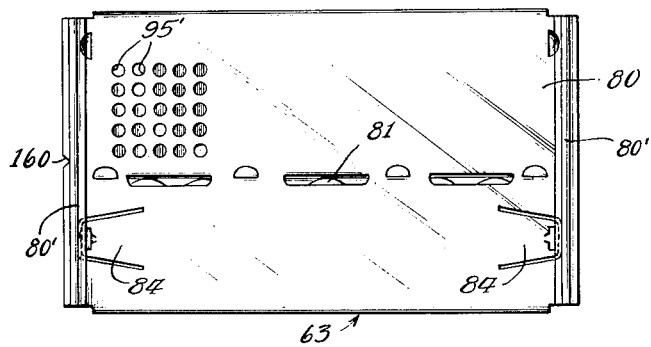

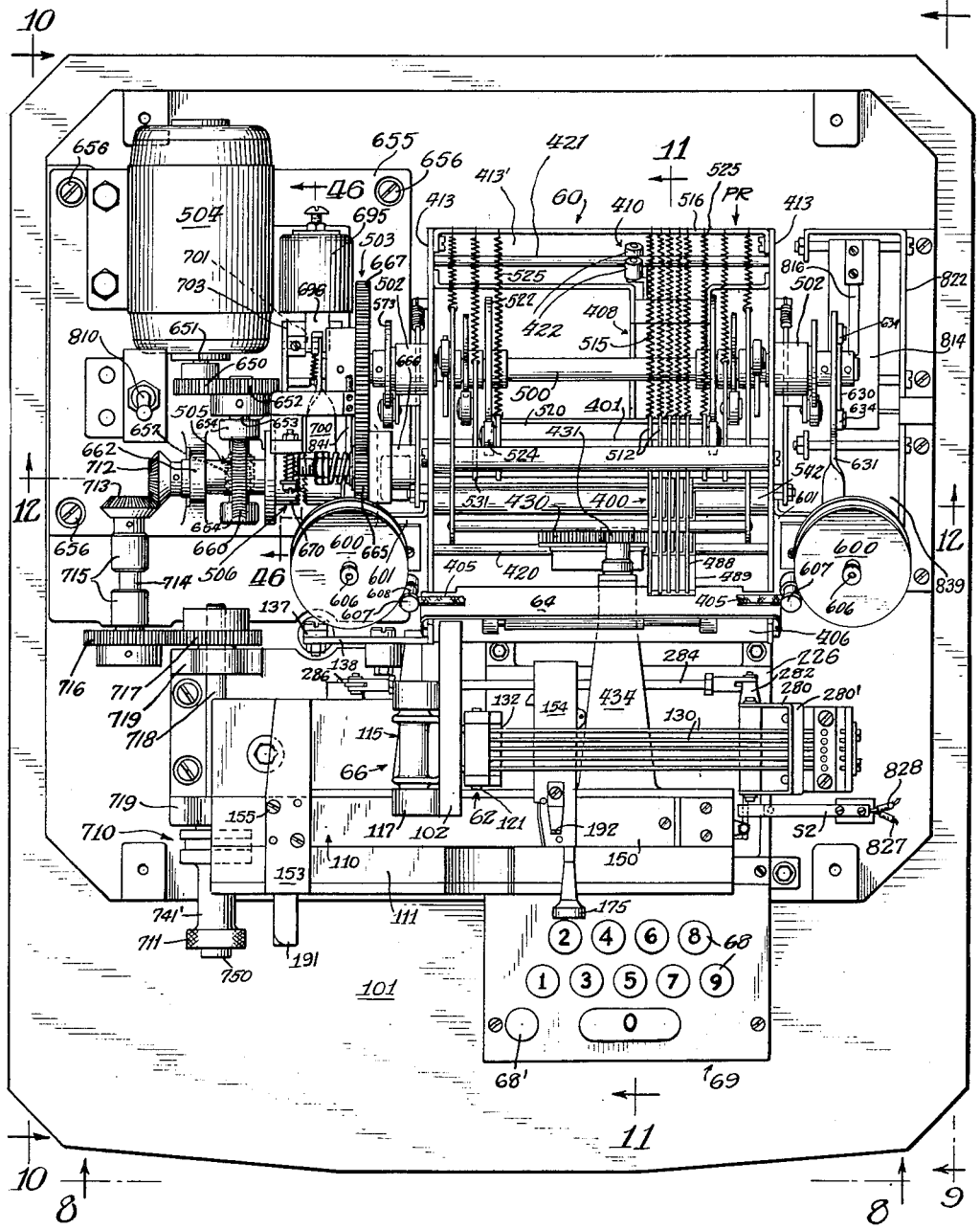

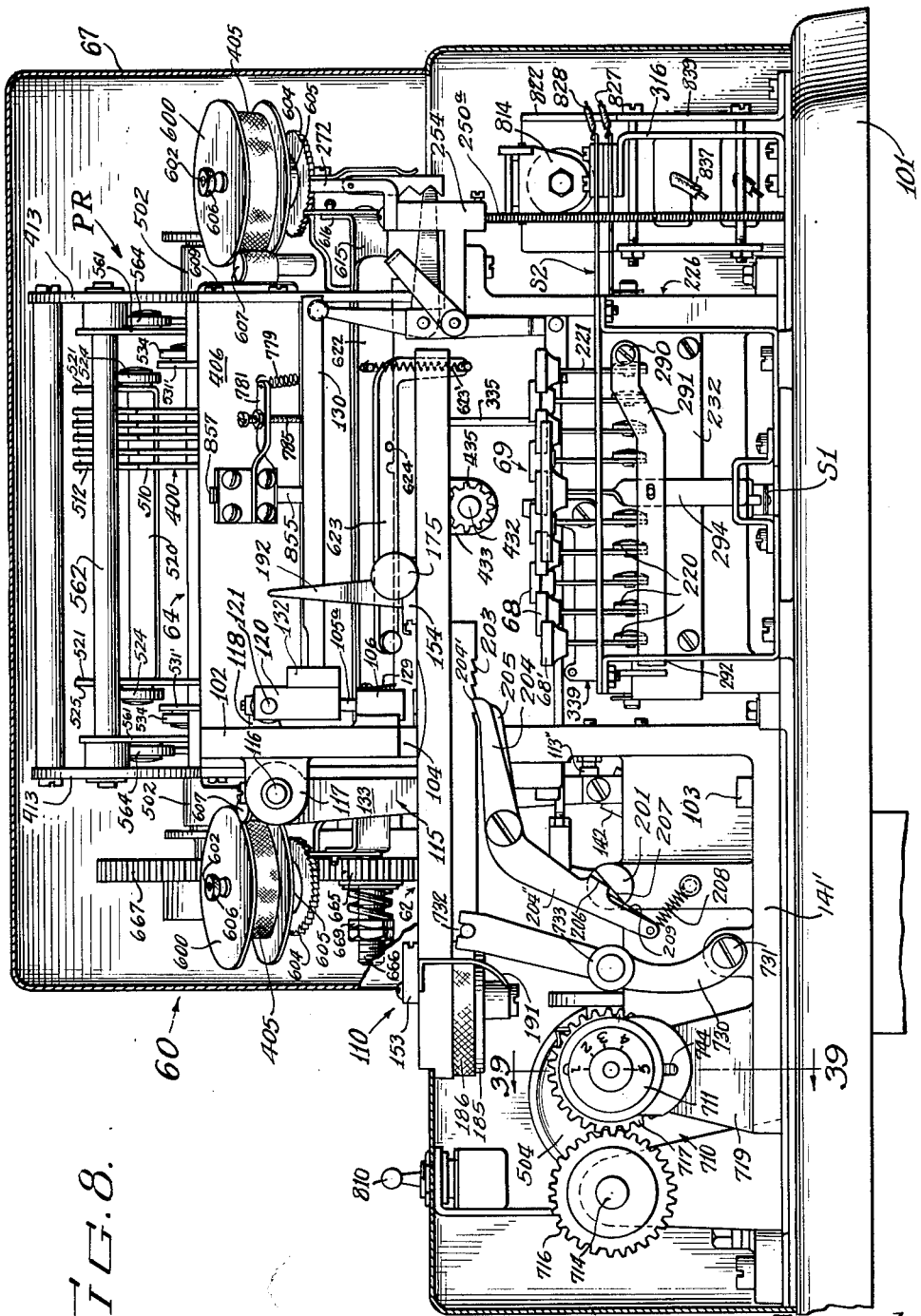

Dec. 9, 1941.　　　　G. P. BENES　　　　2,265,222
MACHINE FOR PREPARING CONTROL DEVICES
Filed July 31, 1940　　　29 Sheets-Sheet 5
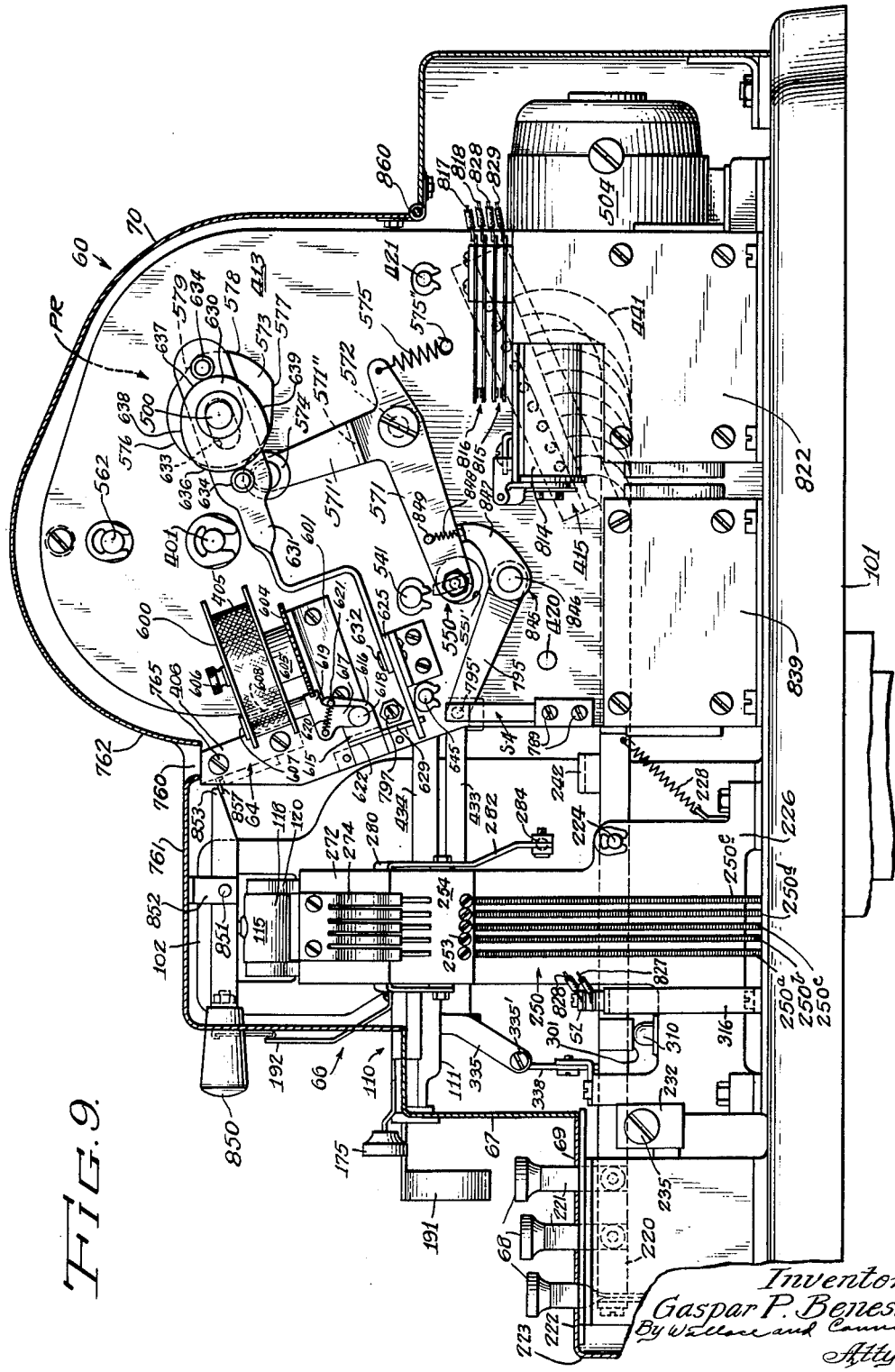

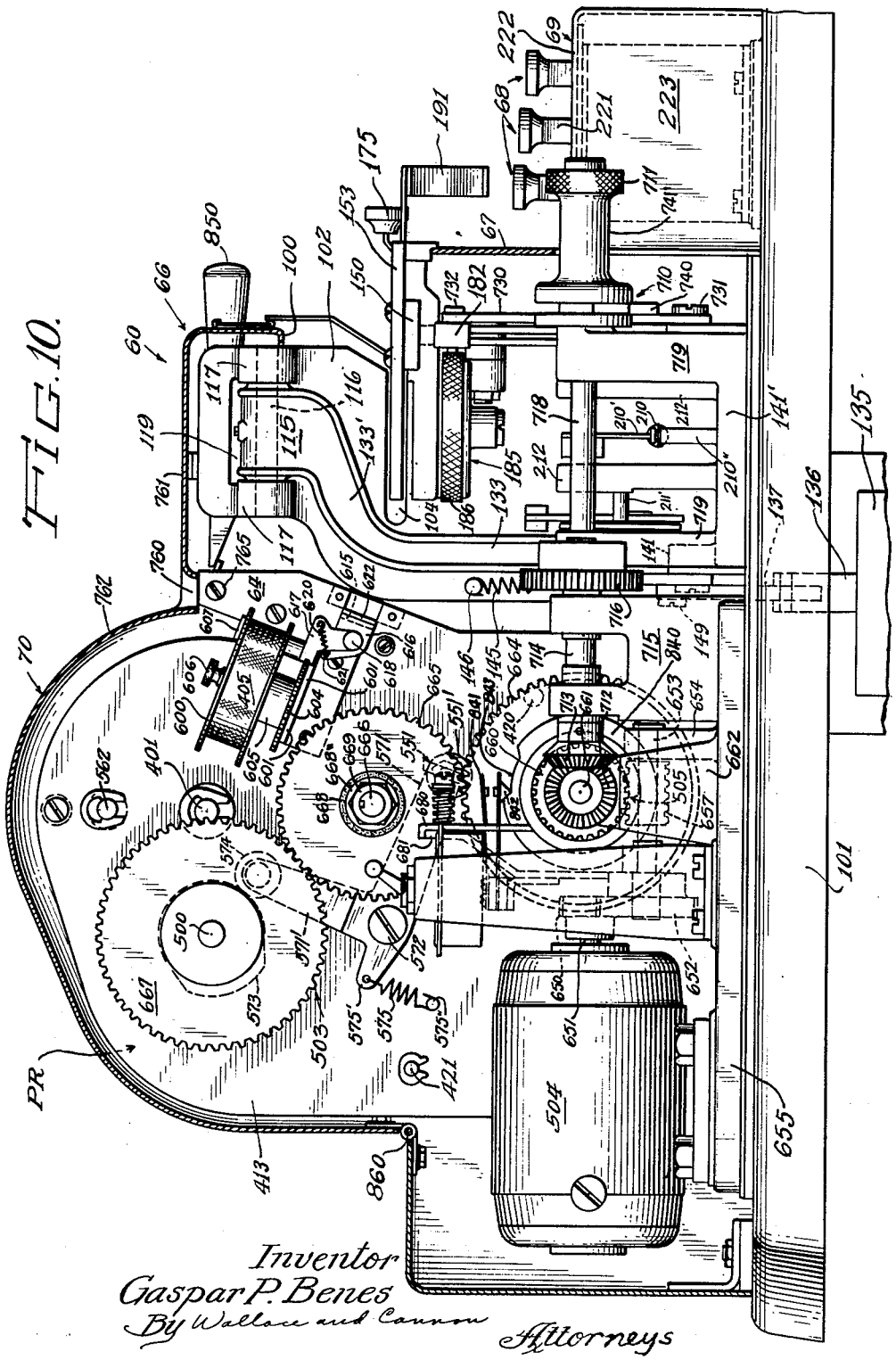

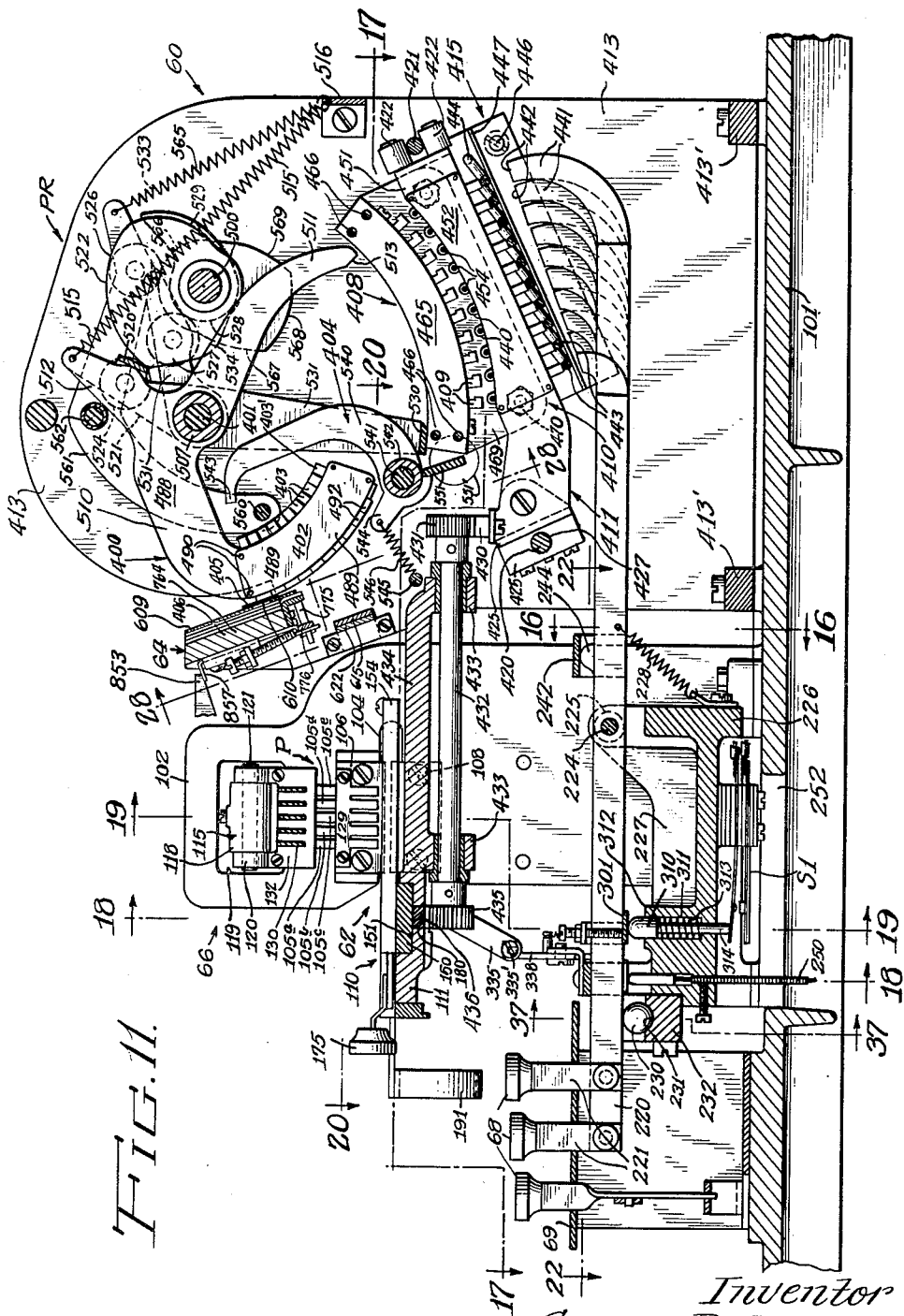

Inventor
Gaspar P. Benes
By Wallace and Cannon
Attorneys

Dec. 9, 1941.  G. P. BENES  2,265,222
MACHINE FOR PREPARING CONTROL DEVICES
Filed July 31, 1940   29 Sheets-Sheet 9

Inventor
Gaspar P. Benes
By Wallace and Cannon
Attys.

Dec. 9, 1941.　　　　G. P. BENES　　　　2,265,222
MACHINE FOR PREPARING CONTROL DEVICES
Filed July 31, 1940　　　29 Sheets-Sheet 11

Inventor
Gaspar P. Benes
By Wallace and Cannon
Attorneys.

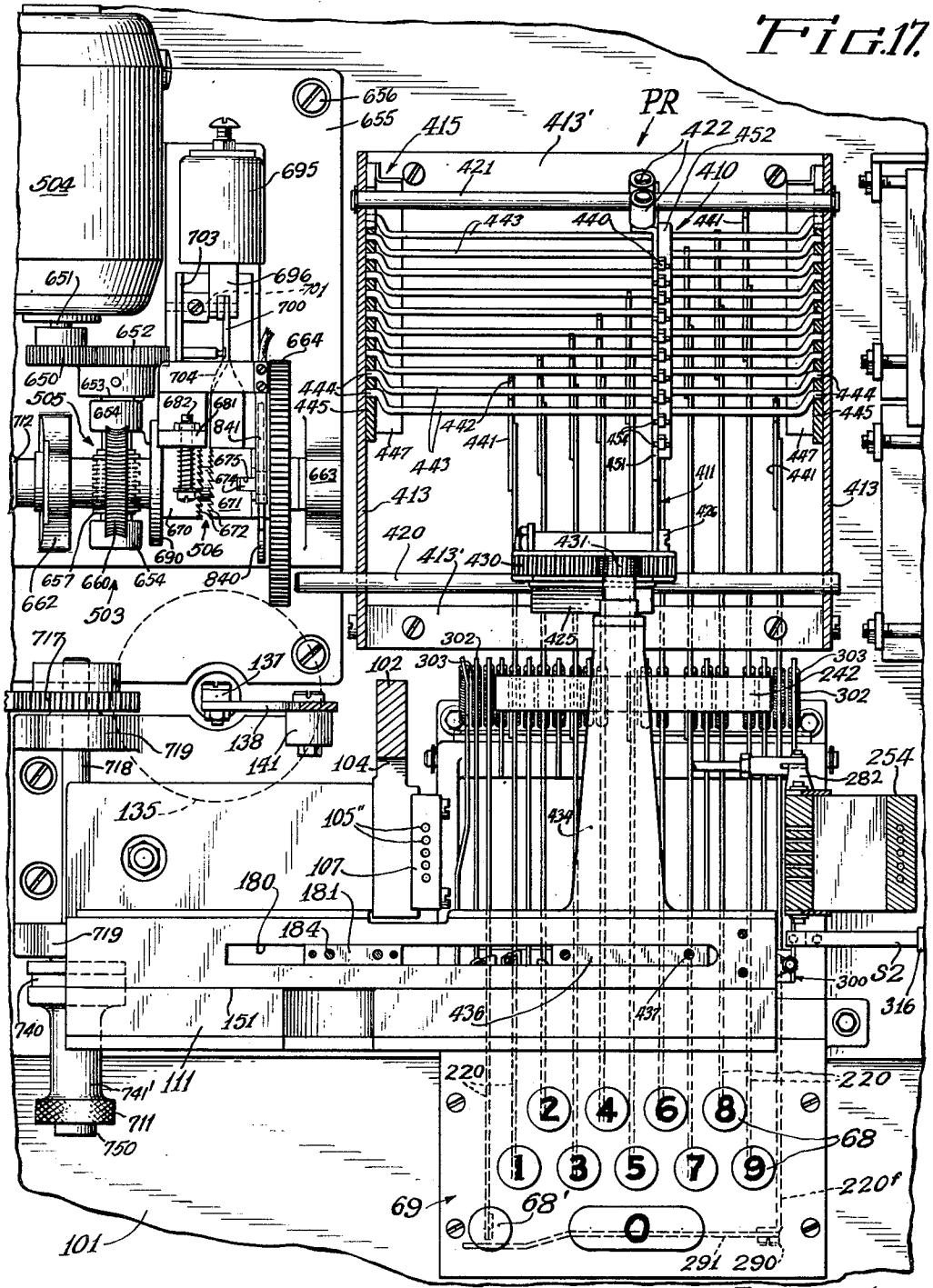

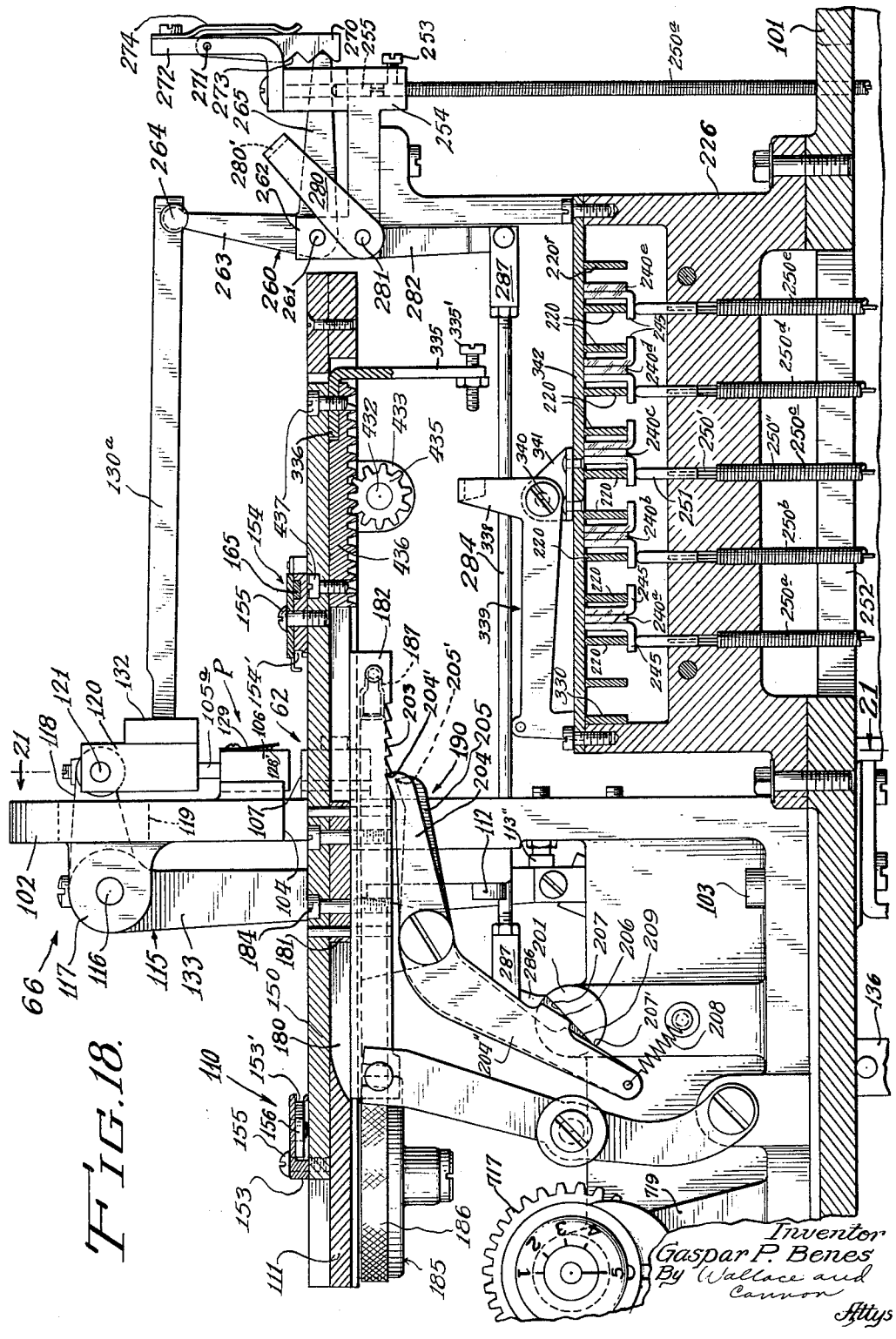

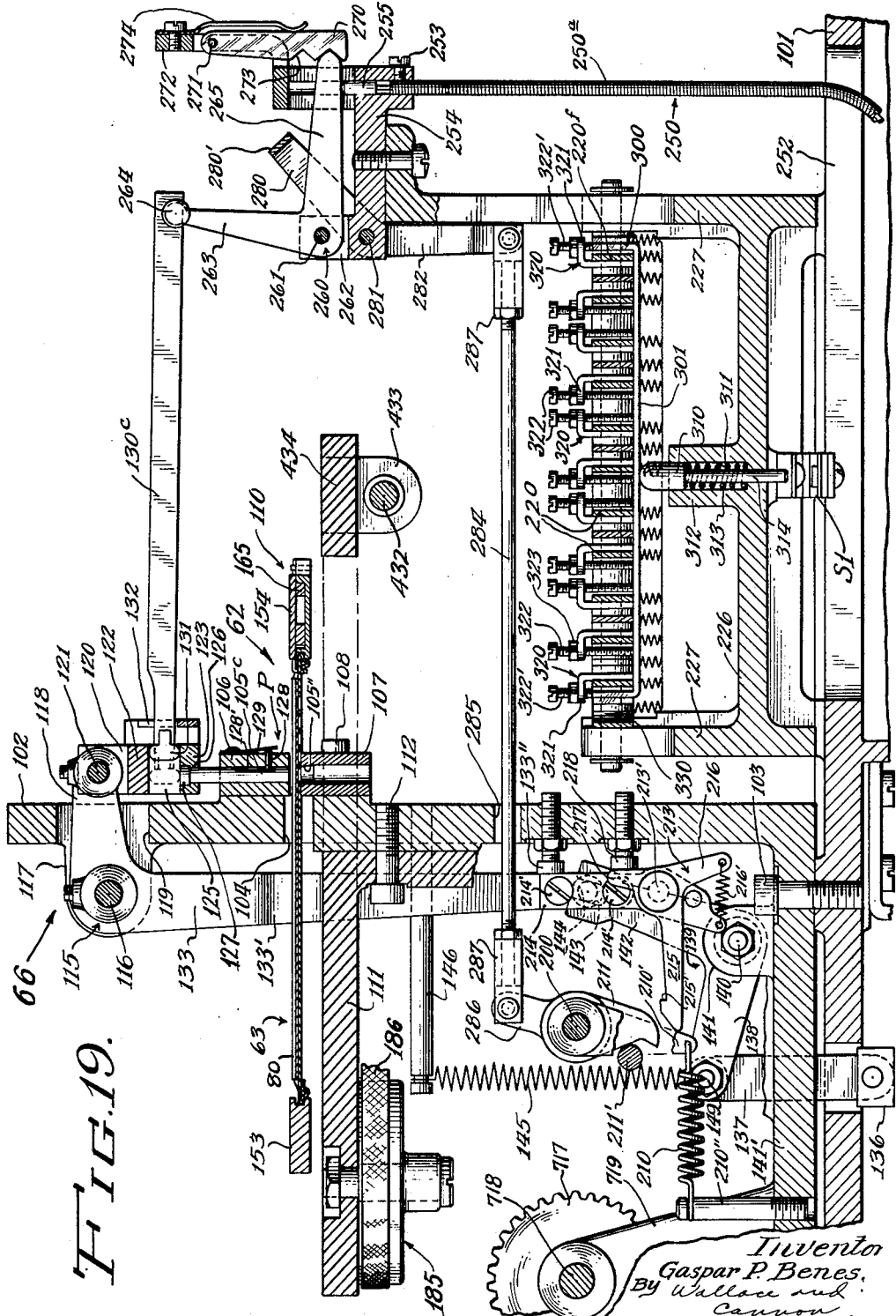

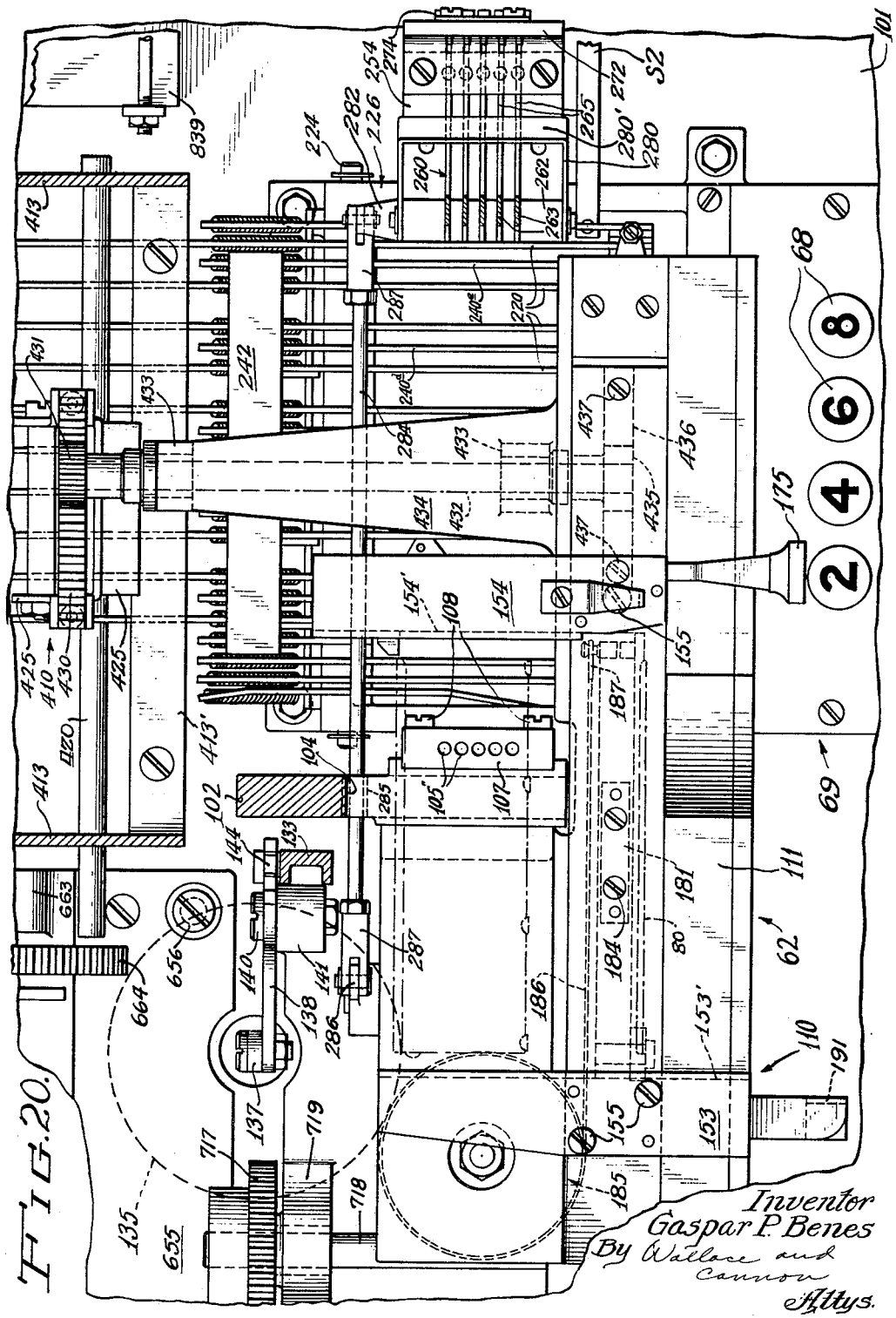

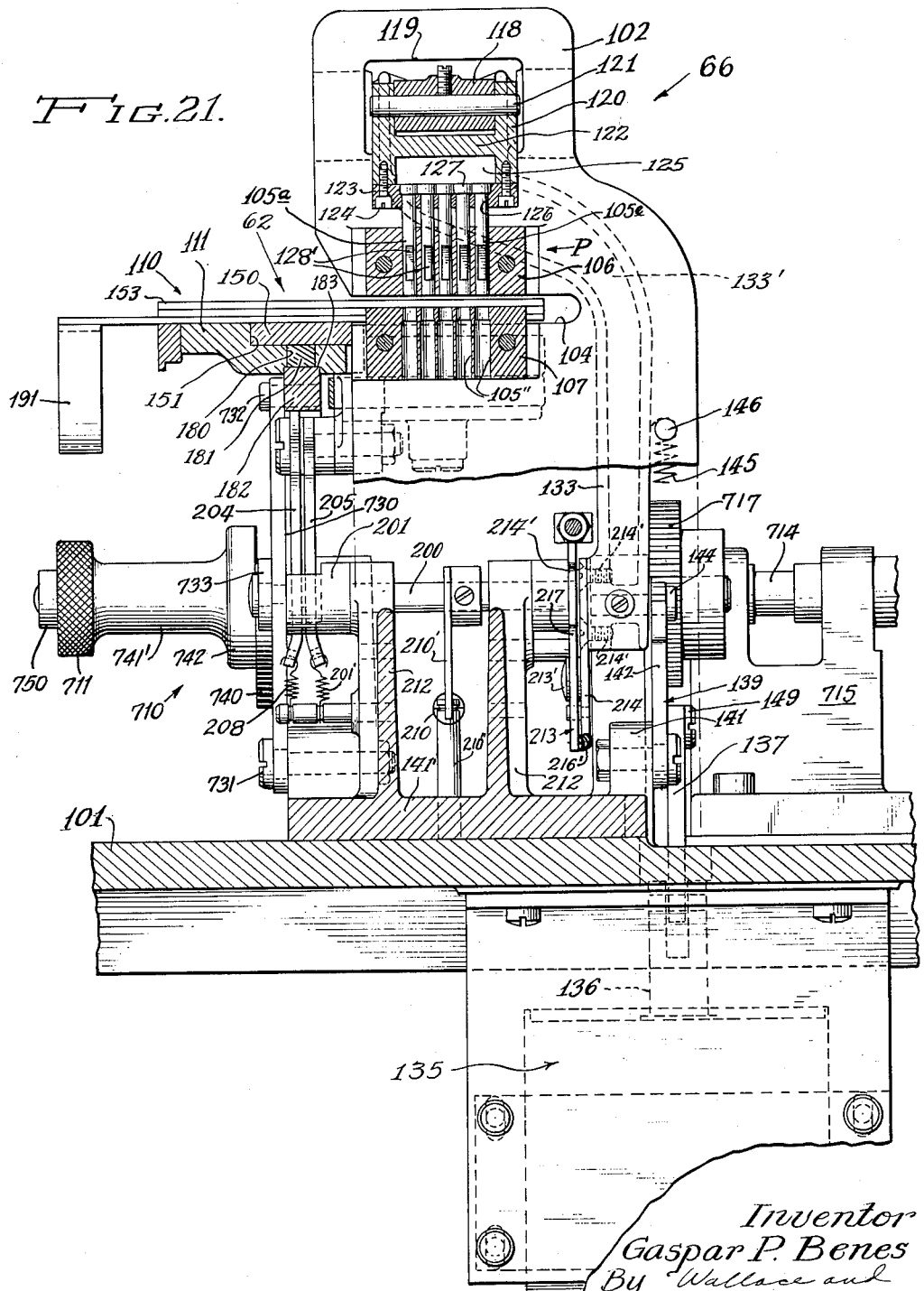

Dec. 9, 1941.    G. P. BENES    2,265,222
MACHINE FOR PREPARING CONTROL DEVICES
Filed July 31, 1940    29 Sheets-Sheet 17
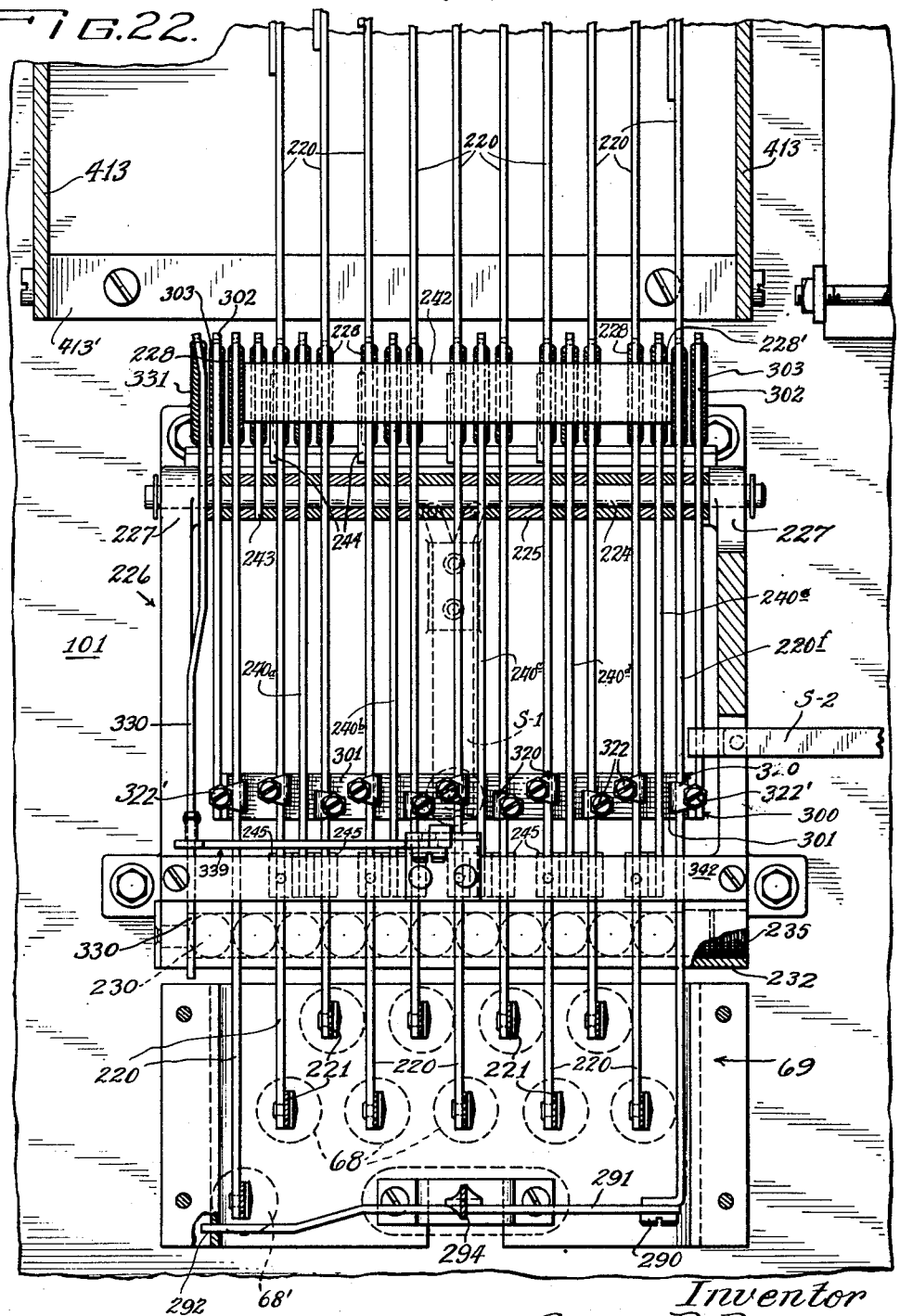
Inventor
Gaspar P. Benes
By Wallace and Cannon
Attys.

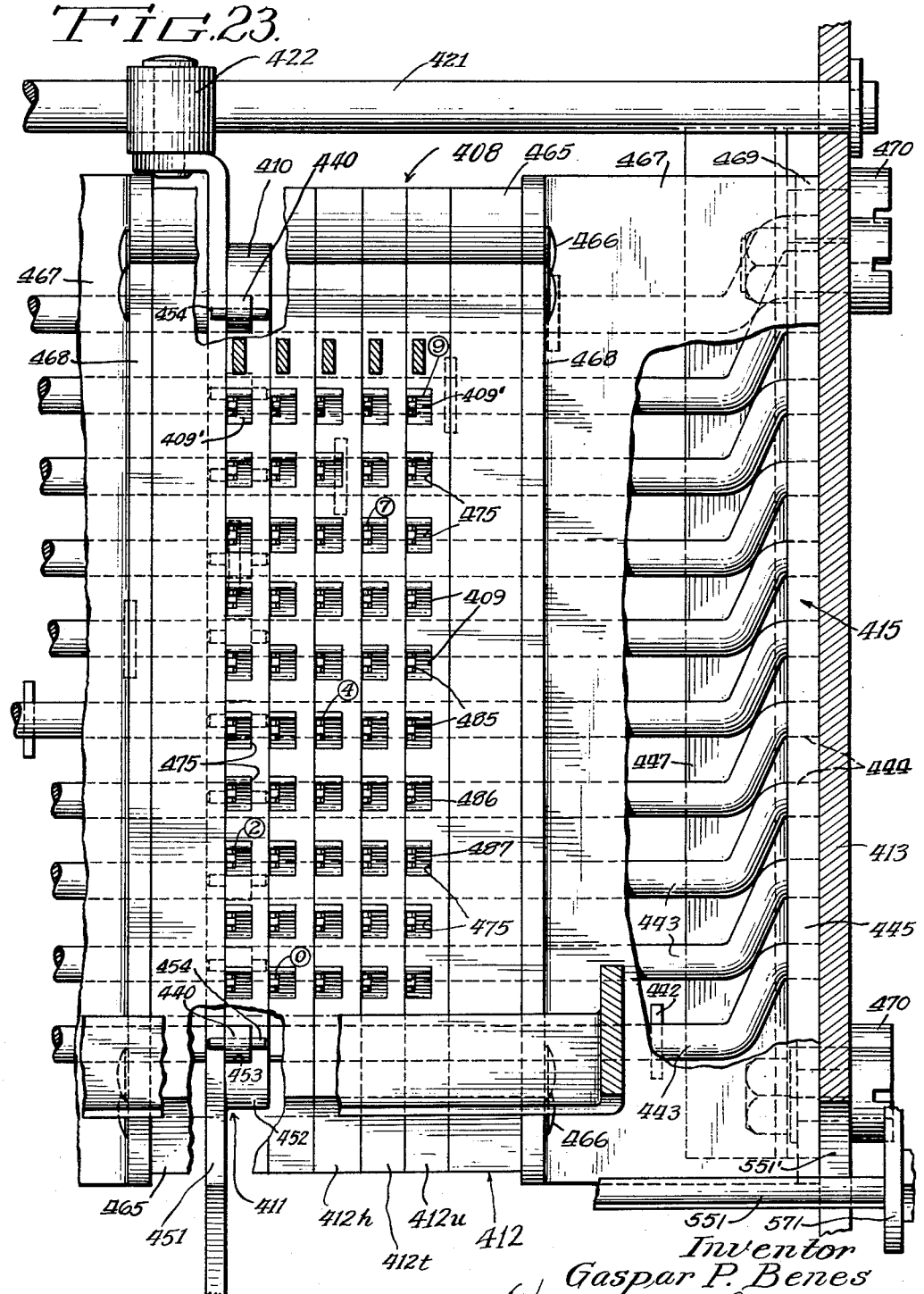

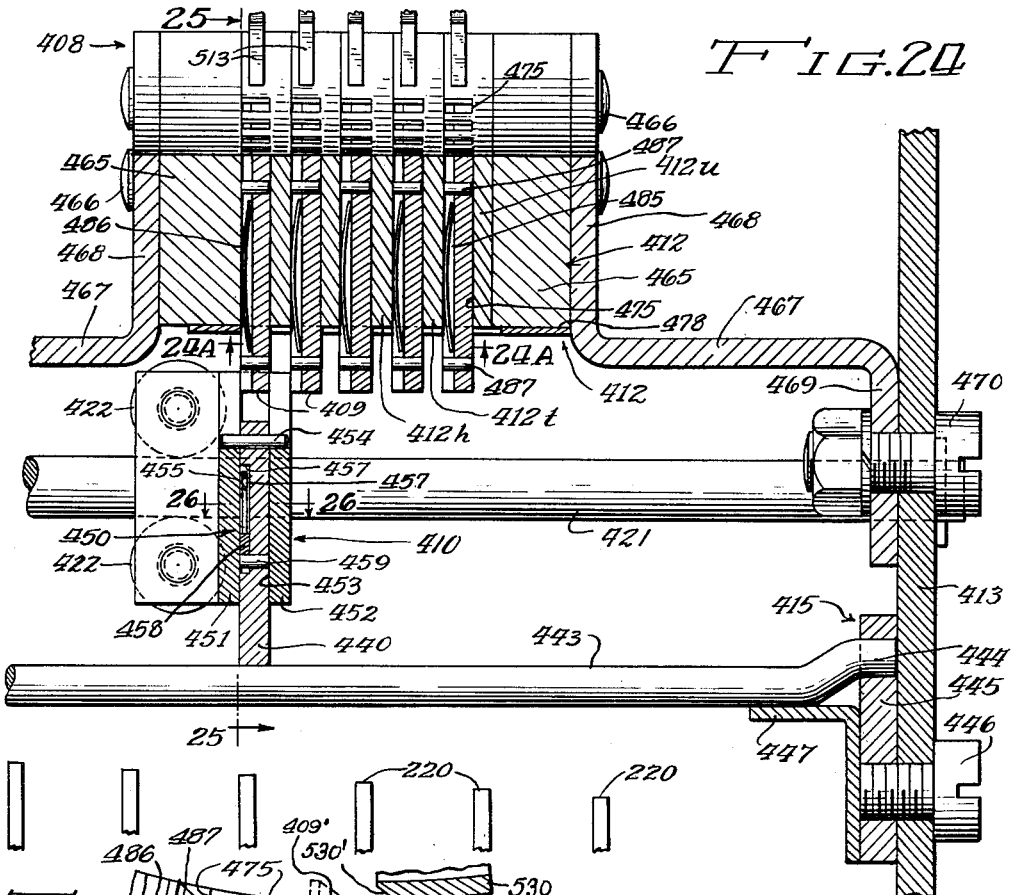

Dec. 9, 1941.  G. P. BENES  2,265,222
MACHINE FOR PREPARING CONTROL DEVICES
Filed July 31, 1940  29 Sheets-Sheet 20
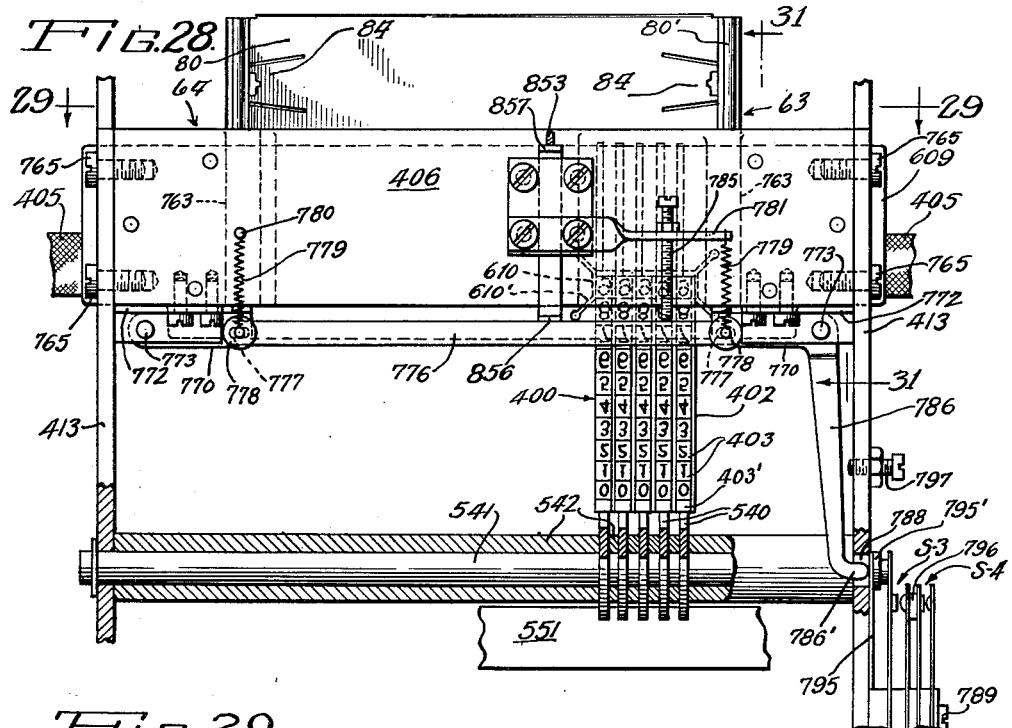
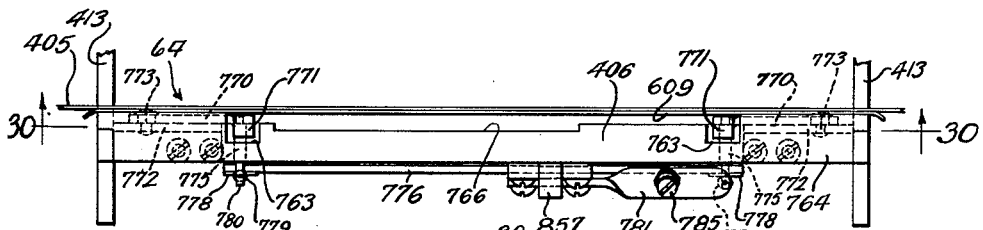
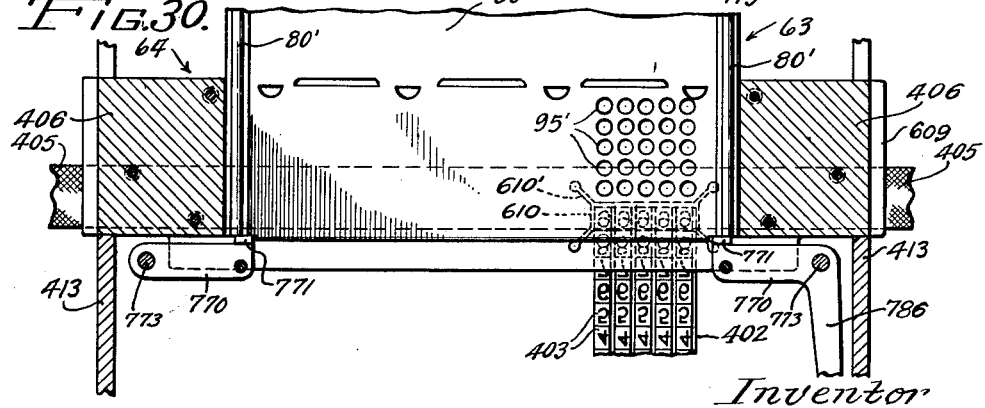
Inventor
Gaspar P. Benes
By Wallace and Cannon
Attys.

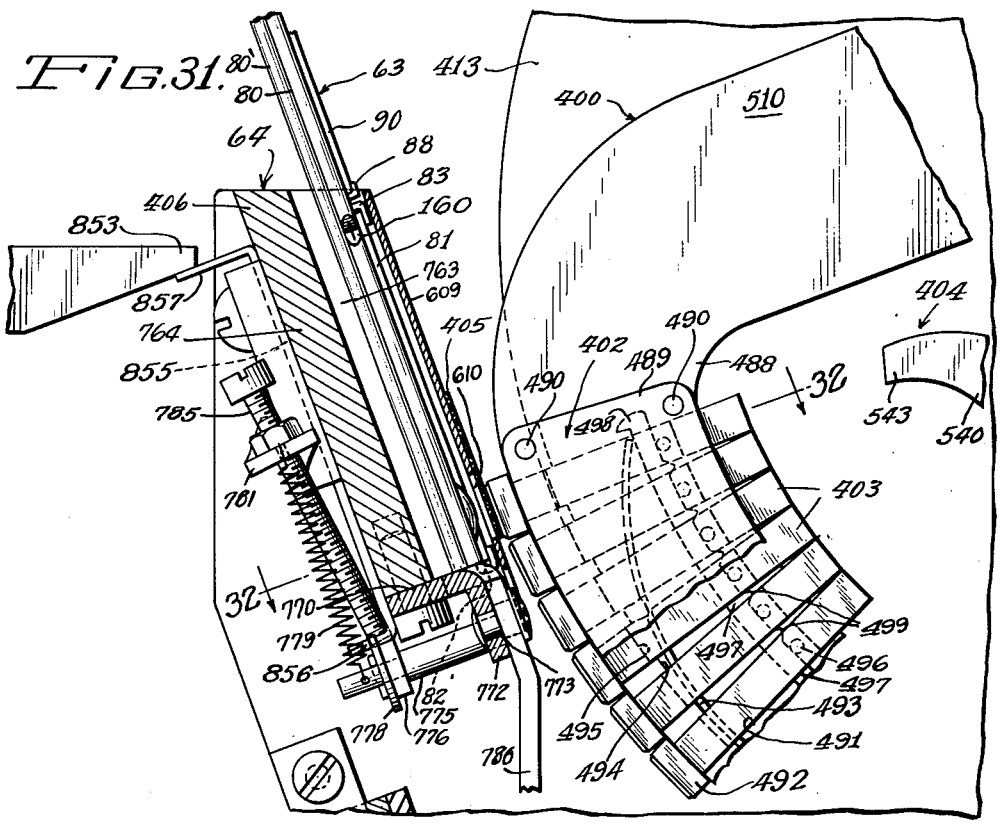
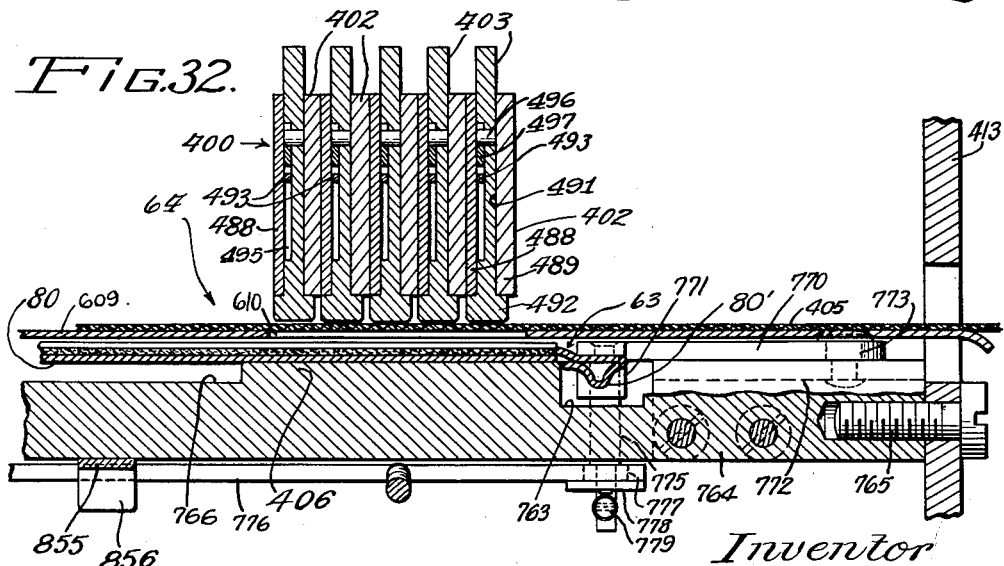

Dec. 9, 1941.   G. P. BENES   2,265,222
MACHINE FOR PREPARING CONTROL DEVICES
Filed July 31, 1940   29 Sheets-Sheet 22
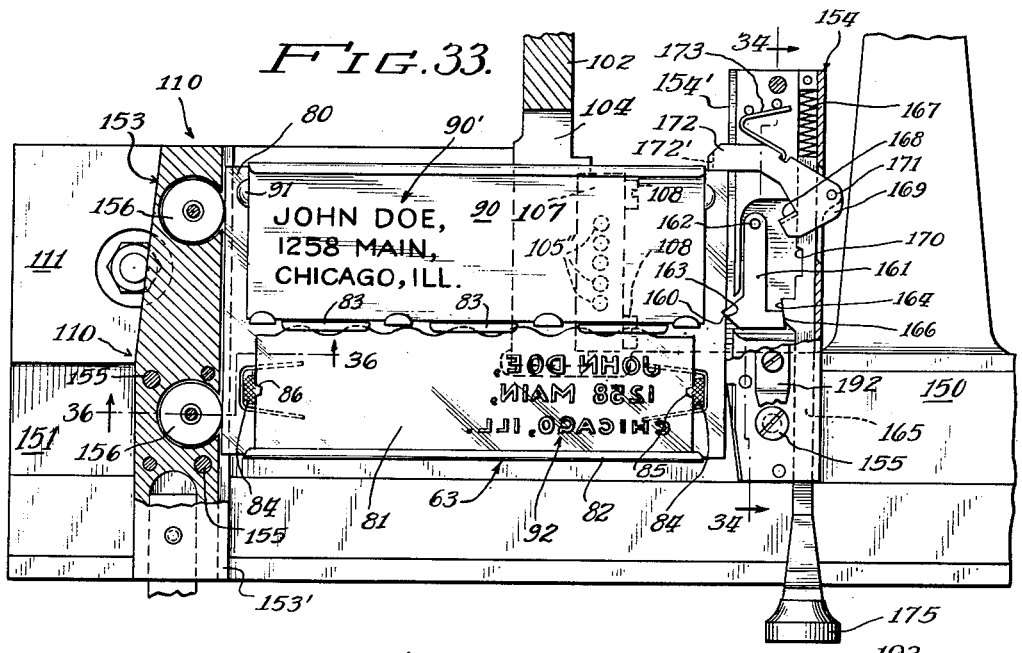
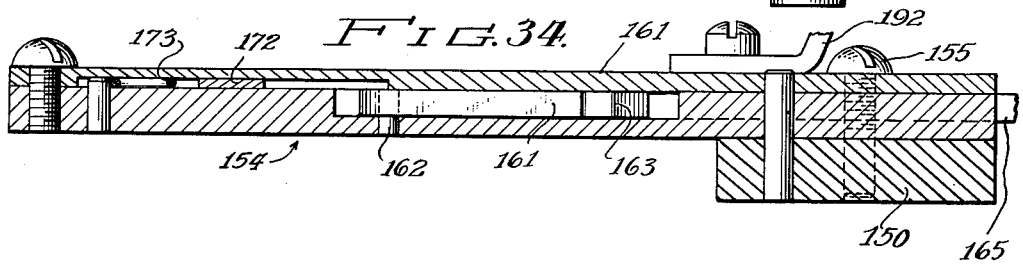
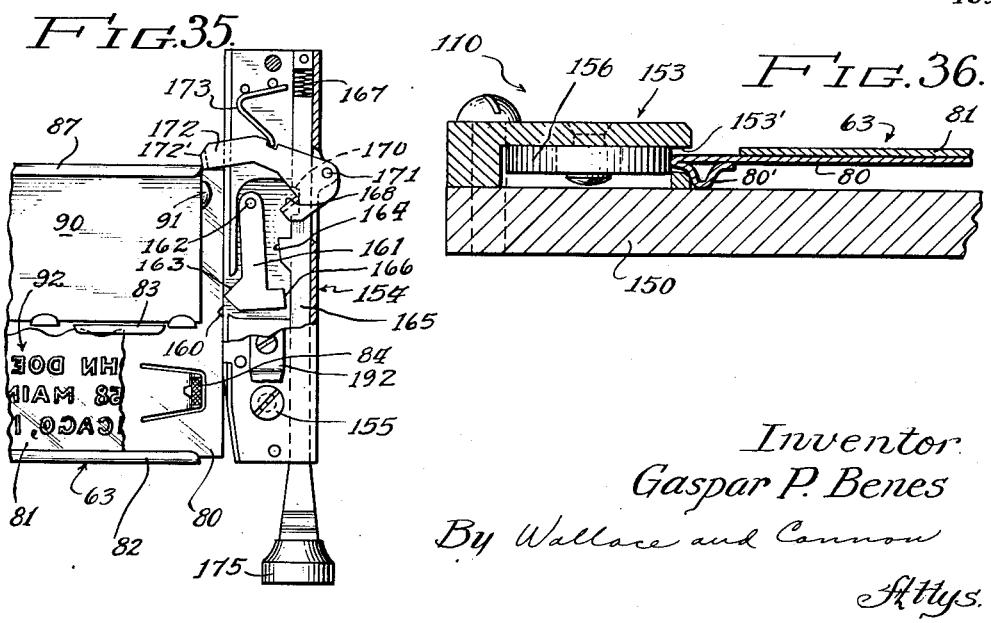
Inventor
Gaspar P. Benes
By Wallace and Connor
Attys.

Dec. 9, 1941. G. P. BENES 2,265,222
MACHINE FOR PREPARING CONTROL DEVICES
Filed July 31, 1940 29 Sheets-Sheet 23
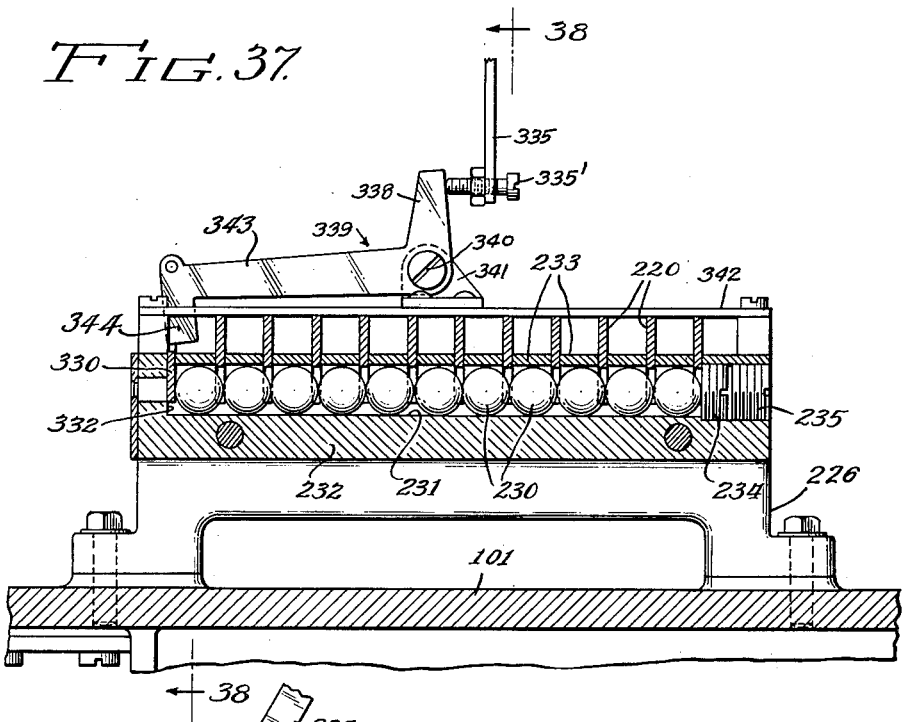
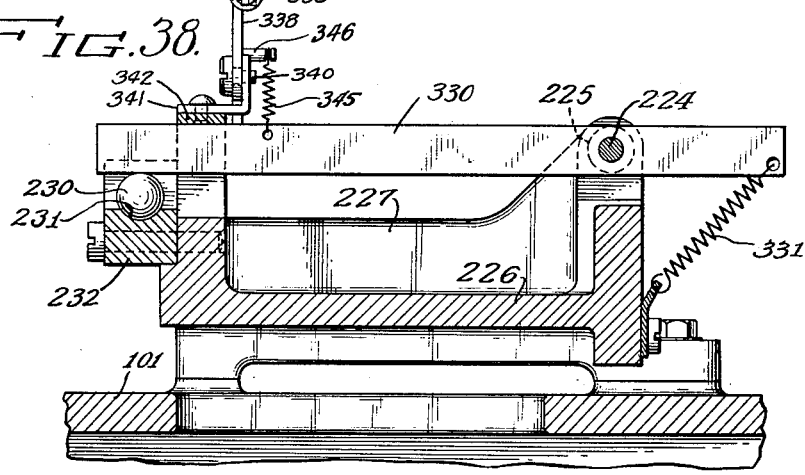
Inventor
Gaspar P. Benes
By Wallace and Cannon
Attys.

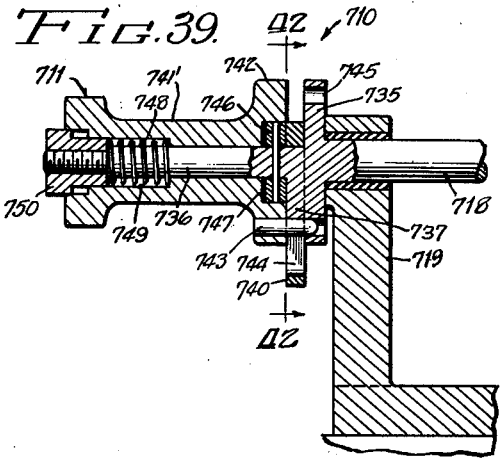
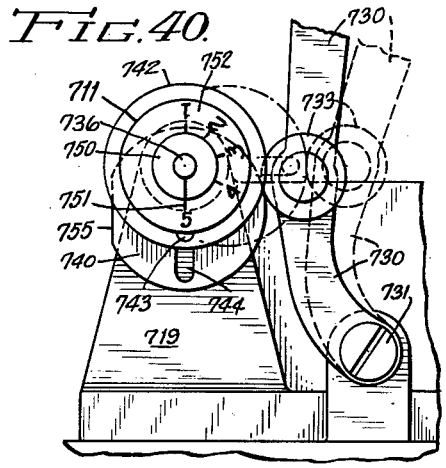
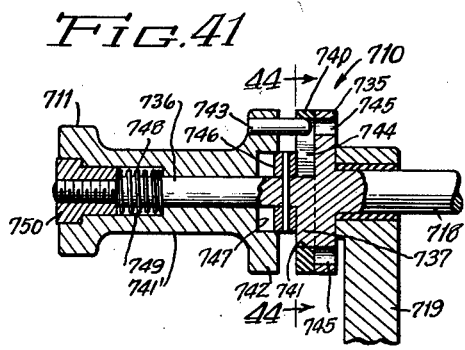
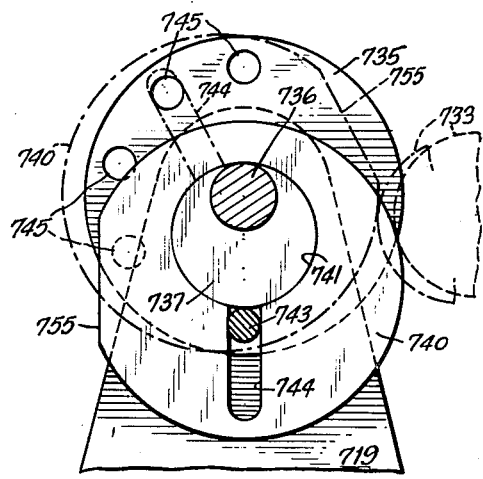
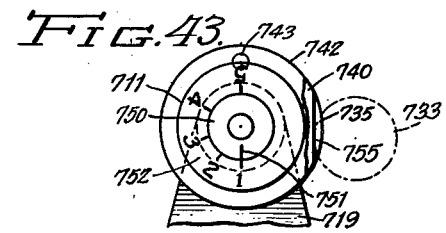
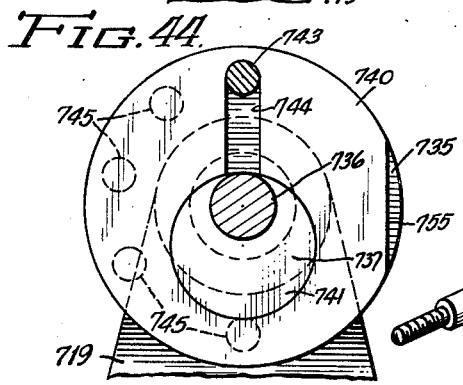
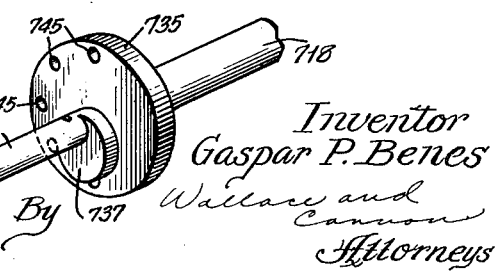

Dec. 9, 1941.  G. P. BENES  2,265,222
MACHINE FOR PREPARING CONTROL DEVICES
Filed July 31, 1940  29 Sheets-Sheet 25
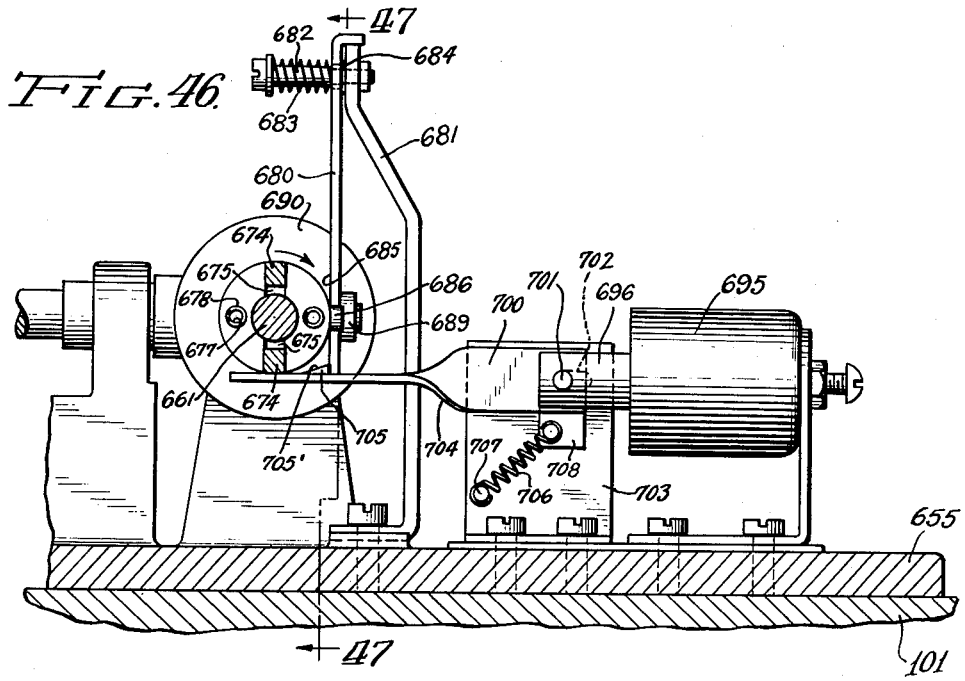
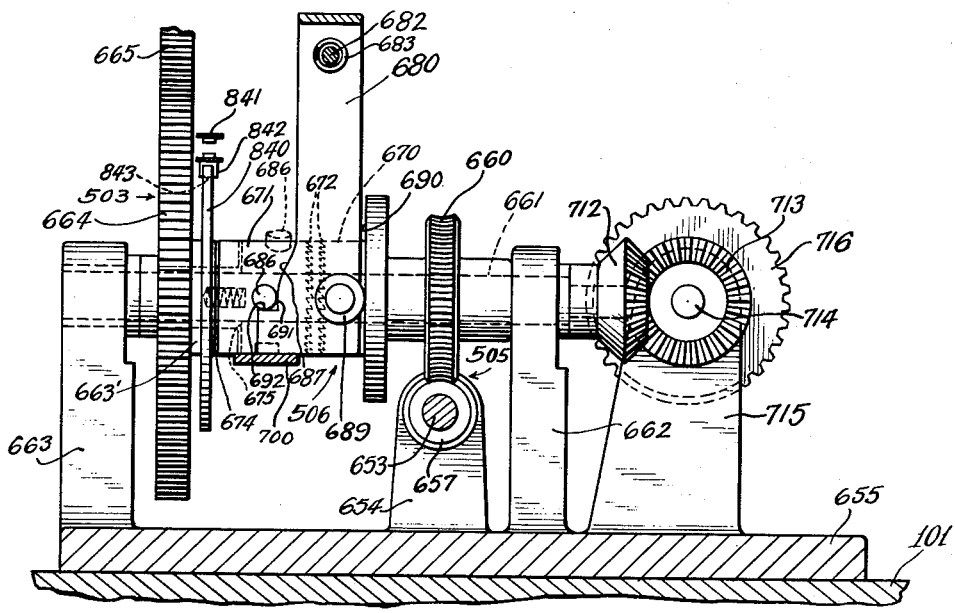
Inventor
Gaspar P. Benes.
By Wallace and Cannon
Attorneys.

Dec. 9, 1941.  G. P. BENES  2,265,222
MACHINE FOR PREPARING CONTROL DEVICES
Filed July 31, 1940    29 Sheets-Sheet 26
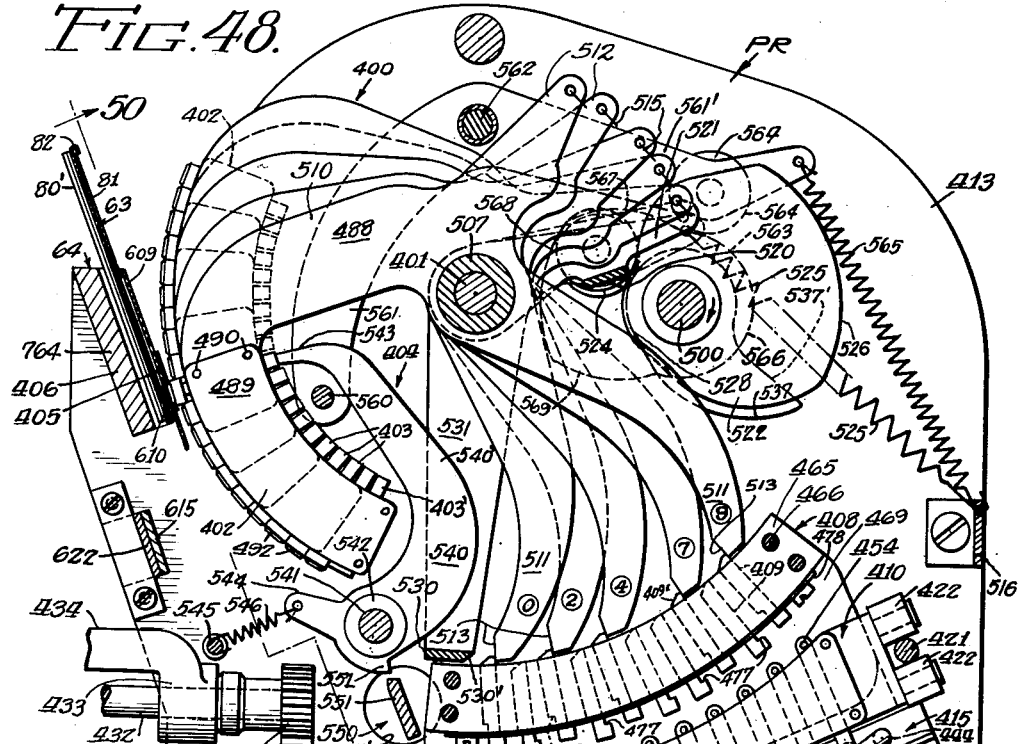
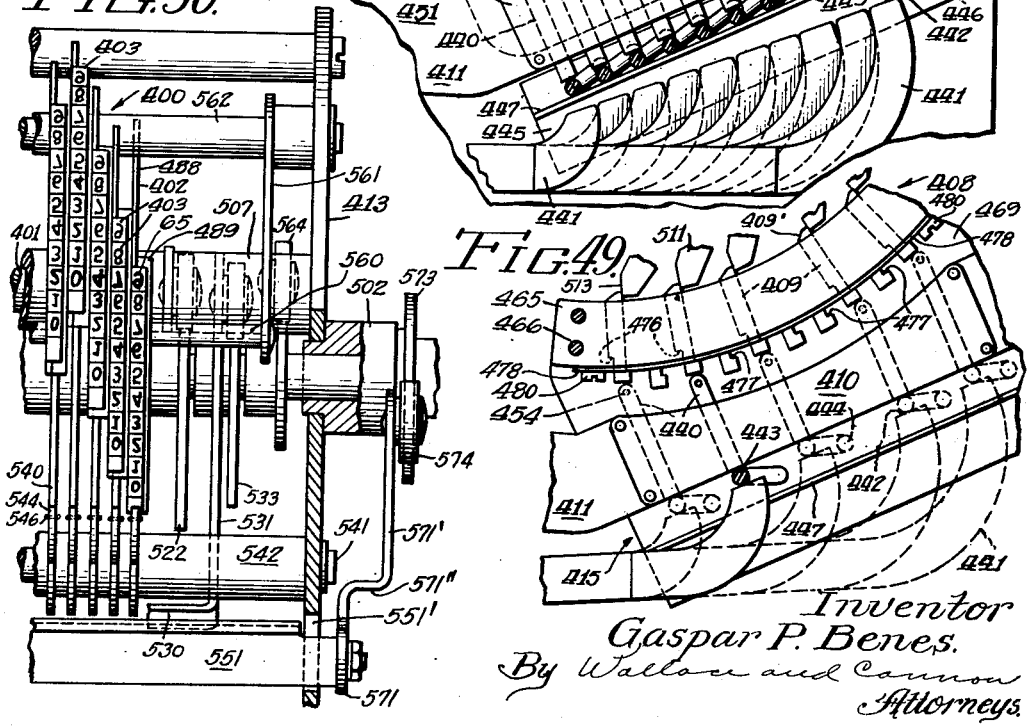
Inventor
Gaspar P. Benes.
By Wallace and Cannon
Attorneys.

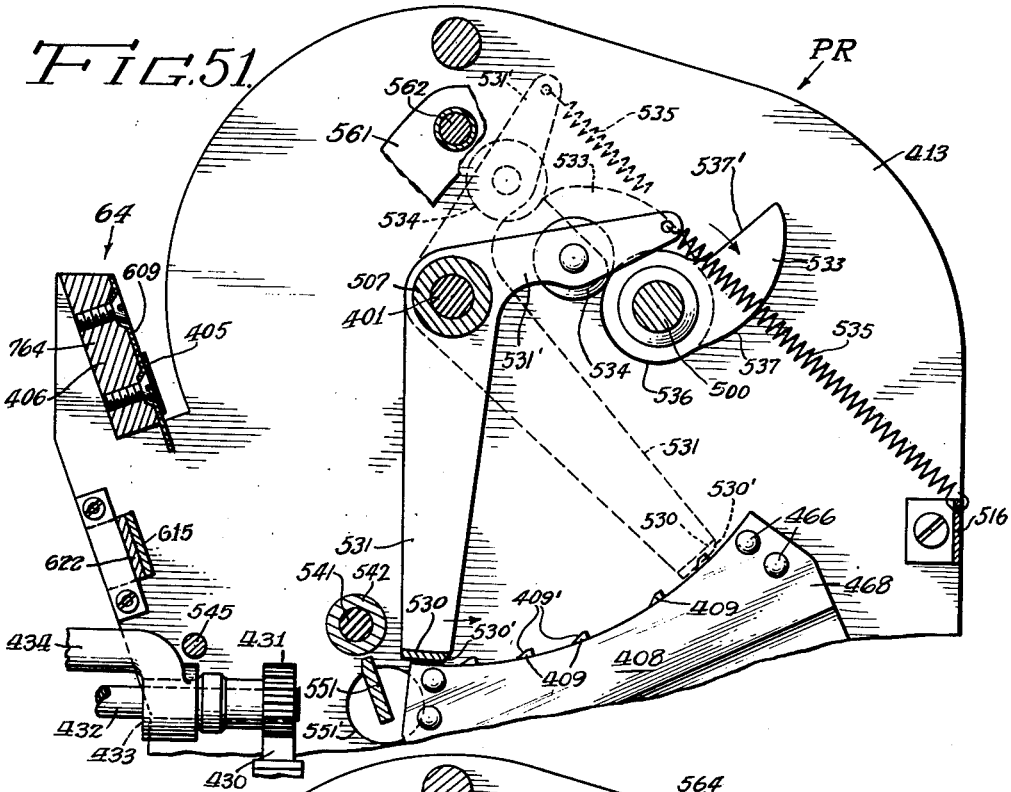
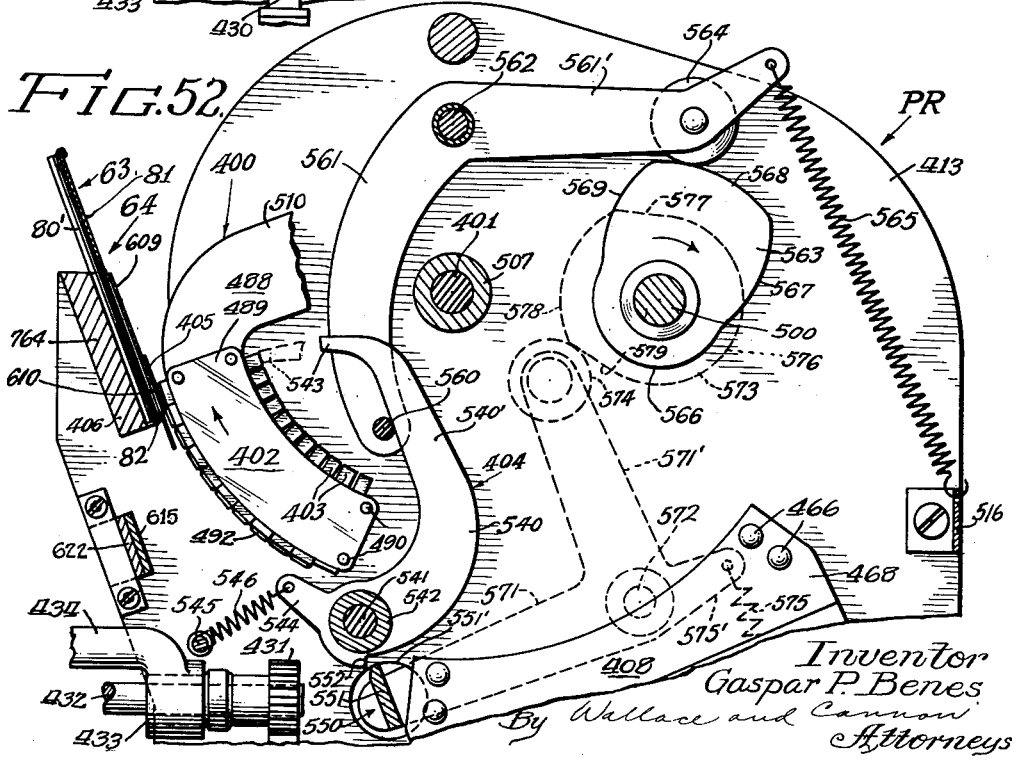

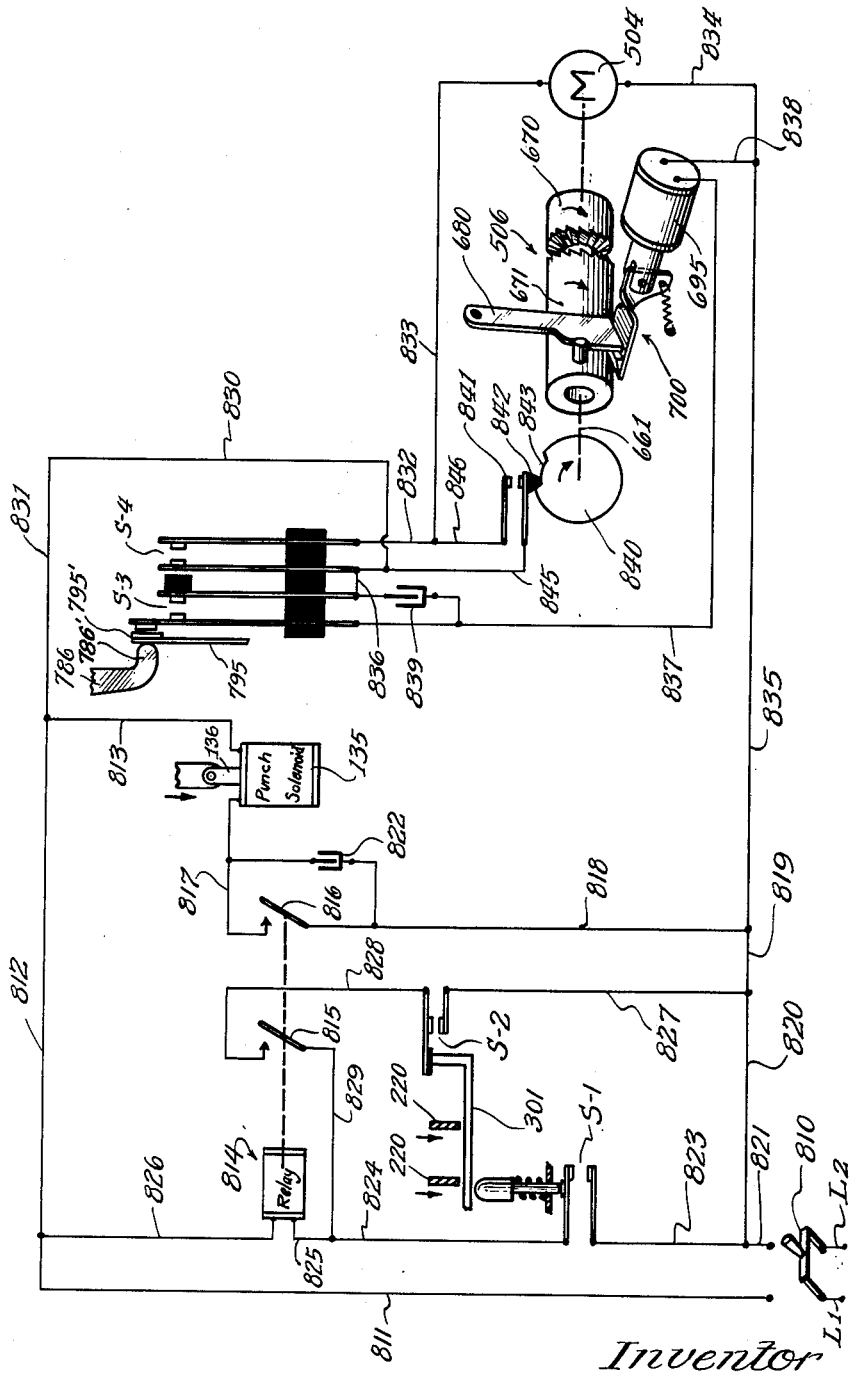

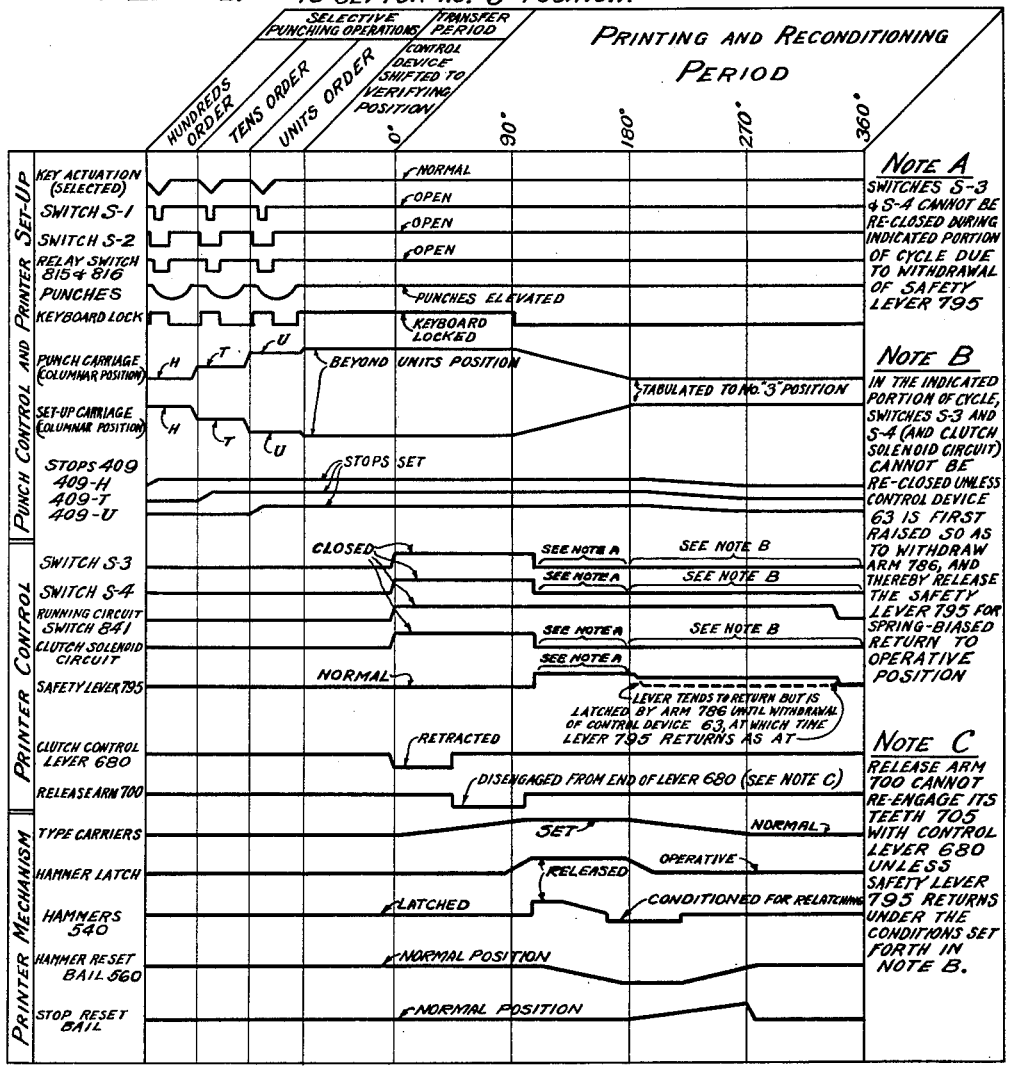

Patented Dec. 9, 1941

2,265,222

UNITED STATES PATENT OFFICE 2,265,222

MACHINE FOR PREPARING CONTROL DEVICES

Gaspar P. Benes, Euclid, Ohio, assignor to Addressograph - Multigraph Corporation, Wilmington, Del., a corporation of Delaware Application July 31, 1940, Serial No. 348,621

38 Claims. (Cl. 101—93)

This invention relates to the preparation of control devices adapted for use in accounting machines, computing machines, variable printing machines or the like and to the verification of such control devices.

Control devices adapted for uses of this character are generally in the form of cards wherein coded representations of the desired control data are provided upon the control device by suitable physical deformation of the device in accordance with a selected positional code. Such control devices are usually passed sequentially through the machine to be controlled so that each control device effects the predetermined operation of the machine in accordance with the coded control data carried thereby. In many instances the control device may be employed to carry coded representations of letters or words, while in other instances the coded data carried by the control device represent numerical control data. When the coded information represents numerical data, this data may be used in various ways, as for example, to set up the represented numerical data as one of the factors to be employed in a computing operation of a computing machine.

Control devices of this general character may be in the form of so-called Hollerith or Powers cards, or may be formed as a part of a printing and control device of the general character illustrated and claimed in Gollwitzer Patent No. 2,132,412. In printing and control devices of the character disclosed in this patent, the control data are formed on but a portion of the complete device, the remaining portions or areas of the device being employed to carry a printing plate and an index card which bears an impression from the printing plate.

In the preparation of devices of this character, the coded representations of the control data are formed successively upon a series of control devices, such control data being taken from a suitable list. The preparation of the control devices involves the reading of the desired data pertaining to a particular control device from the list, the formation of the coded physical representation of this data upon the control device, and finally a verification of the coded representation by comparison thereof with the list from which the data was taken.

The primary object of the present invention is, therefore, to facilitate the formation and verification of such coded control data upon control devices of the general character above described.

A further object is to form the desired control data on control devices of this character in a suitable machine and to so construct the machine that the inherent operating cycle of the machine enforces a particular mode of procedure with respect to the formation of each control device so that the machine promotes an efficient and accurate sequence of movements and operations by the operator.

A still further object is to insure that the movements and operations which the operator must perform in the machine are adapted to the capabilities of the operators and also to group certain of the more easily performed operations for simultaneous performance, and yet require step by step or sequential performance of other operations where such enforced sequential performance promotes accuracy and speed.

A further object is to promote rapidity of performance of the required operations in a machine of the aforesaid character and to avoid errors which have heretofore been committed because of inefficient grouping and inefficient sequential relation of the required operations.

A more specific object of the present invention is to produce coded representations of the digits in one or more orders sequentially on a control device under the manual control of the operator and to produce a visual verification of the coded representations of the several digits in a single operation which can only be performed after the coded representations of all of the digits have been formed on the control device, thereby to insure that the operator will invariably follow the same sequence of operations and will attain greater accuracy and speed than has heretofore been attainable.

A further object of the invention is to provide a machine of this character embodying means to inform the operator upon the commission of the most common errors which may occur.

In the formation of control devices of this character it is usually necessary that the coded representation of the various digits of a control number, or the individual characters of other types of data, be located in a particular columnar position on the control device, this being necessary in the case of numerical control data by reason of the frequent use of such control data in the performance of computing operations. In the event that the control data are misplaced upon the control device, it is obvious that an incorrect answer will be obtained where such incorrectly represented numerical control data are used in a computing operation, or in the event that the control data are employed to set up printing devices, an incorrect printed representation may in some instances be produced. Such improper columnar positioning of the coded representations of a particular desired control number or other control data has heretofore been a common error in the production of control devices of this character, and a more specific object of the present invention is to provide a machine for forming control devices wherein means is provided to warn the operator when such an error has occurred.

It will be evident that if the several digits of a control number are formed as coded representations on a control device so as to be displaced to the right one or more orders from the desired correct position, the use of the control device bearing such incorrectly positioned coded representations in a computing or other operation will produce an incorrect result, and another object of the present invention is to provide a machine for forming control devices wherein the machine operates automatically to warn the operator when such an incorrect columnar positioning of the control data has taken place.

In many machines when the control data have been partially formed in a position which is displaced to the right from the correct position, it has been possible for the machine to be operated two or more times in the last or units order position of the control device, and a further object of the invention is to provide a machine for forming control devices wherein but a single punching operation or a single control data forming operation may be performed in the last or units order position of the control device.

Another object is to provide a machine of this character wherein the forming operations relating to each of the several components or orders of the control data are performed in succession, and in which the control data are verified by printing the control data on the control device in a single printing operation in accordance with the several individual operations involved in the formation of the control data.

Another object is to provide such a machine embodying printing mechanism which is set up in unison with and as an incident to the formation of the control data and arranged so that after the completion of the formation of the control data, the printing mechanism may be operated in accordance with the previously effected set-up thereof to print the control data on the control device in predetermined relation to the physical representations which have been previously formed on the control device.

Another object is to provide such a machine for forming and verifying control devices which is particularly adapted for work wherein the items of the control data to be formed on successive control devices are of the same length or comprise the same number of individual letters or digits, and a more specific object is to provide such a machine wherein the carriage of the control data forming mechanism is automatically reset or tabulated to a predetermined columnar position as an incident to the performance of the verifying operation by the machine.

A further object is to provide such a machine wherein the automatic carriage return mechanism may be adjusted to return the carriage to any desired columnar setting, thereby to enable the operator to adjust the machine to conform as closely as possible to the requirements of the particular list from which the control devices are being made, with the result that the control devices may be made by the operator with the minimum number of manual carriage tabulating operations.

A further object of the present invention is to provide a machine of this character wherein the control data forming means is locked against further operation as an incident to the performance of the control data forming operation in the last or units order position on a control device, and to provide means operable automatically as an incident to the performance of the verifying printing operation to unlock the control data forming mechanism thereby to condition this mechanism for operation on the succeeding control device.

A further object is to provide a machine of this character for forming control devices wherein variable printing mechanism is set up as an incident to the performance of the control data forming operations in the successive columnar positions on the control device and to provide in such a machine a verifying position at which the control device may thereafter be positioned for the performance of the verifying printing operation, and a more specific object is to provide such a machine embodying means operable to cause a printing operation of the printing mechanism as soon as the control device has been positioned at the verifying position or station.

Another object is to provide a machine of this character having a verifying station at which a control device is positioned after the completion of the control data forming operations, and wherein the automatic control means which initiates the printing cycle, and which is actuated as an incident to the positioning of the control device at the verifying position, is so constructed and arranged that the machine will operate through but a single cycle even though the control device is maintained at the verifying position after the completion of the desired printing cycle.

Other and further objects of the present invention will be apparent from the following description and claims and are illustrated in the accompanying drawings which, by way of illustration, show preferred embodiments and principles thereof of what I now consider to be the best mode in which I have contemplated applying these principles. Other embodiments of the invention utilizing the same or equivalent principles may be made by those skilled in the art without departing from the present invention and the purview of the appended claims.

In the drawings:

Fig. 1 is a front elevational view of a machine embodying the features of the invention;

Fig. 2 is an elevational view of the left-hand side of the machine of Fig. 1;

Fig. 3 is a front elevational view of a control device which is adapted to be formed and verified through the use of the machine of the present invention;

Fig. 4 is an elevational view of the back of the control device;

Fig. 5 is an enlarged cross-sectional view taken on the line 5—5 of Fig. 3;

Fig. 6 is a view illustrating the five-element positional code which is employed in the present machine;

Fig. 7 is a plan view of the machine of the present invention, the cover of the machine being removed to expose the internal elements thereof;

Fig. 8 is a front elevational view of the machine as viewed from the line 8—8 of Fig. 7, the casing of the machine being shown in cross-section taken in a line somewhat rearwardly of the line 8—8;

Fig. 9 is a side elevational view of the mechanism of the machine as viewed from the line 9—9 of Fig. 7, the casing being shown in cross-section in a vertical plane somewhat to the left of the line 9—9 of Fig. 7;

Fig. 10 is a side elevational view of the internal mechanism of the machine as viewed from the line 10—10 of Fig. 7;

Fig. 11 is a vertical cross-sectional view taken in the plane of the line 11—11 of Fig. 7;

Fig. 17 is a fragmental plan section taken along the line 17—17 of Fig. 11;

Fig. 18 is an enlarged fragmental sectional view taken along the line 18—18 of Fig. 11;

Fig. 19 is an enlarged fragmental sectional view taken along the line 19—19 of Fig. 11;

Fig. 20 is an enlarged fragmental plan view taken along the line 20—20 of Fig. 11;

Fig. 21 is an enlarged vertical sectional view taken along the line 21—21 of Fig. 18;

Fig. 22 is an enlarged fragmental plan view taken along the line 22—22 of Fig. 11;

Fig. 23 is an enlarged plan sectional view taken along the line 23—23 of Fig. 13 and showing the relation of the stop mechanism and the set-up carriage;

Fig. 24 is an enlarged fragmental cross-sectional view taken along the line 24—24 of Fig. 13;

Fig. 24A is a fragmental cross-sectional view taken along the line 24A—24A of Fig. 24;

Fig. 25 is a fragmental cross-sectional view taken along the line 25—25 of Fig. 24;

Fig. 26 is a fragmental cross-sectional view taken along the line 26—26 of Fig. 24;

Fig. 27 is a perspective view showing one of the stop pins illustrated in Figs. 24 and 24A;

Fig. 28 is a fragmental sectional view taken along the line 28—28 of Fig. 11;

Fig. 29 is a fragmental plan section taken along the line 29—29 of Fig. 28 with the control device 63 removed;

Fig. 30 is a fragmental sectional view taken along the line 30—30 of Fig. 29;

Fig. 31 is an enlarged fragmental portion of the type segment and platen structure shown in Fig. 11, with a control device moved substantially to printing postion on the platen;

Fig. 32 is a fragmental cross-sectional view taken along the line 32—32 of Fig. 31;

Fig. 33 is a plan view showing the punch carriage of Fig. 20, certain of the parts of the carriage being removed to show the internal construction thereof;

Fig. 34 is a sectional view taken along the line 34—34 of Fig. 33;

Fig. 35 is a view showing a portion of the punch carriage mechanism of Fig. 33 with the parts thereof in different positions;

Fig. 36 is a fragmental cross-sectional view taken along the line 36—36 of Fig. 33;

Fig. 37 is an enlarged cross-sectional view taken along the line 37—37 of Fig. 11;

Fig. 38 is a fragmental cross-sectional view taken along the line 38—38 of Fig. 37;

Fig. 39 is a fragmental vertical cross-sectional view taken along the line 39—39 of Fig. 8;

Fig. 40 is a front elevational view of the mechanism of Fig. 39 as viewed from the left in Fig. 39;

Fig. 41 is a view similar to Fig. 39 showing the parts in a different adjusted position;

Fig. 42 is an enlarged cross-sectional view taken along the line 42—42 of Fig. 39;

Fig. 43 is a view similar to Fig. 40 with the parts in different adjusted positions;

Fig. 44 is a view similar to Fig. 42 with the parts in different adjusted positions;

Fig. 45 is a fragmental perspective view of a portion of the mechanism illustrated in Figs. 39 to 44;

Fig. 46 is a cross-sectional view taken along the line 46—46 of Fig. 7;

Fig. 47 is a cross-sectional view taken along the line 47—47 of Fig. 46;

Fig. 48 is an enlarged fragmental view similar to Fig. 13 and showing the various elements of the variable printer in the different operative positions which they assume in the printing of a particular five-order number;

Fig. 49 is a fragmental view illustrating the operation of a portion of the set-up mechanism of Fig. 48;

Fig. 50 is a fragmental view taken along the line 50—50 of Fig. 48 and illustrating the positions of the various type segments in the printing operation illustrated by Fig. 48;

Fig. 51 is a cross-sectional view taken along the line 51—51 of Fig. 14;

Fig. 52 is a cross-sectional view taken along the line 52—52 of Fig. 14;

Fig. 53 is a schematic wiring diagram illustrating the control circuits of the present machine; and Fig. 54 is a timing chart illustrating the sequence and relation of the operations involved in the present machine when the machine has its automatic carriage return or tabulating mechanism set for return of the carriages to their hundreds order positions.

*The machine in general*

Figure 12:
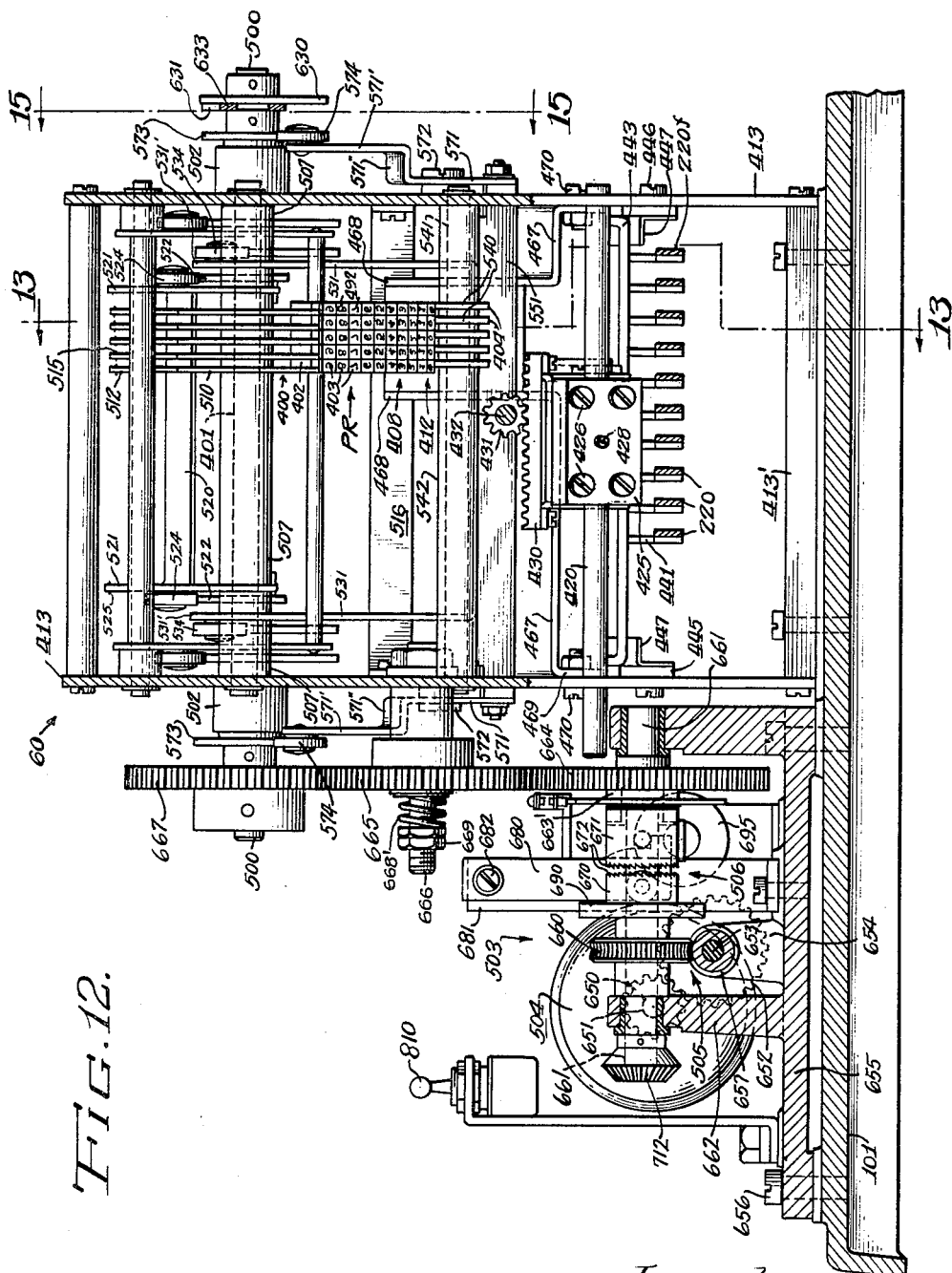
Fig. 12 is a transverse cross-sectional view taken on the line 12—12 of Fig. 7.

In the form chosen for disclosure herein the invention is embodied in a machine 60, mounted on a suitable base or standard 61, and having a punching position or station 62 along its front edge past which a control device 63 is shifted with a stey-by-step movement to form physical representations of the desired control data on the control device, and also having a printing position or station 64 in an elevated or slightly rearward relation at which the control device 63 is subsequently positioned for printing of a verifying number 65 thereon. This verifying number corresponds with the representations previously formed on the control device at the punching station 62, so that the printed verifying number may then be compared with the list from which the control data was originally taken to determine whether or not the physical representations on the control device 63 are correct.

The formation of the control data on the control device is in the present instance performed by a punching mechanism 66, the principal parts of which are housed within a removable housing 61, the punching mechanism 66 being controlled by keys 68 of a keyboard 69 which is located along the forward side of the housing 67. The printing operation at the printing station 64 is performed by variable printing mechanism PR housed within a somewhat smaller upper portion 70 of the housing 67, and this printing mechanism is set up in accordance with and as an incident to the operation of the punching mechanism 66.

The printing means PR is thus set up during the punching operation, and upon completion of the punching operation, the control device 63 is transferred from the punching station 62 to the printing station 64 and the printing operation is effected in accordance with the setting of the printing mechanism. Thus the verifying number 65 as printed on the control device 63 corresponds to the punched representations of the control data which have been formed on the control device 63, and the operator may then read the verifying number 65 and compare it with the list from which the control data was originally taken.

The control device

While the machine of the present invention and the principles involved therein may be applied to the formation of many different types of control devices, the present embodiment of the machine of the present invention is particularly adapted and designed for the formation of coded numerical control data upon control devices 63 which, in addition to their control function, are also adapted to be used in printing operations, and which may, in accordance with known principles, be employed to carry additional control or identifying means to facilitate automatically performed sorting, selecting and similar control operations.

The control device 63 for which the present machine 60 is particularly designed and adapted is illustrated in detail in Figs. 3, 4 and 5 of the drawings, and is of the construction shown and claimed in United States Patent No. 2,132,412, patented October 11, 1938. Because of the multiplicity of functions of this particular control device 63, it is generally referred to in the trade and in the aforementioned patent as a "printing and control device," but since the printing aspect of the control device 63 has no particular bearing upon the function or operation of the machine of the present invention, the device 63 will be herein termed merely a "control device" in most instances, and particularly in the appended claims.

The control device 63 as shown in Figs. 3, 4 and 5 of the drawings is in a functional sense divided into several areas or sections, one of which constitutes the printing means, a second the index means, and a third the control means or control area. In the particular form herein disclosed each device 63 comprises a carrier or frame 80 formed from sheet metal. Means is provided on the lower half of the frame 80 for removably retaining a metallic printing strip or plate 81 on one face of the frame 80. Such means includes a bead 82 formed by reversely curling the lower edge of the frame, and this bead engages the lower edge of the printing plate 81. A plurality of aligned retaining devices 83 are positioned on the frame 80 to overlie the upper edge of the plate 81. Yieldable, depressible tongues 84 are formed in the frame 80 to releasably engage the end edges of the printing plate 81. The tongues 84 as herein shown are preferably each provided with a boss 85 to engage complemental notches 86 formed in the ends of the printing plate. Along its opposite ends, the frame 80 has spacing flanges 80' formed so as to extend rearwardly from the frame as shown in Figs. 4 and 32.

At its upper edge the frame 80 has a reversely bent flange or bead 87 which cooperates with retaining devices 88 struck from the frame 80 to removably secure an index and control card 90 in position on the upper half of the frame. The index and control card at its left-hand end provides an indexing area 90', and this indexing area 90' of the card 90 may, if desired, be formed separately from the right-hand end or control area of the card. Suitable latching bosses 91 are struck from the frame 80 to engage opposite ends of the control card 90 to retain the same in the proper endwise relation on the frame.

The printing plate 81, prior to its mounting on the frame 80, has printing characters embossed thereon so that the printing of data such as a name and address, indicated at 92 in Fig. 3, may be performed through the use of the printing plate 81. Other data may, of course, be embossed on the printing plate as desired, and such embossing operations may be performed with an embossing machine such as that illustrated and claimed in the patent to Joseph S. Duncan, No. 1,518,904. After the printing plate 81 has been completed and mounted on the frame 80, the name and address, and any other printing data carried by the plate 81, or any selected portion of such printing data, are printed from the embossed type of the printing plate 81 onto the index section 90' of the card 90, which is then mounted on the frame 80.

As explained in the aforesaid Patent No. 2,132,412, the control area of the control card 90 is adapted to have formed thereon mechanical or physical representations of information or data which may serve to control the operation of different types of mechanism. Thus data may be represented in the control area or card 90 by positional arrangements of holes 95 therein, as for example, in accordance with the five-element code illustrated in Fig. 6 of the drawings. Such mechanically represented data may be utilized to control a variable printer such as that shown in Patent No. 2,132,411, patented October 11, 1938, the punching machine shown and claimed in Patent No. 2,132,413, patented October 11, 1938, or as a further example, in the machine shown in co-pending application, Serial No. 221,841, filed July 28, 1938, as well as many other types of machines or devices.

While the frame 80 beneath the control area of the card 90 may be initially formed as an imperforate metal sheet, and the openings 95 punched simultaneously through both the card 90 and the frame 80 in the preparation of the control device, I have found that the adjustment of the punching mechanism is simplified and the useful life of the punches is prolonged by providing openings 95' in the frame 80, as shown in Figs. 4 and 5, at all of the possible positions at which openings or holes 95 may be punched in the formation of the various elements of the code of Fig. 6. Thus where the control device is adapted to bear representation of a five-order number, five vertically extending rows of openings 95' are initially formed in the plate during the manufacture thereof, these rows being disposed so that in the formation of the control device the desired openings 95 are formed in the card 90 in alignment with the corresponding holes 95' in the plate. Since the code for which the present machine is designed contains five elements, each of these rows contains five holes or openings 95'.

The particular positional or columnar relation of the several characters of the control data on the control area is, of course, predetermined by the construction and relation of the means provided to sense the control area in the machines with which the control devices are to be used. In any event, it is usually desirable that the control data be located in a predetermined tabular or columnar relation on the control area of the card 90, and that the same sequence or, alternately, a reverse sequence of characters be maintained in the control area as is present in the control data represented on the list.

As a matter of convenience in checking or verifying the control data after the formation thereof, I prefer to arrange the control data so that the worker, while holding the device 63 in position to read the index section 90', may verify the successive characters of the control data by reading from left to right in the same sequence as these characters normally appear on the list from which the control data is taken. Such positioning of the control data being desirable, the last or right-hand character of such data should be located in a predetermined columnar relation adjacent the right-hand edge of the control card, such right-hand columnar relation or position constituting the units order position in those instances where the control data is numerical in character. With this columnar positioning the timing, calculating or other machine with which the control device is subsequently used is properly operated and controlled.

*The punching mechanism*

The punching mechanism 66 of the present machine which operates upon the control device 63 at the punching station 62 is located principally within the forward half of the housing 67 with the operative punching elements exposed for operation on the control device in the forward portion of the housing. Thus the housing 67 is formed with an elongated, forwardly-opening recess 100 extending horizontally along the forward side of the portion 70 of the housing. The punching mechanism is mounted on a base 101 within the housing 67, as shown in Figs. 7 to 11 and 18 to 21, and comprises an upwardly projecting standard 102 (Fig. 19) fastened by bolts 103 to the base 101 and extending upwardly through the recess 100. The standard 102 is generally plate-like in form and is disposed in a vertical plane lying perpendicular to the forward edge of the machine. The standard 102 has a horizontal slot 104 cut therein so as to extend rearwardly from the forward edge of the standard, this slot 104 constituting a throat into which a control device 63 may extend so as to position the control area of the card 90 between the male and female elements of punches P which are carried by the standard 102. Since the code for which the present machine is adapted contains five characters or elements, there are five punches P (Figs. 11 and 20) disposed for longitudinal vertical movement in a vertical plane extending from front to rear of the machine, and the shiftable male elements 105 of the punches are guided for such vertical movement in a guide block 106 secured to the standard 102 along the right-hand (Fig. 19) upper edge of the throat 104. The complemental female members 105" of the punches are formed in a block 107 secured as by screws 108 to the standard 102 beneath the block 106, and along the lower right-hand side of the throat 104.

The control devices 63 are supported at the punching station 62 between the punching elements in proper relation thereto and are advanced through the required step by step movements by means of a punch carriage 110 which is supported and guided on a transversely extending rail 111, mounted and secured upon the standard 102 beneath the throat 104 by means such as screws 112. The punches 105 are supported and actuated by means such as a bell crank 115 mounted on a pivot 116 carried in bearing lugs 117 which project to the left from the standard 102 in Fig. 10. The bell crank 115 has an arm 118 projecting to the right in Fig. 19 through an opening 119 in the standard 102 and at the projecting end of the arm 118, which is located substantially over the guide block 106, the arm 118 carries a depending bail 120 which is pivotally mounted as at 121 on an axis parallel to the pivot pin 116. The bail 120 has an upper cross bar 122 formed integrally therewith and has a lower horizontal cross bar 123 removably secured thereto as by screws 124 in downwardly spaced relation to the cross bar 122, thereby forming an opening or slot 125 between the cross bars 122 and 123. Each punch 105 is slidable vertically through a properly positioned bore 126 in the lower cross bar 123, each bore 126 being counterbored at its upper end to receive an enlarged head 127 of its punch and thereby limit the downward travel of the punches 105 with relation to the bar 123. The counterbores and the heads 127 are so related that when the punches 105 are in their lowermost positions with relation to the bar 123, the upper surface of the heads 127 are located in the plane of the upper surface of the bar 123. Thus it will be evident that when the bell crank 115 is rocked in a clockwise direction, the punches 105 will be allowed to drop downwardly through their guide block 106, and if a card 90 of a control device is encountered, downward movement of the punches 105 will be stopped and the bail 120 with its upper and lower cross bars 122 and 123 will idle downwardly along the punches 105 so that the punches 105 are not effective to perform a punching operation.

When punching action of the punches 105' is desired, suitable blocking means is interposed between the heads of one or more of the punches 105 and the upper cross bar 122 of the bail 120. Such blocking action or selecting action is attained in the present machine by means of a plurality of generally horizontal selector bars 130, each having a blocking head portion 131 positioned in the clearance slot 125. These selector bar head portions 131 are normally positioned to the right of the punch heads 127, as shown in Fig. 19, and are guided for the requisite sliding movement by a comb-like guide bar 132 carried on the bail 120. When a selected punch 105 is to be operated through a punching stroke, the related selector bar 130 is moved to the left in Fig. 19 to locate its blocking head portion 131 in its active blocking position over the punch head 127. Such positioning of the associated selector bar 130 results in the transmission of motion from the upper cross bar 122 to the punch.

Under some circumstances, vibration of the machine may tend to cause upward displacement of the punches 105 to positions wherein left-hand movement of the selector bars 130 would be prevented. To avoid such action the punches 105 are preferably provided with frictional detent means tending to maintain them against undesired displacement. Such means as herein shown constitutes a plurality of detent pins 128 extending horizontally through the guide block 106 as shown in Fig. 19 so that the left-hand or inner end of each detent pin 128 engages a longitudinal slot 128' formed on each punch 105. The detent pins 128 are maintained in frictional restraining contact with their punches 105 by a comb-like spring 129 secured to the right-hand face of the guide block 106 as shown in Fig. 19.

The punch operating means

The punches 105 are operated through a punching stroke or an idle stroke by force supplied to the other arm 133 of the bell crank 115, this arm 133 extending downwardly from the pivot 116 on the left-hand side of the standard 102, as shown in Fig. 19 of the drawings. In order that the arm 133 may clear the rear edge of the control device 63 and the carriage 110, it is curved rearwardly as indicated at 133' in Figs. 10, 19 and 21. Actuating power is applied to the arm 133 of the bell crank at the lower end of the arm, and this power is derived in the present instance from a solenoid actuator 135 which is best shown in Fig. 21 of the drawings. The solenoid 135 has an armature 136 which is connected by means of a link 137 to an arm 138 of a bell crank 139 pivoted at 140 on the upper side of the base 101. The pivot 140 is, as shown in Fig. 19, mounted in an upstanding lug 141 formed on a lateral or left-hand base section 141' of the standard 102, this base section 141' being provided integrally on the standard 102 to insure the necessary rigidity and vertical positioning of the standard 102. Suitable openings are, of course, provided for the link 137 to pass through the base 101 and the base section 141'. The arm 138 of the bell crank 139 extends to the left and generally horizontally with relation to the pivot 149 (as shown in Fig. 19) and the bell crank 139 has an upwardly extending arm 142 which is operatively connected to the lower end of the arm 133 of the bell crank 115. This connection is, in the present instance, in the nature of a pin and slot connection, the arm 142 having a longitudinal slot 143 in its upper end to engage a roller 144 fixed on the lower end of the arm 133. Thus when the armature 136 of the solenoid is drawn downwardly, the bell crank 139 is rocked in a counterclockwise direction, and this movement is transmitted through the pin and slot connection to the arm 133, thereby to impart a clockwise rocking movement to the bell crank 115. Thus the bail 120 of the punch is shifted downwardly, and if one or more of the selector bars 130 are in such positions that their blocking ends 131 are located over the heads 127 of their associated punches 105, such punches will be moved or actuated through a punching operation. In the event that no selector bar has been positioned in its active or left-hand position of Fig. 19, the bail 120 will move idly downwardly through what may be termed an idle stroke, as hereinbefore described.

The bail 120 of the punch is maintained in its lower or actuated position only so long as the solenoid 135 remains energized, and when the solenoid is deenergized, the armature is returned to its elevated position of Fig. 19 by means such as a contractile coil spring 145 which is connected between the link 137 and an anchoring rod 146 which is carried by and projects from the standard 102.

The punch carriage

As an incident to the punching operation, the carriage 110 is shifted from one position to another longitudinally or across the front of the machine with a step by step action, and means is provided for supporting, guiding and controlling the carriage in such operation. The carriage 110 as herein shown is supported and guided on the guide rail 111, and comprises an elongated rectangular bar 150 (Figs. 11 and 18) which rests in and is guided by a longitudinally extending upwardly facing guideway or groove 151 formed in the upper face of the guide rail 111. At spaced points the bar 150 carries a pair of transverse supporting devices 153 and 154 which are secured upon the top of the bar 150 by screws 155. These supporting devices 153 and 154 extend in a direction disposed from front to rear of the machine and are so spaced with relation to each other that the end edges of a control device 63 will fit into slots 153' and 154' which are formed in the opposed edges of the supporting devices 153 and 154, respectively. Thus a control device 63 may be positioned in a horizontal plane and moved rearwardly into the supporting slots 153' and 154' of the carriage 110, and when so positioned the control device is held in place for the desired punching operations.

In order that a control device 63 may be easily mounted on the carriage 110, may be properly and accurately positioned thereon during the punching operation, and may be readily released and dismounted from the carriage, means such as that shown in Figs. 33 to 36, inclusive, is provided for mounting and positioning the control device on the carriage. As shown in Figs. 33 and 36, the groove 153' in the mounting device 153 is provided with a pair of rollers 156 which are mounted on vertical axes and extend slightly into the groove 153' at points spaced apart from front to rear of the carriage. These rollers 156 facilitate the insertion and removal of the control device 63 into and out of position on the carriage. The other or right-hand supporting device 154 is preferably of a hollow construction and has the groove 154' formed in its left-hand edge, as shown in Fig. 33. It will be observed that each control device 63 is provided with a notch 160 in its right-hand end, as viewed in Figs. 3 and 35, this notch 160 preferably being located adjacent the control area of the card 90, since this notch is utilized in assuring proper positioning of the control device with relation to the carriage 110. This desired positioning is attained by means of a pivoted dog 161 pivoted within the hollow mounting device 154 at 162. The dog 161 has a pointed end 163 remote from its pivot 161, and by engagement of the point 163 with the notch 160 the control device 63 is positioned properly and accurately in a direction from front to rear of the machine. By pressing the pointed end 163 firmly into the notch 160 the other or left-hand end of the control device 63 is pressed accurately and firmly against the two points of contact provided by the guide rollers 156, so that the control device is also accurately positioned in an endwise direction.

Such operative engagement of the dog 161 with the control device 63 is effected by means of a cam surface 164 on a slidable plunger 165 mounted for movement within the supporting device 154 in a direction extending from front to rear of the machine and parallel to the adjacent slot 154'. The cam surface 164 is so formed that in a movement of the plunger forwardly of the machine from the position shown in Fig. 35 to the position shown in Fig. 33, it engages a complemental cam surface 166 formed on the dog 161 adjacent the point 163 so as to urge the dog in a clockwise direction about its pivot 162 and toward its operative engaging relation to the control device which is to be positioned thereby. The plunger 165 is normally urged in a forward direction by means such as an expansive coil spring 167.

Normally, when the carriage 110 is unloaded, the plunger 165 is locked in its retracted or rearward position by a lug 168 carried on a pivoted arm 169, this lug 168 being engageable with a sloping latch surface 170 formed on the plunger 165. The manner in which such engaged relation is attained is shown in Fig. 35, while the released relation of the lug 168 is shown in Fig. 33 of the drawings. The lever 169 is in the nature of a bell crank pivoted on the supporting device 154 at 171, the lug 168 being formed on one arm of the lever 169 and the other arm 172 of the lever 169 extending from the pivot 171 to the left in Fig. 33 and out of the hollow supporting member 154 as shown in Figs. 33 to 35. The end of the arm 172 extends from the device 154 adjacent the top thereof, as shown in Fig. 34, and is operatively positioned in the path of the control device 63 when such control device is being inserted into the slots 153' by means of a downwardly extending lug 172' shown in Fig. 33. The arm 172 is normally urged to the forward position of Fig. 35 by means of a spring 173 mounted within the hollow supporting device 154 and when the carriage is unloaded, the parts occupy substantially the positions illustrated in Fig. 35.

When, however, a frame or control device 63 is moved rearwardly into the mounting slots of carriage 110, the lug 172' is engaged by the control device in its rearward movement (Fig. 35) and the arm 172 is thereby rotated about its pivot 171 in a clockwise direction so as to release the plunger 165 and permit forward movement of the plunger by its actuating spring 167. As the plunger 165 moves forwardly, its cam 164 acts upon the opposed cam 166 of the dog 161 and holds the pointed end 163 of the dog against the end edge of the control device as the movement of the control device progresses rearwardly from the position of Fig. 35 to the position of Fig. 33. When the control device has been shifted to the position of Fig. 33, the pointed end 163 of the dog moves immediately into the notch 160 so as to prevent further rearward movement of the control device and accurately position the control device on the carriage 110. The pointed end 163 of the dog 161 thereafter holds the control device 63 in the desired position on the carriage 110 against the constantly-exerted forwardly-directed force applied to the control device by the arm 172 and its spring 173.

After completion of the desired punching operations the control device 63 may be released and discharged from the carriage 110 merely by rearward actuation of the plunger 165, and to facilitate such actuation of the plunger a finger piece 175 is provided on the forward end of the plunger, this finger piece 175 extending somewhat beyond the principal forward wall of the housing 67. In the rearward releasing movement of the plunger 165 the cam 164 is moved rearwardly from the active position of Fig. 33 to the inactive position of Fig. 35, with the result that the dog 161 is free to move in a counterclockwise direction. Bearing in mind that the arm 172 exerts a constant forwardly-directed force upon the control device 63, it will be evident that the release of the dog 161 by the cam surface 164 will cause the sloping surface of the notch 160 to exert a cam action upon the dog 161. The control device 63 is thereby released from the restraining action of the dog 161 and the spring actuated arm 172 imparts an unloading action to the control device 63 so as to move the control device to an exposed or forwardly extending relation to the carriage 110, in which extending relation the control device may easily be grasped and withdrawn by the operator. This unloading action takes place quite rapidly so that the counterclockwise movement of the lever 169 positions the lug 168, as shown in Fig. 35, in the forward path of the restraining shoulder 170, and as a result the plunger 165, upon release thereof by the operator, moves forwardly for a short distance from its position of Fig. 35, until the shoulder 170 engages the lug 168, so that the plunger 165 is locked in a rearward position as an incident to the unloading of a control device 63, and the carriage mechanism is thereby conditioned for the next loading operation.

The elongated bar 150 of the carriage 110 is held downwardly in its guiding groove 151 by means which extends through a longitudinal slot 180 formed at the bottom of the guiding groove 151 centrally of said groove, as shown in Figs. 17 and 21. As shown in these figures the retaining means comprises a block 181 positioned slidably in the slot 180 and having means such as a bar 182 secured to its lower face so as to engage a widened or shouldered portion 183 of the slot 180 to prevent upward movement of the block 181 and the bar 150, these three members being fastened together by means such as screws 184, as indicated in Fig. 17.

The carriage 110 is normally biased in a left-hand direction, as shown in Fig. 18, by means such as a spring-biased rotative device 185 which has a flexible connecting tape 186 extending therefrom and detachably connected to the bar 182 by a fastening means 187. The biasing action of the spring device 185 upon the carriage 110 is controlled by an escapement mechanism 190 (Figs. 8, 18 and 21), so that during a punching operation the carriage 110 is maintained stationary, and upon completion of the punching operation is advanced in an amount equal to the desired columnar spacing of the physical representations of the various digits of the control data. The carriage 110 may be shifted to the right against the tension of the spring device 185 by a manual finger piece 191 which depends from the forward end of the supporting device 153 of the carriage, and the columnar position to which the carriage is shifted is indicated by a pointer 192 extending upwardly from the carriage and cooperating with an indicating scale 193 mounted on the housing section 70 immediately over the upper edge of the recess 100. The carriage 110 is maintained in the set position by the escapement mechanism 190.

The controlled advancing movement of the punch carriage 110 after the completion of a punching operation is, in the present instance, attained by utilizing the return movement of the lower end of the lever 133 in a right-hand direction to impart character spacing actuation to the escapement mechanism 190. Such movement of the lever 133 is utilized to actuate a rock shaft 200 by means shown in Fig. 19 to impart a rocking movement to a cam device 201 which actuates the escapement mechanism 190. The cam 201 is carried by the rock shaft 200, and as a preliminary to the description of the cam 201 and the actuation thereof, the specific construction of the escapement mechanism 190 will now be described. This escapement mechanism 190 comprises a plurality of ratchet teeth 203 formed of the proper size upon the lower face of the retaining bar 182 of the carriage and a pair of pawls 204 and 205, these pawls being in the nature of bell cranks pivoted on a common axis on the lower side of the guide rail 111. The bell crank which forms the pawl 204 has one arm terminating in a pointed end 204' for engagement with the teeth 203 of the ratchet, and the other arm 204" of the bell crank 204 extends generally downwardly and to the left and has a cam surface or follower portion 206 formed thereon and normally engaged with a cam surface 207 formed on the cam device 201. A spring 208 normally maintains the follower portion 206 in engagement with the cam surface 207, and in the normal rotative position of the cam 201, as shown in Fig. 18, the pointed end 204' is engaged with one of the ratchet teeth 203.

The other pawl 205 has a corresponding pointed end 205' which is displaced in a left-hand direction in Fig. 18 a distance equal to substantially one-half spacing of the ratchet teeth 203, and the pointed end 205' is normally maintained out of engagement and out of the path of the teeth 203. The other arm of the bell crank 205 extends downwardly generally parallel to the arm 204' and has a follower surface 209 which also engages the cam surface 207 and is held in engagement therewith by a spring 201', as indicated in Fig. 21. The relationship of the cam follower portion 209 to the cam surface 207 is such that the pointed end 205' is maintained out of engagement with the ratchet teeth when the cam is in the normal rotative position of Fig. 18. It will be observed in Fig. 18 that the follower portion 209 engages the lower or most remote portion of the cam surface 207, this cam surface being formed by cutting away substantially one-half of the enlarged cam head 201 (see Fig. 21). Thus the cam surface 207 as herein shown lies in a plane passing through the rotative axis of the cam 201. The follower portion 206, however, engages the cam surface 207 adjacent the axis of the cam and when the cam is rocked in a counterclockwise direction in Fig. 18, the cam surface engages the follower surface 206 and rocks the pawl 204 in a clockwise direction, thereby disengaging the pointed end 204' from the ratchet teeth 203. This disengaging action is somewhat delayed since the cam has a slight idle movement until such time as the cam surface 207 moves to a position parallel to the surface 206, and during this time the remote point 207' (Fig. 18) controls the pawl 205 to move its pointed end 205' into the path of the ratchet 203 with which the pawl 204 is then engaged. Therefore, as the pawl 204 is withdrawn, the carriage 110 advances until this same ratchet tooth 203 engages the pawl 205. Then, as the rock shaft 200 is allowed to return in a clockwise direction toward the position of Fig. 18, the pawl 204 moves upwardly so as to be engaged by the succeeding ratchet tooth 203 when the pawl 205 is withdrawn. Such clockwise or return movement of the shaft 200 is effected by a spring 210 acting on an arm 210' which projects downwardly from the shaft 200, as shown in Figs. 19 and 21, the spring 210 being secured at its other end to an anchor pin 210" which projects upwardly from the base portion 141'. The counterclockwise motion imparted by the spring 210 terminates in a normal position of Fig. 19 by abutment of an arm 211 (Fig. 19) which moves into abutment with a stop pin 211'. The stop pin 211' is mounted on and projects horizontally from one of a plurality of upstanding bearing members 212 which are formed on the base member 141' and serve to support the shaft 200.

The desired counterclockwise actuation of the rock shaft 200 from its normal position of Fig. 19 is obtained in proper timed relation by actuating means carried on the lower end of the arm 133 of the bell crank 115, this means being arranged to act upon the tooth-like end of the arm 211. Generally considered, this actuating means comprises a trigger-like latch 213 which engages the arm 211 when the lower end of the arm 133 moves to the left in Fig. 19 in a punching operation, the latch member 213 serving in the return or right-hand movement of the arm 133 to move the lower end of the arm 211 to the right and thereby rock the shaft 200 in a counterclockwise direction. The latch member 213 is pivoted at 213' on a mounting plate 214, this mounting plate being secured by screws 214' on the forward side edge of the arm 133, as shown in Figs. 19 and 21. The latch member 213 has one arm 215 which projects to the left in Fig. 19 and has a hook-like end 215' adapted to engage the lower end of the arm 211. Another arm 216 of the latch member 213 extends generally downwardly and a spring 216' acts between the arm 216 and the lower end of the mounting plate 214 to urge the latch member in a clockwise direction such that it tends to move its hook-like end 215' toward engaging relation with respect to the arm 211. Thus, when the lower end of the arm 133 moves to the left from the position shown in Fig. 19, the end of the arm 215 cams past the lower end of the arm 211 until the shoulder or hook-like end passes the lower end of the arm 211. Further clockwise shifting of the latch member 213 then engages the hook-like shoulder 215' with the arm 211 so that upon return movement of the lower end of the arm 133 to the right, the shaft 200 will be rocked in a counterclockwise direction. As the lower end of the arm 133 approaches the end of its right-hand movement as determined by an adjustable abutment screw 133", an upwardly extending arm 217 on the latch device 213 engages an adjustable abutment device 218 so as to rock the latch device in a counterclockwise direction against the force of its spring 216', thereby to release the arm 215 from the arm 211 and allow the shaft 200 to be returned to its normal position by its spring 210. Thus the desired character spacing movement of the carriage 110 is automatically effected during the terminal portion of the punching operation, that is, during the terminal of the return or withdrawal movement of the punches.

*Coded punch selection*

For the purpose of selectively determining the particular punches 105' which are to be operated in each cycle of the punching mechanism, the keys 68 of the keyboard 69 are employed and by actuation of these keys the positioning of the selector bars 130 is controlled. As shown in Figs. 9, 11, 17 and 22, the present keyboard has eleven keys thereon, there being nine keys 68 pertaining to the several significant digits from 1 to 9, inclusive, a key pertaining to zero, and a key 68' which constitutes a spacing key. This spacing key finds its primary use in the present device in effecting an idling stroke of the punching mechanism so as to space the carriage one space to the left after an incorrect initial setting or tabulation of the carriage 110. The several keys 68 and 68' are carried on the forward ends of key supporting levers 220 by means of stems 221 which project upwardly through guide openings in the top wall 222 of a relatively small forward extension 223 of the housing. This extension 223 serves to enclose the forward ends of the key levers 220. The key levers 220 extend rearwardly in a generally horizontal direction and are pivotally supported on a common mounting shaft 224 which has a plurality of spacing sleeves 225 thereon to maintain the levers in the desired spaced relation on the shaft. The shaft 224 is mounted in a supporting bracket 226 which is secured on the mounting plate 101 as indicated in Figs. 9 and 19. This supporting bracket has upstanding side walls 227 in which the shaft 224 is mounted. Rearwardly of the shaft 224 a plurality of springs 228 are connected between the mounting member 226 and the rearwardly projecting portions of the levers 220, the springs 228 serving to bias the rear ends of the levers 220 downwardly and thereby normally urge the keys 68 to their elevated positions of Fig. 11. As is best shown in Fig. 37, the several levers 220 are, in effect, interlocked by a plurality of balls 230 mounted directly beneath the forward end portions of the levers 220, these balls being supported in a longitudinal bore 231 in a stationary race member 232. The top 233 of the race member is integral and has slots therein through which the levers 220 may move downwardly toward the balls 230. One end of the race 232 is closed by an adjustable screw-threaded plug 234 and a lock plug 235 so that the spacing of the balls 230 may be accurately adjusted. This adjustment is such that when one of the levers 220 is depressed to the position indicated by the showing of the left-hand lever in Fig. 37, the balls are spread apart beneath the depressed lever and are forced tightly against each other at all other points in the race 232, thereby to block all of the other levers 220 against downward actuation.

When any one of the number keys of the keyboard is depressed, it must serve to cause actuation of the punching means in accordance with the code of Fig. 6 and to accomplish this purpose means is provided for causing appropriate actuation of the proper selector bars 130. To this end a plurality of transmitting levers 240 are mounted on the shaft 224 for actuation by the key supporting levers 220. For the purpose of differentiating the several punches, the several selector bars 130 and the several transmitting levers 240, I will herein apply or add the differentiating letters a, b, c, d and e to the reference numerals designating these various parts. Thus the forward punch 105 will be designated 105a, the rear punch will be designated 105e and the intermediate punches will be designated with similar numbers in appropriate order.

Thus the transmitting lever 240a is mounted on the shaft 224 and projects forwardly therefrom between the mounting levers 220 of the "1" key and the "2" key; the transmitting lever 240b is mounted between the "3" key and the "4" key in the same manner; the transmitting lever 240c is mounted between the "5" key and the "6" key; the transmitting lever 240d is mounted between the "7" key and the "8" key; while the transmitting lever 240e is mounted on the right-hand side of the supporting lever of the "9" key. The several transmitting levers 240 extend for a short distance rearwardly of the shaft 224 and are provided with springs 228' which act upon the transmitting levers to bias their forward ends upwardly in a manner similar to the operation of the springs 228.

Figure 16:
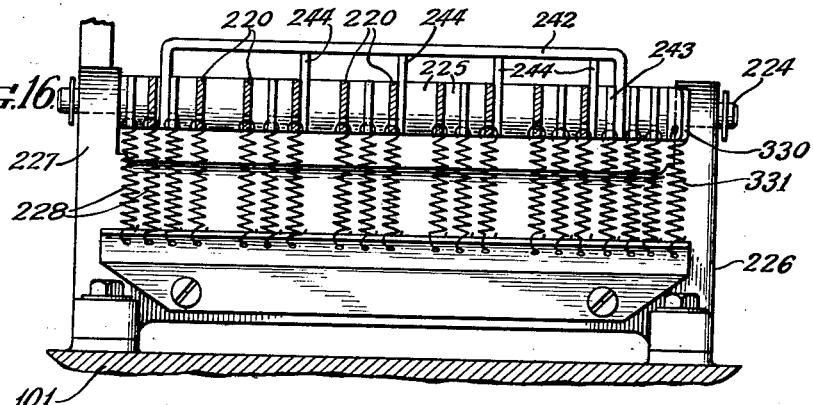
Fig. 16 is a fragmental transverse sectional view taken along the line 16—16 of Fig. 11.

As will hereinafter be described in detail, the transmitting levers 240 are operable to actuate the selector bars 130 from their inactive positions of Fig. 19 to an active position indicated in dotted outline in Fig. 19, and provision is therefore made for actuation of the transmitting levers 240 by the keys 68 in accordance with the code shown in Fig. 6. To this end the transmitting lever 240e is provided with a bail portion 242 which extends from the rear end of the transmitting lever 240e upwardly for a short distance, as shown in Figs. 11 and 16 and then to the left in Fig. 16 so as to overlie all of the key-supporting levers which pertain to numeral keys, rearwardly of the shaft 224. At its left-hand end in Fig. 22, the bail portion 242 is connected to a relatively short lever 243 which is pivoted on the shaft 224 and extends rearwardly therefrom in a manner corresponding to the rearwardly projecting end of the transmitting lever 240a. The upward spacing of the bail portion 242 with relation to the key-supporting levers 220 pertaining to the even numbered keys is such that the even numbered keys may be moved through their normal stroke without contact with the bail portion 242. As to the odd numbered keys, however, it will be noted in Figs. 11 and 16 that an upward projection 244 is provided on their supporting levers 220 beneath the bail portion 242, such projections being provided on the key-supporting levers pertaining to the "1," "3," "5" and "7" keys. Thus when any one of the keys of this odd numbered group is actuated, the projection 244 thereof engages the bail portion 242 so as to actuate the transmitting lever 240e in a counter-clockwise direction, as viewed in Fig. 11.

The other transmitting levers 240a, 240b, 240c and 240d are actuated from the appropriate key-supporting levers 220 through the medium of lugs 245 which are carried by the forward ends of the transmitting levers so as to underlie the forward ends of the appropriate key-supporting levers 220. Thus the transmitting lever 240a has lugs 245 projecting in opposite directions laterally therefrom, as shown in Figs. 18 and 22, so as to underlie the key-supporting lever 220 of the "1" key on the left-hand side and the key-supporting lever 220 of the "2" key on the right-hand side. Similarly, the transmitting lever 240b has lugs 245 underlying the supporting levers of the "3" key and the "4" key; the transmitting lever 240c has lugs 245 underlying the supporting levers 220 of the "5" key and the "6" key; the transmitting lever 240d has lugs 245 underlying the supporting levers 220 of the "7" key and the "8" key; while the transmitting lever 240e has a lug 245 on its left-hand side only, as shown in Fig. 18, so as to underlie the supporting lever 220 of the "9" key.

With this construction the depression of an even numbered key merely causes actuation of its directly associated transmitting lever 240, through the medium of the lug 245 which underlies the supporting lever of the depressed key, while the depression of an odd numbered key produces a similar actuation of the associated transmitting lever 240, and additionally functions through its upward projection 224 and the bail portion 242 to cause simultaneous actuation of the transmitting lever 240e which may also be termed the "9" transmitting lever. Thus the actuation of the various transmitting levers 240 by the number keys 68 is effected in accordance with the five-unit number code of Fig. 6.

Operating impulses are transmitted from the transmitting levers 240 to the appropriate selector bars 130 by means such as a plurality of Bowden cables 250, one of which is operatively connected between each transmitting lever 240 and the corresponding selector 130. Thus, as shown in Figs. 11, 18 and 22, the left-hand lug 245 of each transmitting lever 240 overlies a vertically slidable plunger 251 mounted in a suitable bore in the supporting bracket 226, and each plunger 251 is operatively connected to the wire 250' of its Bowden cable. Each Bowden wire 250' extends through its enclosing and guiding tube or sheath 250'' to a point of operative connection with the appropriate selector bar 130. In order to distinguish the several Bowden cables and indicate the punch 105 with which it is associated, these cables will also be distinguished by the use of the added reference characters *a* to *e* in association with the reference numeral 250. Thus the five Bowden cables are led downwardly from their connection in the mounting bracket 226 and then upwardly through an opening 252 in the base 101 and the sheaths 250'' thereof are secured by screws 253 in a bracket 254 which is mounted on the top of the right-hand wall of the bracket 226, as shown in Fig. 19. The ends of the sheaths 250'' extend into bores in the bracket 254, and each bore has a plunger 255 therein which is engaged and actuated upwardly by the end of the associated Bowden wire 250' when the opposite end of the wire is actuated downwardly by its plunger 251. This upward movement of each plunger 255 is transmitted to the appropriate one of the selector bars 130 by means of an associated bell crank 260. Five of these bell cranks are provided and a supporting pivot 261 is provided therefor, the pivot 261 being mounted in spaced upstanding lugs 262 formed on the bracket member 254 somewhat to the left of the location of the plungers 255. One arm 263 of each bell crank extends upwardly from its pivotal axis 261 and has a pivoted connection 264 with the appropriate selector bar 130, the length of the arm 263 being such that the selector bar is supported in a substantially horizontal position. The other arm 265 of each bell crank 260 extends to the right in Fig. 19 so as to overlie the appropriate plunger 255, with the result that upward actuation of a plunger 255 rocks the associated bell crank 260 and shifts the associated selector bar 130 from the full-line position of Fig. 19 to the dotted-line position there shown. When the selector bar is in this dotted-line position, the associated punch 105 will be actuated when the bell crank 115 is operated.

In order that the shifting of the selector bars 130 may be positive in character, means is provided for yieldably retaining each selector bar in either its active or its inactive position. This means comprises a plurality of detent levers 270, the upper ends of which are pivoted at 271 in an upstanding portion 272 of the bracket 254. One such lever 270 is provided for each of the five bell cranks 260 and each detent lever 270 has a pair of detent notches 273 formed therein for selective engagement with the somewhat pointed end of the arm 265 of the associated bell crank 260. A comb-like spring 274 mounted on the upwardly projecting mounting portion 272 serves to urge the several detent levers 270 into operative engagement with their associated bell cranks 260, and the positioning of the detent notches 273 is such that when the associated selector bar 130 is in its inactive position of Fig. 19, the end of the arm 265 will be engaged with the lower detent notch 273, while when the associated selector bar 130 is in its active or dotted-line position of Fig. 19, the end of the arm 265 will be engaged with the upper detent notch 273. Thus, the shifting of a selector bar 130 from its inactive position to its active position requires the exertion of a substantial upward force through the associated Bowden cable and its plunger 255, and when such substantial actuating force has been exerted and the selector bar has been shifted to its active position, the actuated selector bar 130 will be maintained in this actuated or active position by its detent 270.

In order to restore the selector bars 130 to their inactive position upon the completion of a punching operation, means is provided for positively rocking the bell cranks 260 in a clockwise direction at the end of the punching cycle. This restoring means comprises a bail 280, shown in Figs. 7, 8, 9, 18 and 19, this bail being pivoted on a shaft 281 supported in the mounting bracket 254 beneath the pivotal axis 261. The bail 280 has a cross member 280' which overlies the arms 265 of the selector bar actuating bell cranks 260. The rearmost side member of the bail 280 has an arm 282 extending downwardly therefrom on the inside of the mounting wall 227, as shown in Fig. 19, and at its lower end is pivotally connected to a link 284. This link 284 extends horizontally to the left in Fig. 19 through an opening 285 in the standard 102 and is pivotally connected at its other end to an arm 286 which is connected to and extends upwardly from the rear end of the shaft 200. Preferably, the link 284 has adjustable connections 287 at its opposite ends whereby the effective length of the link may be adjusted. Since the link 284 is connected to the rock shaft 200, the spring 210 acts normally through the shaft 200 to urge the link 284 to the right in Fig. 19. Thus the bail 280 is normally maintained in the elevated position of Fig. 19, but in the terminal portion of a punching operation, the bail 280 is rocked about its pivot 281 in a clockwise direction so that any of the arms 265 which may be in an elevated position in engagement with the associated upper detent notches 273 are positively forced downwardly by the bail 280, thereby to restore the associated selector bars 130 to their inactive positions. Such action takes place by reason of the fact that the rock shaft 200 is operated through a rocking movement at the end of each punching cycle, as hereinbefore explained.

The keyboard of the present machine has been described as having a zero key 68, such a zero key being unnecessary for the punching operations involved in the code shown in Fig. 6 of the drawings, but being essential in connection with the printing of a verifying number 65 in order that this verifying number may contain a printed representation of a zero wherever required. This zero key 68 of the present machine is arranged to actuate a right-hand lever 220*f* which corresponds in general form and arrangement with the key-supporting levers 220. The lever 220*f* at its forward end is pivotally connected at 290 to one end of a transversely-extending lever 291. This lever 291 extends transversely across the portion 223 of the housing and is pivotally supported at 292 (Fig. 22) within said housing. Intermediate its ends the lever 291 is engaged by a downwardly-extending member 294 which is secured to the stem of the zero key. Thus the zero key is supported on the lever 291 and by reason of the spring biasing action on the lever 220f, the zero key is normally maintained in its elevated position of Fig. 11.

As hereinbefore stated, the spacing key 68' is supported on a lever 220, this spacing lever being located to the left of the lever 220 which supports the "1" key.

Whenever any one of the numeral keys, the zero key or the spacing key is depressed, the solenoid 135 is energized so as to rock the punching mechanism through a working cycle. This controlling operation upon the punch solenoid is in the present instance attained by means which includes a pair of switches S1 and S2 and other circuit means and mechanism as will hereinafter be described. In order to attain this operation of the two switches whenever any one of the keys is depressed, a bail 300 is provided, mounted on the shaft 224 and having a cross member 301 which underlies all of the levers 220 and 220f immediately rearwardly of the plungers 251 of the Bowden cable assembly. The side members of the bail 300 extend rearwardly from the shaft, as indicated at 302, and biasing springs 303, similar to the biasing springs 228, act upon these rearwardly projecting ends 302 to bias the cross member 301 of the bail upwardly into operative contact with the several levers 220 and 220f. As shown in Figs. 11 and 19, the cross member 301 of the bail 300 overlies a vertically shiftable plunger 310, this plunger being mounted in a central bore 311 formed in a boss 312 projecting upwardly from the central portion of the mounting member 226. The plunger 310 is biased upwardly by a coil spring 313 mounted within the bore 311, and the plunger has a stem 314 which projects downwardly so as to engage the upper contact member of the switch S1. This switch S1, as herein shown, is of the spring contact type as is clearly illustrated in Fig. 11, and the upper contact member of the switch is arranged normally to assume the open upper position shown in Fig. 11. When the plunger 310 is moved downwardly by actuation of the bail 300, the switch S1 is closed.

The other switch S2 is mounted on the right-hand side of the machine, as shown in Figs. 7, 8, 17 and 22, there being an upstanding bracket 316 fixed upon the base 101 to the top of which the switch S2 is mounted. This switch S2 is also of the spring contact type, with the upper contact member thereof projecting horizontally and to the left beyond the lower contact member, so that the upper contact member overlies the right-hand lever of the bail 300. When the forward end of the bail 300 is in its normal elevated position, the switch S2 is maintained open, while depression of the bail 300 permits the upper member of the switch S2 to move downwardly into contact with the lower contact member, thus to close the switch S2 each time the bail 300 is actuated downwardly through the depression of one of the keys 68 or 68'.

While the lower edges of the several levers 220 might serve as the points of engagement for the cross member 301 of the bail 300, I have herein provided adjustable means whereby the engaging action of each key lever with the bail 300 may be adjusted individually. To this end each lever 220 has an angle bracket 320 fixed to its side immediately over the cross member 301 of the bail 300, each angle bracket 320 having a horizontally extending portion 321 through which an adjusting screw 322 is threaded in a downward direction. Suitable lock nuts 323 are provided on the adjusting screws 322. As shown in Fig. 19, the left-hand angle bracket 320 is carried on the lever 220 which supports the spacing key 68', and its adjusting screw 322' is relatively short and is so arranged that its lower end overlies the left-hand side member of the bail 300. The right-hand angle bracket 320 is secured to the supporting lever 220f of the zero key and has a relatively short adjusting screw 322' similar to the adjusting screw of the spacing key lever. The adjusting screw of the lever 220f overlies the right-hand side member of the bail 300. The other adjusting screws 322 are arranged to project downwardly past the other side of their supporting levers 220 so that the lower ends of these adjusting screws may be positioned or adjusted so as to contact and actuate the bail 300 somewhat prior to the normal actuation thereof which would be effected by engagement of the lower edge of the lever with the bail. Thus through the use of the adjusting screws 322, the action of the key supporting levers 220 on the bail 300 may be adjusted and the desired timing or "touch" of the keyboard may be attained.

*Units order safety device*

In the use of a punching device of this character, it is possible that an operator, when intending to punch representations of a number having, for example, four digits or orders, may inadvertently set or initially tabulate the carriage 110 at its "3" order position, so that as the successive digits of the number are punched, and the carriage 110 is advanced, the digit of the tens order of the control number will be punched in the units order position on the control device 63. The operator will, of course, then actuate the key pertaining to the units order of the desired control number so that the punching mechanism will again be actuated to form further physical representations in the units order position of the control device 63. Obviously, such an error would cause the incorrectly formed control device 63 to produce incorrect and undesired operation of any machine with which it is subsequently used. The present invention therefore provides means whereby the operator is warned when such incorrect tabulation or positioning of the carriage tends to produce such double or multiple punching in the units order of the control device 63. In the present machine this means serves additionally to prevent a second punching operation in the units order position on the control device. In the embodiment chosen for disclosure herein this means is associated with the key mechanism and is arranged to render the key mechanism inoperative after a single punching operation in the units order position of the control device.

To this end a safety lever 330 is mounted on the shaft 224 in the same general relation as the several levers 220, this lever 330 having a return spring or biasing spring 331 similar in form and function to the springs 228. The forward end of the lever 330 projects over the locking mechanism or ball race 231, as shown in Figs. 16, 18, 19, 22, 37 and 38. When the safety lever 330 is depressed from its normal position of Fig. 38 to the position of Fig. 37, the lever 330 moves downwardly between the end wall 332 of the ball race 231 and the left-hand ball 230, thereby to take up all of the available endwise play between the balls 230 and thereby prevent depression of any other of the keys 68. The safety lever 330 is actuated as an incident to the performance of a punching operation in the units order position of the carriage 110, and in the embodiment herein illustrated the actuating force employed to actuate the safety lever 330 to its operative or lowered position is obtained by operative association of the safety lever 330 with the shiftable punch carriage 110. Such operative association is herein obtained by so controlling the carriage 110 as to permit a slight movement of the carriage to the left at the end of the punching operation performed in the units order position of the carriage, this slight additional movement of the carriage 110 being employed to impart a downward actuating movement to the safety lever 330.

It will be evident in Fig. 18 of the drawings that when the escapement mechanism 190 is actuated during the terminal portion of the punching operation performed in the units order position of the carriage 110, the tooth 204' will be disengaged from the right-hand ratchet tooth 203, while the tooth 205' of the pawl 205 will be moved into position for engagement with this right-hand ratchet tooth 203. Thus, the carriage 110 is permitted to move through a distance equal to one-half the tooth spacing of the ratchet 203, and means is provided which is operated by the carriage 110 in such additional movement to actuate the safety lever 330 to its operative lower position. This means as herein shown comprises an arm 335 depending from the right-hand end of the carriage 110. This arm 335 has a flange 336 at its upper end which is positioned against and secured to the lower face of the bar 150, so that the arm 335 extends downwardly through the slot 180 in the mounting rail 111. At its lower end the arm 335 has an adjustable abutment screw 335' which in the slight additional movement of the carriage 110 to the left beyond its units order position is arranged to engage the upwardly projecting arm 338 of a bell crank 339. The bell crank 339 is mounted on a pivotal axis 340, this pivotal mounting being provided by a bracket 341 carried on the upper surface of a stop bar 342 which overlies the several levers 220 and 330 just rearwardly of the keyboard 69. The bell crank 339 has an arm 343 which extends to the left from the pivot 340 as shown in Figs. 18 and 37, so that its end portion overlies the safety lever 330. A downward extension 344 is provided at the end of the arm 343 so as to engage the safety lever 330 and still provide clearance for rocking movement of the bell crank to the position of Fig. 37. The downward extension 344 of the bell crank 339 is maintained in engagement with the safety lever 330 by means of a spring 345 acting between the safety lever 330 and a stud 346 which projects rearwardly from the arm 343 immediately over the safety lever 330. The safety lever 330 is, of course, biased so as to urge its forward end upwardly to the position of Figs. 18 and 38, such biasing action being imparted to the lever 330 by its spring 331. Thus the safety lever 330 and the bell crank 339 normally assume the inactive positions shown in Fig. 18, and are actuated to the operative positions of Fig. 37 only when the carriage 110 moves to the left beyond its units order position. When the carriage 110 is returned to the right so as to assume its units order position or some higher order position, the safety lever and its actuating bell crank 339 return at once to their inactive positions under the biasing action of the spring 331, thereby to unlock or release the keys and condition the punch for operation upon a succeeding control device 63.

The verifying means

After the punching of the control data upon a control device 63 has been completed, the control device is removed from the punch carriage 110 by actuation of the unloading plunger 175 and the control device is transferred to the verifying or printing position 64 at which a verifying number 65 is printed upon the control device in accordance with and corresponding to the punching operations which have just been completed on the control device. The verifying number 65 has its several significant digits printed in the same columnar relation on the control device 63 as the corresponding punched representations of these several digits, so that visual inspection of the printed verifying number 65 will enable the operator to determine whether or not the punched data has been formed in the proper columnar relation. The printed verifying number may also be compared with the list from which the control data was taken so as to determine whether or not the proper digits or numbers have been represented by the punching operations.

The verifying number 65 is printed on the control device 63, at the verifying position 64, by means of the variable printing mechanism PR which is housed principally within the upwardly projecting rearward portion 70 of the housing. This printing mechanism includes a plurality of selectively positionable type carriers 400 mounted on a shaft 401 which extends parallel to the path of movement of the punch carriage, there being one type carrier 400 for each of the possible orders or characters which may appear in the control data. In the present instance five such type carriers 400 are provided and each type carrier has a type segment 402 thereon in which a plurality of type members 403 are mounted for individual sliding movement in a direction which is radial with respect to the axis 401. The several type members 403 are adapted to be actuated by a hammer mechanism 404 to print from any selected and properly positioned type member 403 through an inking ribbon 405 onto the control card 90 of a control device 63, this control device being positioned at the verifying station 64 against a stationary platen 406.

The set-up mechanism

The several type carriers 400 of the variable printer PR are selectively positioned in the desired printing relation under the control of stop mechanism 408 which is set up as an incident to the operation of the punching apparatus, the stop mechanism 408 having a plurality of groups of stops 409 (Fig. 13), and each group of stops pertaining to a particular order of the control data or, more specifically, pertaining to a particular one of the type carriers 400. As the punch mechanism is operated to punch a coded representation of a digit in a particular order or columnar position on a control device, the stop mechanism 408 is set up in the corresponding order or columnar position of the variable printer. This selective set-up operation upon the stop mechanism 408 is attained through the medium of a shiftable set-up mechanism 410 mounted on a set-up carriage 411 which moves in a predetermined relation to the movement of the punch carriage 110, this set-up mechanism being so constructed and arranged as to be operable in any of its columnar positions in accordance with the operation of the keys 68 of the keyboard.

Figure 13:
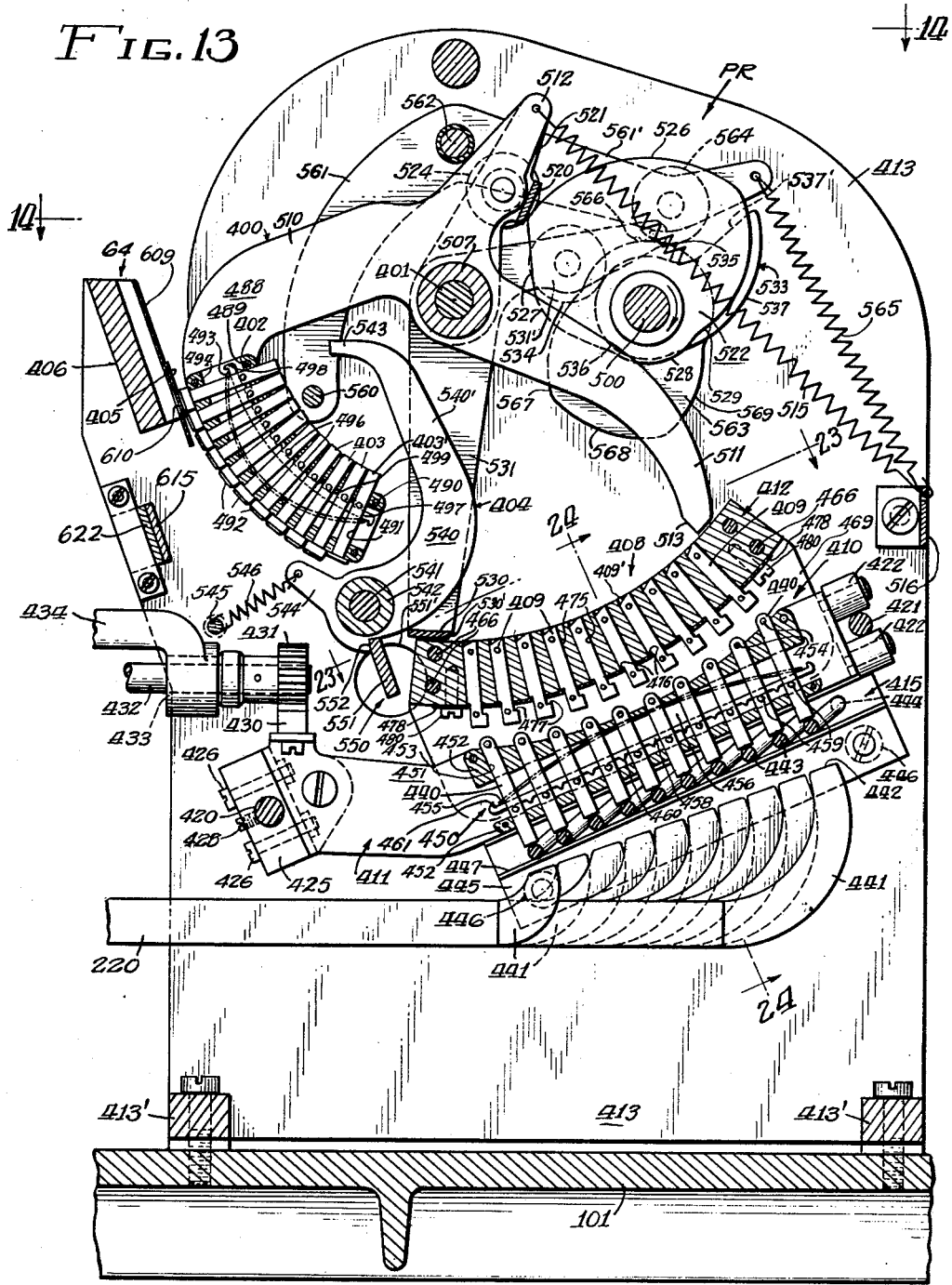
Fig. 13 is an enlarged fragmental cross-sectional view taken along the line of 13—13 of Fig. 12.

The stop mechanism 408 is formed by a generally arcuate supporting member 412 which is mounted between upstanding parallel side frame members 413 which support the printing mechanism and are mounted on the base 101. The side frame members 413 serve as the supporting means for substantially all of the elements of the printing mechanism PR, and to facilitate sub-assembly of the printing mechanism, the side frame members 413 are secured to the ends of mounting bars 413', as shown in Fig. 13, and which are in turn secured on this base 101. The arcuate supporting member 412 has a lateral width somewhat greater than the total space occupied by the type carriers 400 longitudinally of their supporting shaft 401, and as shown in Fig. 23, the shiftable stop members or pins 409 are mounted in a plurality of rows extending from front to rear of the machine and defined by a plurality of plates such as the plates 412U, 412T and 412H which are individually formed and then assembled to produce the arcuate mounting member 412. Five such plates are provided in the present instance, one for each order of the printing mechanism, the plate 412U carrying the stop pins 409 pertaining to the units order, the plate 412T carrying the pins 409 pertaining to the tens order of the printing mechanism, and so on.

As contrasted with the width of the arcuate supporting member 412, the carriage 411 which carries the set-up mechanism is comparatively narrow, as is clearly shown in Figs. 17 and 23 of the drawings. The carriage 411 is arranged generally above a transmitting mechanism 415 whereby actuating movement of the rear ends of the several key levers 220 may be transmitted to the set-up mechanism on the carriage 411 in any columnar position of the carriage 411.

The carriage 411 is relatively narrow, as has been pointed out, in a direction transversely of the machine, and it extends between and is carried by a pair of guide rods 420 and 421 which extend transversely of the machine between the supporting side frame members 413, these guide rods 420 and 421 being spaced a substantial distance apart so as to be operatively engaged by the carriage 411 adjacent opposite ends of the carriage. In the present instance, the rear end of the carriage 411 is operatively associated with the guide rod 421 by a pair of spaced cylindrical rollers 422 which are mounted on the carriage 411 and engage the upper and lower sides of the guide rod 421, the guide rod 421 being stationarily mounted in the frame members 413. Thus, the guide rollers 422 serve to position the rear end of the carriage 411 in a generally vertical direction. The other or forward end of the carriage 411 is operatively supported and guided by the guide rod 420 in a somewhat different manner, the carrier 411 being fixedly mounted on the guide rod 420, and the guide rod 420 being slidable through bearings formed by apertures 423 formed in the side frame members 413. For the purpose of securing the guide rod 420 to the carriage 411, a transverse extension or supporting member 425 is secured to the forward end of the carriage, as illustrated in Fig. 17 of the drawings. Thus, the supporting member 425, is rigidly secured as by screws 426 to the narrow body of the carriage 411. The rod 420 passes through a bore 427 formed in the supporting member 425 and is secured therein as by screw means 428, so that in its movement, the narrow body of the carriage 411 will be maintained in a perpendicular relation to its path of movement at all times.

The supporting member 425 also serves as a part of the means for operatively interconnecting the carriage 411 with the punch carriage 110 so as to produce corresponding movement of the two carriages. In the present instance, this interconnection is formed by gearing means, there being a rack 430 secured longitudinally on the top of the supporting member 425 and this rack being meshed with a pinion 431 which is driven by the punch carriage 110. The pinion 431 is carried on the rear end of a shaft 432, the shaft 432 being journaled in bearings 433 formed so as to depend from the front and rear ends of a bearing arm 434. This bearing arm 434 is formed integrally with and projects rearwardly from the mounting rail 111, as shown in Figs. 7, 11 and 17, and the forward bearing 433 is formed on the bearing arm 434 immediately rearwardly of the slot 180 of the mounting rail 111. On its projecting forward end the shaft 432 carries a pinion 435 which is meshed with a rack 436 which is connected to the bar 150 of the punch carriage 110 so as to ride in the slot 180. The rack 436 is secured to the bottom of the bar 150 by screws 437 as shown in Fig. 18. It will be observed that the rack 436 engages the upper side of the pinion 435, while the rack 430 of the set-up carriage 411 engages the lower side of the pinion 431. Thus, the two carriages 110 and 411 move in unison in opposite directions, the two pinions 431 and 435 being of the same size. With this construction, the movement of the punch carriage 110 to the left in Fig. 17 acts to produce corresponding movement of the carriage 411 to the right so that if the punch carriage has been initially tabulated to punch in the hundreds order position of a control device 63, the carriage 411 will be correspondingly positioned to effect a set-up operation in the hundreds order of the stop mechanism 408; and when the punching operation in the hundreds order has been completed and the punch carriage advances to the left to its tens order position, the carriage 411 will be correspondingly advanced toward the right to a corresponding tens order position wherein the set-up mechanism may be operated to effect a set-up operation in the tens order of the stop mechanism 408. With this construction, it will be apparent that the tabulating or initial positioning of the punch carriage 110 serves to produce a corresponding positioning of the set-up carriage 411 of the printing mechanism, and that the biasing spring 185 of the punch carriage serves to impart the desired advancing movement to the set-up carriage 411. With this arrangement, the control of the set-up carriage 411 is also attained by the control mechanism or escapement mechanism 190 of the punch carriage.

When the set-up carriage 411 is positioned in alignment with the row of stop pins 409 pertaining to any particular order of the printing mechanism, the selected stop pin 409 of that order may be actuated to an active projecting position such as is shown in Figs. 48 and 49 through the medium of a plurality of actuating pins 440 mounted on the carriage 411 and adapted for actuation from the key levers 220 through the medium of the transmitting mechanism 415. The required actuation of the transmitting mechanism 415 is attained through upwardly projecting arms 441 formed on the rear ends of the key supporting levers 220 as is shown in Figs. 11, 13 and 17. By reason of the angular positioning of the transmitting mechanism 415, as shown in Fig. 13, the arms 441 are of varying lengths, and each arm 441 has an abutment surface 442 at its upper end adapted for operative engagement with the appropriate portion of the transmitting mechanism 415 as an incident to the depression of the associated key 68.

The transmitting mechanism 415 is of such a character that the operative movement of any one of the key levers 220 will be transmitted to the corresponding set-up pin 440 in any of the columnar positions of the set-up carriage 411. In its present form, the transmitting mechanism comprises a plurality of bails 443, one for each of the set-up pins 440. Thus, in the present instance, ten such bails 443 are provided, one for each of the significant digits from 1 to 9, inclusive, and the other bail 443 for use in setting up the printing mechanism to print a zero. The bails 443 have trunnions 444 formed at their ends, and thus trunnions are mounted in suitable bearing apertures in plates 445 located at opposite ends of the bails and secured on the inner faces of the side frame members 413 by screws 446, as shown in Figs. 13, 17 and 24. The bails 443 normally fall by gravity to positions determined by a supporting rail 447, one of which is carried by each of the mounting plates 445 somewhat below the bearing openings therein. Thus, the bails 443 extend beneath the carriage 411 in all of the possible positions of the carriage, and whenever any one of the bails 443 is actuated by the associated key lever 220, this particular bail 443 is rocked upwardly so as to operate the associated actuating pin 440.

In the present embodiment, the forward bail 443, as shown in Fig. 17, pertains to zero, and the upwardly projecting arm 441 of the zero key supporting lever 220' is arranged to engage this forward bail when the zero key is actuated. The next bail 443 in a rearward direction pertains to the significant digit 1 and the arm 441 of the 1 key is, therefore, arranged so that its abutment surface 442 engages this particular bail when the 1 key is depressed. The other ones of the bails 443 are arranged to be actuated by the other key levers pertaining to the digits from 2 to 9, in succession, so that the rearmost bail 443 in Fig. 17 is actuated when the 9 key is depressed. The actuated or upwardly rocked positions of several of the bails 443 are shown in Fig. 49 of the drawings.

When a particular one of the bails 443 is actuated upwardly from the position of Fig. 13, the associated actuating pin 440 is shifted upwardly through the set-up carriage 411 against the force of a spring return device 450 so that the actuating pin strikes the aligned stop pin 409 of the stop mechanism 408 and shifts it to its active or projecting position, as shown in Fig. 48. The spring return mechanism 450 operates normally to maintain all of the actuating pins 440 in their downward or inactive positions of Fig. 13 so that upon release of the actuated key 68, the particular pin 440, which has been actuated, returns immediately to its inactive position. As herein shown, the desired mounting for the actuating pins 440 is provided by making the carriage 411 in two separately formed bars 451 and 452, as indicated in Fig. 23, these two bars 451 and 452 being secured together and the bar 452 having a plurality of parallel transverse grooves 453 formed in the surface thereof adjacent the bar 451 so as to provide guide openings in each of which one of the actuating pins 440 is slidably mounted. Downward movement of the actuating pins 440 in their guide openings is limited as by means of a cross pin 454 fixed in the top of each of the actuating pins 440 and adapted to engage the upper edges of the bars 451 and 452 of the carriage.

The yielding restoring mechanism 450 for the actuating pins 440 is in the present instance of such a character that a single spring 455 serves to restore all of the actuating pins 440 to their normal inactive positions. As herein shown, particular in Figs. 13, 24 and 25, this restoring mechanism is mounted and housed within a longitudinal groove 456 (Fig. 25) formed in the bar 452, and which intersects all of the transverse grooves 453. Each actuating pin 440 has a similar transverse groove or slot 457 in one of its sides and the spring 455, which is of the elongated bow spring type, extends throughout substantially the entire length of the groove 456 and passes through all of the grooves 457 of the several actuating pins 440. Adjacent its central portion, the spring 455 engages the upper wall of the groove 456, as shown in Fig. 13, while at its ends the spring 455 engages an equalizing bar 458. This equalizing bar 458 extends longitudinally within the slot 456 and through the slots 457 in the sides of all the actuating pins 430 and the bar 458 rests against a plurality of pins 459, one of which is mounted in each of the actuating pins 440 so as to project into the slot 457 thereof. In one or more of the spaces between adjacent actuating pins 440, the bar 458 is provided with downwardly projecting lugs or teeth 460 so as to prevent undesired longitudinal displacement of the bar 458 with relation to the actuating pin 440. The desired operative relationship of the spring 455 to the bar 458 is maintained by upwardly projecting lugs 461 formed on the opposite ends of the bar 458 so as to engage the ends of the spring 455 in the event that the spring tends to become longitudinally displaced with relation to the bar 458.

The stop pins 409 of the stop mechanism 408 are mounted in the supporting member 412 in a manner which is generally similar to the mounting of the actuating pins 440, with the exception, however, that the stop pins 409 are frictionally retained either in their retracted positions of Fig. 13 or in the projecting positions shown in Fig. 47, and in order to return the pins to their inactive positions of Fig. 13, a positive restoring force must be applied thereto. The preferred form and mounting for the stop pins 409 are illustrated in detail in Figs. 24, 25 and 27. As has been pointed out, the supporting member 412 of the stop mechanism comprises a plurality of plates such as the plates 412U, 412T and 412H, with each of these plates arranged to support and guide the stop pins 409 pertaining to a particular order of the printing mechanism. Five such plates are employed in the present mechanism since the present mechanism is intended for the printing of a five-order number, and on opposite sides of this group of plates a pair of filler members 465 is positioned. The several plates of the supporting structure 412 and the filler members 465 are secured together by means such as rivets 466 adjacent opposite ends of the plates, and this assembled structure is mounted and supported between the two side frame members 413 by means of angle brackets or plates 467. The angle brackets 467 each have a flange 468, one of these flanges 468 being positioned against the outer face of each of the filler plates 465, and so that the clamping bolts 466 may extend through the flanges 468. At the other ends of the angle brackets 467, flanges 469 are provided and these flanges are secured to the side frame members 413 by clamp bolts 470.

As shown in Figs. 24 and 25, each of the plates such as the plate 412U has a plurality of transversely extending slots 475 formed therein to receive and guide the stop pins 409. These guide slots 475 are rectangular in form and the stop pins 409 are of a complemental form in their outside transverse cross section. Adjacent the lower end of each pin a downwardly facing shoulder 476 is provided and on the opposite side of the pin and between the shoulder 476 and the lower end of the pin an upwardly facing shoulder 477 is provided. These two shoulders 476 and 477 serve to limit the longitudinal movement of the pin 409, and means is provided to be engaged by the shoulders 476 and 477 to attain this limiting action. In the present instance, this means comprises a relatively thin stop plate 478 which extends across the lower faces of all of the plates which make up the supporting structure 412. The plate 478 has openings 479 therein through which the pins 409 may extend, and the pins 409 are so related to the plate 478 that downward movement of each pin is limited by engagement of its shoulder 476 with the top of the plate 478 while upward movement of each pin is limited by engagement of its shoulder 477 with the lower face of the plate 478. The plate 478 is held in place by a plurality of screws 480 which are threaded through slotted openings in the plate 478 into the lower face of the supporting structure 412.

The slotted openings in the plate 475 for the screws 480 are so positioned that the plate 478 may first be mounted in a position wherein the left-hand edge of the plate 478 (Fig. 24) abuts the flange 468, and while the plate 478 is thus positioned, the pins 409 are inserted upwardly through their guide slots 475 and through the openings 479. The openings 479 are so formed that when the plate 478 is in its left-hand position as described, the pins 409 may be projected upwardly through lateral extensions 479' formed along one edge of each opening 479. Such upward movement is limited by the engagement of the upwardly facing shoulder 477 with the lower face of the plate 478 along the other edge of the particular opening 479. During such assembly the pins 409 remain in position in their guide slots 475 due to friction, as will hereinafter be explained. After all of the pins 409 are in place, the plate 478 is shifted to the right and clamped in the position shown in Figs. 24 and 24A, so that the projecting portions between the extensions 479' are positioned beneath the shoulders 476 thereby to limit downward movement of the pins 409.

To maintain the pins 409 in either their upper active positions or their lower inactive positions, means is provided to exert a yielding frictional force between each pin and the supporting structure 412. In the present instance, this means comprises an individual spring means carried by each of the stop pins 409. Preferably, each pin has a longitudinal groove 485 within which groove the individual spring means is mounted, and as herein shown, each spring means is in the form of a bow spring 486. The ends of the bow spring 486 bear against the bottom of the groove 485, as shown in Fig. 24, while the central portion of each bow spring 486 bears against the adjacent wall of the guide slot or guideway 475 of the pin. In the present instance, the central portion of each spring 486 bears against the wall of the adjacent plate of the mounting structure 412. Each of the bow springs 486 is maintained in its proper relationship in its groove 485 by means of a pair of abutment pins 487 mounted in the pin 409 and projecting into the groove 485 thereof so as to lie in the path of the opposite ends of the bow spring 486.

*The printing mechanism*

After the set-up operation has been completed so as to position the selected stop pins 409 in their projecting or operative positions, the control device 63 which was punched with the desired control data during such set-up operation is removed from its punching position on the punch carriage 110 and is transferred to the verifying position or station 64 for the purpose of printing the verifying number 65 thereon in accordance with the previously effected set-up of the printing mechanism. While the control device is located at the verifying station 64, the printing mechanism PR is operated through a printing cycle. In this printing cycle the several type carriers 400 pertaining to the different orders of the printing mechanism are shifted to set positions determined by the setting of the stop pins 409, thereby to position the desired type members 403 in each order opposite the printing position of the platen 406; and after the type carriers 400 have been shifted to the desired set positions, the hammer mechanism 404 is operated to effect a printing operation from the selected type members 403. The hammer mechanism 404 is then restored to its inactive position of Fig. 11, after which the type carriers 400 are restored to their normal positions of Figs. 11 and 15. After the type carriers have been restored to their normal positions, the several previously actuated stop pins 409 are forced downwardly or restored to their inactive positions of Fig. 13. The printing mechanism is thereby conditioned for succeeding set-up and printing operation.

In such conditioning of the printing mechanism for a succeeding printing operation, it is to be observed that the several type members 403 are spring-urged toward their retracted positions, so that restoration or resetting of the hammer mechanism results in an immediate return of the type members to their normal relation. In attaining this action the present type members 403 are mounted in a manner substantially corresponding to the mounting of the actuating pins 440. Thus, as shown in Figs. 11, 13, 31 and 32, each type segment 402 comprises a pair of arcuate or segmental plates 488 and 489 secured in face-to-face relation on its carrier 400 by rivets 490 so as to be centered on the axis of the shaft 401. The plates 488 and 489 have a plurality of opposed grooves formed therein to provide individual guideways 491 for the elongated body portions of the several type members 403, these guideways 491 being radially positioned with relation to the axis 401. All of the type members 403 are normally retained in their retracted positions of Fig. 32 wherein their enlarged type-bearing heads 492 engage the outer arcuate edge surfaces of the plates 488 and 489.

This retracted positioning is attained by means of a single bow-type spring 493 for all of the type members 403 of each type segment 402, the spring 493 being arranged longitudinally in an arcuate groove 494 formed in the inner face of the plate 488 so as to intersect all of the guideways 491. Clearance for the spring 493 past the body portions of the type members 403 is provided by forming a slot 495 in the side of each type member 403. A pin 496 is mounted in each type member 403 so as to project into the slot 495 adjacent to its rear or right-hand end as seen in Fig. 31, and the spring pressure from the spring 493 is transmitted to the type members 403 by an arcuate bar 497 positioned so as to extend through the groove 494 and the slots 495. The bar 497 is engaged adjacent its ends by the ends of the spring 493, the central portion of the spring engaging the left-hand edge of the groove 494, as shown in Fig. 31. End lugs 498 on the bar 497 maintain the bar and the spring in the desired longitudinal relation to each other, while spaced teeth 499 on bar 497 are located between the pins 496 to maintain the spring 493 and the bar 499 in position within the groove 494.

The printing cycle of the various elements of the printing mechanism is effected through the operation of cam mechanism, all of the cams of which are in the present instance mounted on a cam shaft 500 extending between and through the two side frame members 413 parallel to the supporting shaft 401 and mounted in suitable bearings 502 carried by the side members 413 on the outer sides thereof. The cam shaft 500 in effecting the operation of the printing mechanism through a complete printing cycle is operated or rotated through but a single revolution and this rotation is effected by drive mechanism 503 which is mounted on the left-hand rear corner portion of the base 101, as shown in Figs. 7, 10, 12 and 17. This drive mechanism includes a power means such as an electric motor 504, reduction bearing 505, and a one-revolution clutch 506, all of which will be hereinafter described in detail.

The several type carriers 400 are mounted so as to be freely rotatable about their supporting shaft 401, this shaft 401 being supported at its opposite ends in the side frame members 413, and the type carriers 400 are held in the desired spaced relation upon the mounting shaft 401 by a plurality of spacing sleeves 507 which surround the shaft 401 between the several type carriers and at opposite sides of the end type carriers. The type carriers 400 are preferably formed so as to have three arms 510, 511 and 512 projecting generally radially with respect to the supporting shaft 401 and disposed so that the three arms are separated by substantially 120°. The arm 510 of each carrier 400 serves as a mounting for the type segment 402 and extends generally downwardly and to the left from the shaft 401, as shown in Fig. 11, while the arm 512 extends generally upwardly. The arm 511 extends generally downwardly and to the right in Fig. 11, so that when the type carrier 400 is in its most counterclockwise or normal position of Fig. 11, the end of the arm 511 is positioned adjacent the right-hand upper edge of the stop mechanism 408. Thus, when the type carrier is moved in a clockwise direction as viewed in Figs. 11 and 13, the arm 511 moves an abutment face 513 thereof successively past the several stop pins 409 pertaining to the same order as the type carrier which is being thus moved. If any one of the stop pins 409 has been projected upwardly to its active position, as shown in Figs. 48 and 49, the movement of the type carrier will be arrested in the position determined by the actuated stop pin 409. If the stop pin 409 pertaining to the digit 9 has been actuated, the type carrier will be stopped in the position indicated by the right-hand arm 511 of Fig. 48; in which position the associated type member 403 bearing the number 9 will be stopped or set in printing position opposite the platen 406. Similarly, if the stop pin 409 pertaining to zero has been actuated, in a particular order of the stop mechanism 408, movement of the type carrier of that order continues in a clockwise direction until the arm 511 engages this actuated zero stop pin, as illustrated by the positioning of the left-hand arm 511 in Fig. 48, and the associated type member 403 pertaining to zero will then be located in printing position opposite the platen 406. If in any particular order of the stop mechanism 408 no one of the stop pins 409 has been actuated or projected to its active position, the clockwise movement of the type carrier 400 of that order may continue through and beyond the zero position, with the result that a blank member 403', similar to the type members 403 and similarly mounted in the type segment 402, will be located in the printing position opposite the platen 406. In this instance, the operation of the hammer mechanism in this particular order is ineffective to produce a printing impression. Thus, in the orders of the printing mechanism to the left of the first digit of a control number, no printing impression appears. In addition it is to be noted that in the event the carriage 110 of the punch mechanism has been improperly positioned or tabulated too far to the right, no printing impression will appear in the units order position on the control card 90.

The several type carriers 400 are constantly urged in a clockwise direction from their normal position of Figs. 11 and 13 by means of individual tensioning springs 515, one end of each spring being connected to the upper end of the arm 512 of the type carrier to which it pertains, while the other end of each of the springs 515 is connected to an anchoring bar 516 which extends between the rear edges of the side frame members 413 somewhat below the level of the supporting shaft 401. The type carriers 400 are urged to their normal positions of Fig. 11 against the force of their springs 515 by means of a restoring mechanism which comprises a bail 520, the arms 521 of which are pivoted on the supporting shaft 401 so that the cross member of the bail is adapted to engage the several arms 512 on the right-hand side thereof, as shown in Fig. 11. Thus, when the bail 520 is moved in a counterclockwise direction, all of the type carriers 400 are engaged thereby and are moved to their normal positions of Fig. 11. Such restoring movement of the bail 520 is imparted thereto at the desired point in the rotation of the cam shaft 500 by means of a pair of cams 522 fixed on the shaft 500 in spaced relation adjacent to the ends of the bail 520 so as to be engaged by cam rollers 524, one of which is fixed on the outer side of each of the side members 521 of the bail 520. A pair of biasing springs 525 are connected to the bail 520, one of the springs being connected to each of the end members 521 of the bail, and these biasing springs 525 extend rearwardly and are connected at their other ends to the anchoring bar 516 so that the springs 525 act to maintain the cam rollers 524 in engagement with the edges or cam surfaces of the cams 522.

The cam 522 has a dwell lobe portion having a dwell surface 526 spaced substantially from the axis of the shaft 500 so that when the dwell surface 526 is in engagement with the cam roller 524, the bail 520 is positioned in the normal position of Figs. 11 and 13. The cam shaft 500 is shown in Fig. 13 in the rotative position which it occupies at the completion of a printing cycle, and the cam roller 524 is in engagement with the dwell surface 526 at a point relatively close to the most counterclockwise point of said dwell surface 526. When the cam shaft 500 is rotated through its cycle, it moves from its normal or rest position of Fig. 13 in a clockwise direction as indicated by the arrow in Fig. 13 so that the dwell surface 526 moves upwardly and to the right and after a relatively small angular movement of the cam shaft, the dwell surface 526 moves beyond the roller 524 so that the roller engages a relatively gradually relieved edge surface 527 of the cam. This relieved surface 527 permits the roller 524 and the associated bail to move to the right in Fig. 13, thereby to permit clockwise rocking movement of the several type carriers 400 under the biasing action of their springs 515. In such rocking action of the bail, the biasing springs 525 serve to maintain the cam rollers 524 against the cams 522 and after quite a substantial angular movement of the cam shaft 500, each cam roller 524 engages a dwell surface 528 formed on the cam relatively close to its axis. The arrangement is such that in the most clockwise position of the bail 520 as determined by the dwell surface 528, the bail is so positioned that the type carriers 400 may move to their most clockwise or blank positions in the event that none of the associated stop pins 409 has been actuated to its active position.

The dwell portion or surface 528 of each cam 522 is of a substantially angular extent, sufficient to allow time for the printing action of the hammer mechanism 404. In the present instance, the dwell portion 528 extends through substantially 90° on each cam 522, after which the dwell surface 528 merges with a leading surface 529 which extends gradually in a radially outward direction as it progresses about the cam so as to merge with the dwell surface 526 within an angular distance which is somewhat less than 90°, with relation to the cam axis. Thus, in the continued movement of the cam shaft 500 in a clockwise direction, the dwell surface 528 is moved past its cam roller 524 and the leading surface 529 is engaged with its roller 524. The action of the leading surface 529 on the cam roller 524 shifts or rocks the bail 520 in a counterclockwise direction about its shaft 401 from the position of Fig. 48 to the position of Fig. 13. After this restoring movement has been imparted to the bail 520, the bail is maintained in this restored position of Fig. 13 while the dwell surface 526 moves past the cam roller 524. Such movement of the cam 522 and its dwell surface 526 continues until the cam shaft is stopped with the cam in the normal or rest position shown in Fig. 13.

After the restoring movement of the type carriers 400 has been started by the action of the cam 523 and the associated restoring bail 520, the several stop pins 409 which have been operative in the just completed printing operation are restored to their normal inactive positions of Fig. 13, and this restoring action is attained by means which is actuated from the cam shaft 500. In the present instance, this stop-restoring means comprises a bail 530 having side bars or arms 531 which are pivoted on the shaft 401 immediately outwardly or on opposite outer sides of the arms 521 of the bail 520. As shown in Figs. 13 and 51, the arms 531 of the bail 530 are in the form of bell cranks so as to provide additional arms 531' projecting at an angle to the arms 531, this angle being slightly over 90° in the present instance. To control the movement of the bail 530, a pair of cams 533 is fixed in spaced relation on the cam 500, and cam rollers 534, one of which is mounted on each of the arms 531' intermediate the ends thereof, are held yieldingly in engagement with the cams 533 by springs 535. One of these springs 535 is connected between the end of each arm 531' and the anchoring rail 516. As shown in Fig. 51, the cam 533 has a dwell surface 536 against the leading end portion of which the associated cam roller 534 rests when the cam shaft 500 and the cam 533 are in their initial or rest positions. This dwell surface 536 is located relatively close to the axis of the cam shaft 500 and has an angular extent of substantially 240°, and the normal position of the cam is such that the cam roller 534 is spaced somewhat in a counter-clockwise direction from the most clockwise portion of the dwell surface 536. Thus it is clear that during the first half of the revolution of the cam shaft 500, the bail 530 is maintained in the position shown in Fig. 51. It is during this first half of the cam shaft rotation that the type carriers 400 are shifted to their set positions as determined by the stops 409, the printing or striking operation of the hammer mechanism 404 is completed, the hammer mechanism is again retracted, and the restoring movement of the type carriers 400 is started by the restoring bail 520. After these operations of the printing mechanism have been completed, each cam roller 534 encounters a relatively steep leading surface 537 which acts to rock the bail 530 about the supporting shaft 401 in a counterclockwise direction from the full line of normal position of Fig. 51 to the dotted line position of said figure. This movement of the bail 530 constitutes the restoring stroke of the bail, and in such movement the cross member of the bail 530 sweeps to the right and upwardly along an arcuate path across the upper face of the supporting structure 412, and a sloping cam-like surface 530' formed on the right-hand lower edge of the cross member of the bail 530, as viewed in Fig. 51, engages a complemental angular surface 409' formed on the projecting ends of any of the stop pins 409 which happen to project upwardly to their active positions of Fig. 51. Thus, these projecting stop pins 409 are shifted downwardly to their inactive positions of Fig. 13, and in the movement of the bail 530 to the dotted line position of Fig. 51, the required restoring action is effected as to all of the pins 409. Each cam roller 534 then encounters a sharply relieved surface 537' which merges with the dwell surface 536, so that the bail 530 is returned rapidly to its inactive or normal position of Fig. 51. Such rapid return of the bail 530 prevents interference of the bail in the next stop setting operation.

As hereinbefore pointed out, the hammer mechanism 404 is actuated through a printing operation while the several type carriers 400 are positioned in their set positions, and this actuation is effected by moving the hammer mechanism to a spring loaded retracted position such as that shown in Figs. 11 and 13, this movement to the retracted position being effected immediately after the printing or striking of the hammer mechanism, and there being latch means which operate to retain the hammer mechanism in its spring loaded position until a printing or striking operation is desired, at which time the latch mechanism is released so that the hammer mechanism may move through its desired impression-effecting stroke.

In the present instance, the hammer mechanism comprises five individual hammers 540 mounted for individual pivotal movement on a mounting shaft 541 as illustrated in Figs. 13 and 28. The mounting shaft 541 extends between the two side frame members 413 and has a plurality of spacing sleeves 542 thereon to properly position the hammers 540 so that each hammer may cooperate with the set type members 403 pertaining to a particular order of the printing mechanism. Each hammer 540 is in the form of a bell crank, as shown in Fig. 13, one arm 540' being generally L-shaped in form so as to provide clearance about the lower end of the type segments 402, and at its upper end each arm 540' has a head 543 adapted in counterclockwise rotation of the hammer to apply an impression-making blow to the rear end of the particular type member 403 which is then located opposite the printing position of the platen 406. The other arm 544 of each hammer 540 extends generally upwardly and to the left in Fig. 13 when the hammer is in its retracted position, and between the end of each arm 544 and an anchoring rod 545 a biasing spring 546 extends so that the hammer is normally biased in a counterclockwise direction (in Fig. 13) against the restraining action of a latch mechanism 550. This latch mechanism 550 has a latch bar 551 which engages a latching shoulder 552 formed on each of the hammers 540 directly beneath the mounting shaft 541.

When the latch device 551 is released, the hammers 540 rock in a counterclockwise direction under the biasing action of their springs 546 to the position shown in Fig. 48 of the drawings, such release of the latch device 551 being effected by cam means carried by the cam shaft 500. After the hammers 540 have been released and have applied their hammer blows to the set-up type members 403, the hammers must be returned to and slightly beyond the position in Fig. 13 in order that the latch device 551 may be again engaged with the latching shoulder 552, and this restoring movement of the hammers is also effected by cam means mounted on the cam shaft 500. This hammer restoring or resetting means, in the form herein shown, comprises a bail 560, Figs. 14 and 52, the cross member of which is in the form of a round rod and the side members 561 of which are in the form of bell cranks. These bell cranks 561 are mounted on a supporting shaft 562 located somewhat above the shaft 401 in such a position as to provide clearance for other movable elements of the mechanism such as the arms 512. The bell cranks 561 have arms 561' which project rearwardly over the cam shaft 500 so that they may be operatively engaged with cams 563. Such operative engagement is effected through the medium of rollers 564 carried near the ends of the arms 561', these cam rollers being maintained in engagement with the cams 563 by biasing springs 565, one of which is connected from the end of each arm 561' to the anchoring bar 516.

In the normal or rest position of the cam shaft 500, each cam roller 564 is in engagement with a dwell surface 566 in substantially the position or relation shown in Fig. 13, this cam surface 566 being of a relatively small radius so that the cross member of the bail 560 is located in the inactive position shown in Figs. 13 and 48. In this position the cross member of the bail 460 is in an out-of-the-way position wherein it permits the hammers 540 to apply the desired hammer blows to the type members. This normal or rest positioning of the bail 560 is maintained for a substantial period after the rotative movement of the cam shaft 500 is initiated, and during this period the latch device 550 is released, as will be hereinafter described, so as to permit the hammers 540 to apply the desired hammer blows to the type. The bail 560 is then operated through a restoring cycle by engagement of a leading surface 567 (Fig. 52) with each cam roller 564. This leading surface is relatively steep so that the restoring movement of the bail 560 shifts the hammers away from the type 403 prior to the initiation of the restoring movement of the type carriers by the restoring bail 520. The leading surface 567 of each cam 563 merges with the dwell surface 568 so as to maintain the hammers 540 in the positions shown in Fig. 52 for a period of time sufficient to permit operative engagement of the latch device 551 with the latching shoulders 552. After such engagement has been effected, the dwell surface 569 moves from beneath the cam roller 564 and a relieved surface 569 is moved beneath the cam roller. This relieved surface 569 merges with the dwell surface 566 so that when the cam shaft 500 has reached its initial or rest position, each roller 564 is again engaged with its dwell surface 566 and the restoring bail 560 is again in its out-of-the-way position of Fig. 13.

Figure 14:
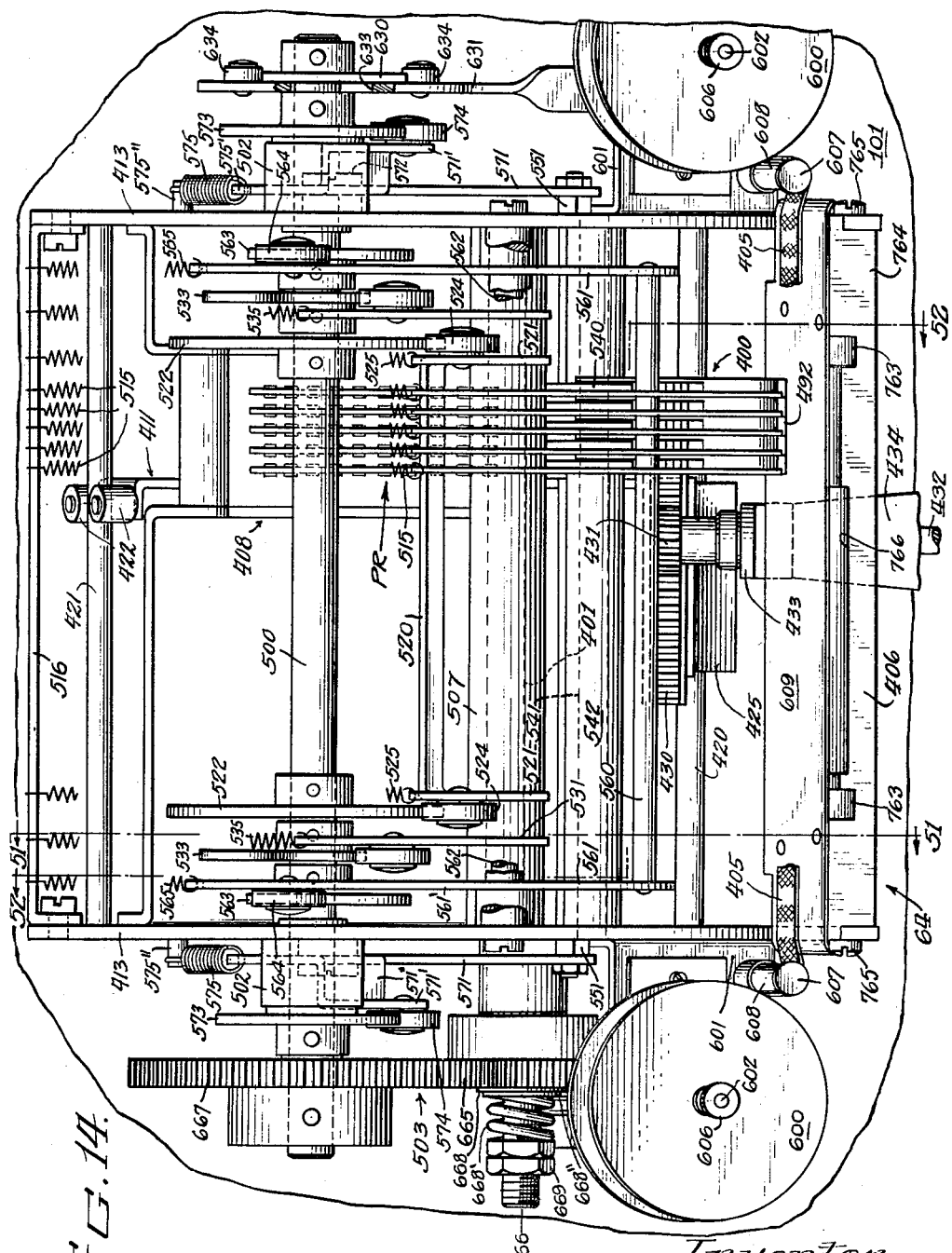
Fig. 14 is a fragmental plan view of the printing mechanism taken along the line 14—14 of Fig. 13.
Figure 15:
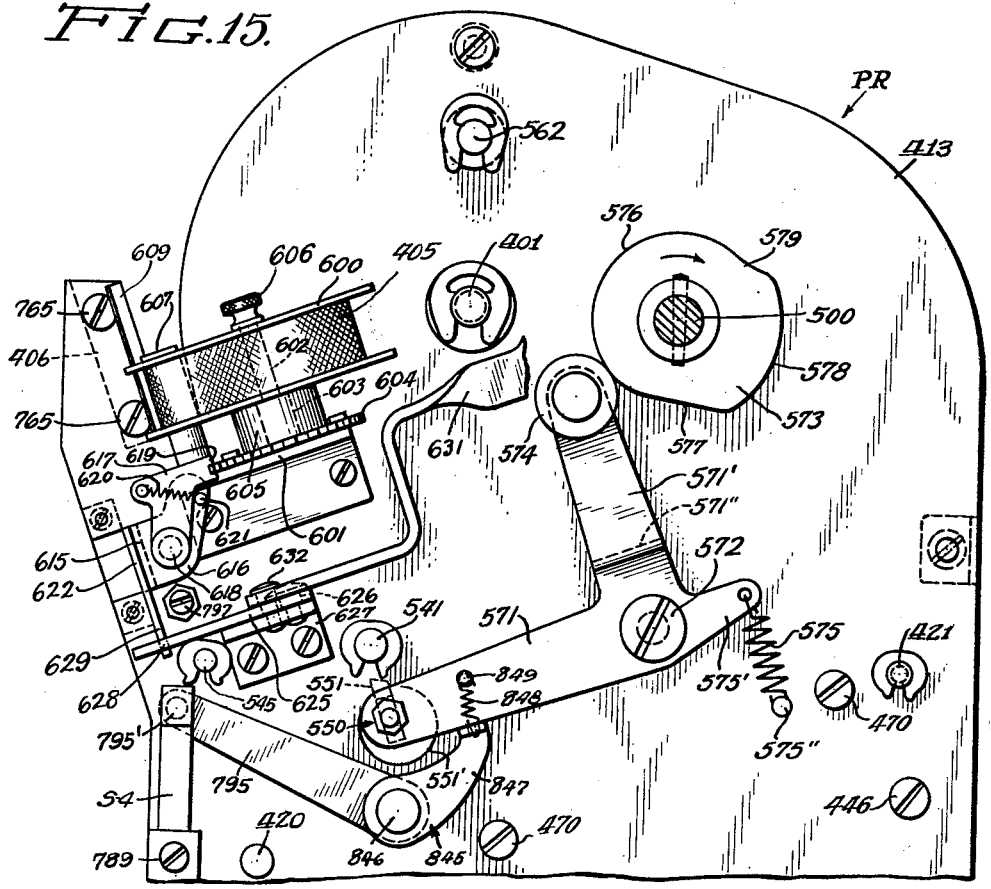
Fig. 15 is a fragmental cross-sectional view taken along the line 15—15 of Fig. 12.

The latch device 550 is also in the form of a bail, the side members 571 of which are positioned along the outer sides of the two side frame members 413. These side members of the bail 550 are generally in the form of bell cranks as shown in Figs. 15 and 52, and each side member 571 is pivoted on the adjacent side frame member 413 by means of a mounting stud 572 as shown in Fig. 15. The latch bar 551 extends through openings 551' in the side frame members, as shown in Fig. 15, and is connected to the arms 571 by means such as fastening bolts. Each side member 571 has an arm 571' through which the bell crank 550 is operatively associated with a pair of cams 573 mounted on the cam shaft 500 outwardly of the two supporting bearings 502. As shown in Fig. 14, the arms 571' are offset as indicated at 571" so that cam rollers 574 carried on the ends of the arms 571' may be operatively engaged with the cams 573. The bail 551 is urged in a counterclockwise direction by a pair of springs 575, one of which acts between the end of an arm 575' on each side member 571 and an anchoring stud 575" mounted on the outer face of the adjacent side frame member 413. Thus, the springs 575 serve to maintain the cam rollers 574 in engagement with their cams 573, thereby to urge the latch device toward an operative relation to the hammers under the control of the cams 573. When the cam shaft 500 is in its initial or rest position, each cam roller 574 is in engagement with a dwell surface 576 on its cam 573, and as the cam shaft 500 rotates, the cam rollers 574 are engaged by a leading surface 577 formed on each of the cams 573. This leading surface is engaged with each cam roller only after the type carriers 400 have been shifted to their set positions as determined by the stop pins 409. Through the action of the leading surface 577 the bell cranks 571 are rocked about their mounting studs 572 in a counterclockwise direction as shown in Fig. 15, thereby to disengage the latch bar 551 of the bail 550 from the latching shoulders 552 of the hammers 540. As a result, the hammers 540 move through their printing stroke to the position shown in Fig. 48, and while the hammers 540 are in this position, the latch device 551 is maintained out of engagement with the hammers by means of a dwell surface 578 formed on each of the cams 573. When the action of the cams 563 has caused the restoring bail 560 to move the hammers 540 to their retracted positions, as shown in Fig. 52, the dwell surface 578 of each cam 573 is moved out of engagement with the cam rollers 574 so that the rollers ride down a relieved surface 579 on each cam and back onto the dwell surface 576. After the latch bar 551 has thus been reengaged with the latch shoulders 552, the cam rollers 564 of the hammer-restoring means or bail 560 ride off the dwell surfaces 568 of the cams 563 so that the hammers 540 are then maintained in their spring loaded positions solely by the latch bar 551, and are thereby conditioned for the next printing operation, the restoring bail 560 during this period being located in its out-of-the-way position of Fig. 13.

In each revolution the cam shaft 500 also serves to impart a feeding movement to the ribbon 405, this feeding movement being applied to one or the other of two ribbon-supporting spools 600 shown in Figs. 7, 8, 9, 10 and 14. These ribbon-supporting spools 600 are carried upon shelf-like supporting brackets 601 which are attached to the outer faces of the side frame members 413 adjacent to the central portion of the forward edges thereof. Each bracket 601 has an upstanding mounting stud 602 thereon and on an enlarged lower portion 603 of each stud a ratchet wheel 604 is rotatably mounted. Each ratchet wheel 604 has an upstanding hub portion 605 upon which the ribbon spool 600 may rest in an interlocking relation. The spool is interlocked with the hub 603 by conventional means not herein shown, and is held on the stud 602 and in its interlocked relation with the hub 603 by means of a knurled head 606 which is threaded onto the upper end of the stud so as to engage the upper face of the spool 600. Thus, when the ratchet wheel 604 is actuated, rotating or feeding movement is applied to the associated spool 600.

The ribbon 405 has its opposite ends attached to and coiled about the spools 600, and adjacent each spool an upstanding guide stud 607 is provided for the ribbon. Each guide stud has a guide groove 608 formed therein as shown in Fig. 14, and if desired this guide groove 608 may be provided with a rotatable bearing sleeve (not shown herein). Intermediate the two guide studs 607, the ribbon 405 extends past the printing position along the face of a shielding plate 609, as shown in Figs. 31 and 32. The shield plate 609 has an opening 610 therein which in effect defines the printing position, and the ribbon extends across and may be forced through the opening 610 when any aligned type member 403 is actuated by its associated hammer 540. The opening 610 preferably has extension slots 610' extending at forty-five degree angles from the corners of the opening 610, as shown in Figs. 28 and 30. By this construction resiliency is imparted to those portions of the shield 609 which border the opening 610.

The desired movement is imparted to one or the other of the spools 600 by actuation of the associated ratchet wheel 604, and such movement is transmitted in the present instance by an elongated bar 615, which is mounted for reciprocating movement transversely of the machine slightly forwardly and downwardly from the ratchet wheels 604. At its opposite ends the actuating bar 615 has end flanges 616 which project rearwardly of the machine, as indicated in Figs. 9 and 15, and on each end flange 616 a pawl 617 is mounted upon a pivot 618. Each pawl has a tooth 619 urged toward engaging relation with respect to its ratchet wheel 604 by a spring 620 acting between the pawl and a pin 621 mounted on the end flange 616. The pin 621 serves to limit the rearward rocking movement of the pawl 617, as shown in Figs. 9 and 15.

The length of the bar 615 is such that it may be reciprocated through a relatively short actuating stroke in the course of which it will engage but one of the ratchet wheels 604. Thus, if the bar 615 is reciprocated to the right from the position shown in Fig. 8, its right-hand pawl 617 will engage the right-hand ratchet 604 so as to feed the ribbon 405 to the right, and the return movement to the left to the position shown in Fig. 8 will be a mere idle portion of the reciprocating stroke. If on the other hand the location of this reciprocating stroke is changed so that the bar 615 is shifted to the left in Fig. 8, the left-hand pawl 617 becomes the active portion of the ribbon feed mechanism, and the left-hand spool 600 is actuated so as to feed the ribbon 405 to the left.

Such reciprocating movement is imparted to the bar 615 by a transmitting bar 622 which is slidably mounted in the side frame members 413 immediately forward of the bar 615 so that it may be reciprocated along a path parallel to the desired reciprocating movement of the bar 615. The transmitting bar 622 is reciprocated, by means which will hereinafter be described, through a stroke which corresponds to the length of the stroke desired for the bar 615, and means is provided for connecting the bar 615 to the transmitting bar 622 in either one of two longitudinally spaced relations, in one of which relationships the right-hand pawl 617 is effective to feed the ribbon 405 to the right, and in the other of which relationships the left-hand pawl 617 is operative to feed the ribbon 405 to the left. The connection between the transmitting bar 622 and the ribbon feed bar 615 is in the present instance of such a character that it effects automatic reversal of the ribbon feeding action of the bar 615 when the ribbon 405 has been unwound completely from one or the other of the spools 600. This automatically operating reversing connection as herein shown comprises a pawl 623 mounted on the forward face of the transmitting bar 622 and adapted to be yieldingly engaged, by means of its spring pressure device 623', with one or the other of two spaced angularly formed notches 624 formed in the lower edge of the bar 615. As herein shown in Fig. 8, the pawl 623 has a pin which projects rearwardly through a slot in the lower edge of the transmitting bar 622 in such a relation as to be engageable with the notches 624. The engagement of the ratchet 623 with either of the notches 624 is such that when the ribbon has been completely unwound from one of the spools 600, the added resistance or drag upon the bar 615 will cause the transmitting bar 622 to move longitudinally relative to the bar 615, thereby to cam the spring pressed pawl 623 out of the notch 624 with which it has theretofore been engaged, and to move the pawl 623 into engagement with the other one of the notches 624. Thus, the feeding action of the bar 615 upon the ribbon-supporting mechanism is reversed.

The desired reciprocating stroke is imparted to the transmitting bar 622 by means of a bell crank 625 which is pivoted at 626 on a bracket 627 mounted on the outer side of the right-hand side frame 413. This bell crank 625 has a pin and slot connection as indicated at 628 in Fig. 15 with an arm 629 which projects downwardly from the transmitting bar 622, so that by rocking movement of the bell crank, the desired reciprocating movement may be imparted to the transmitting bar 622. Such rocking movement of the bell crank 625 is obtained from a cam 630 mounted on the right-hand end of the cam shaft 500 in spaced relation to the cam 573. This spacing is attained in part by a mounting hub 573' which serves to secure the cam 573 on the cam shaft and is located on the right-hand side of the cam 573, as shown in Fig. 12. The cam 630 is arranged to impart a reciprocating movement to a connecting link 631 during each revolution of the cam shaft 500, the cam being arranged to operate upon the right-hand portion of the link 631 as shown in Fig. 9 while the other end of the link 631 is pivoted as at 632 to the other arm of the bell crank 625. The link 631 has a longitudinal slot 633 therein and is located between the hub 573' and the cam 630 so that the cam shaft 500 projects through the slot 633 and serves to support and guide the link 631 as it is reciprocated by the cam 630. The cam 630 is of the type which has a constant diameter in all of its rotating positions and the link 631 has a pair of cam rollers 634 mounted thereon in spaced relation so as to engage opposite sides of the cam at points lying on the longitudinal central axis of the guide slot 633. Thus, the link 631 is actuated in opposite directions by the rollers 634, and in the present instance the cam 630 is of such a form as to provide dwell surfaces 636 and 637 on opposite sides thereof, thereby to insure that the ribbon will be stationary during the printing operation, these dwell surfaces 636 and 637 being connected by leading and receding surfaces 638 and 639, whereby the desired reciprocation is imparted to the link 631 and the ribbon feeding slide bar 615.

*The drive mechanism*

As hereinabove pointed out, the cam shaft 500 of the present embodiment is driven by power means such as the electric drive motor 504 and this driving movement is transmitted through reduction gearing 505 and the one-revolution clutch 506 whereby the cam shaft 500 may be operated from its rest position through the single revolution required to effect the desired printing operation. As shown in Figs. 7, 10 and 12, the motor 504 has a pinion 650 on its motor shaft 651, this pinion 650 being meshed with a somewhat larger gear 652 which is secured on one end of a worm shaft 653. This worm shaft 653 is supported in upstanding bearing brackets 654 formed on a mounting plate 655 which is secured by screws 656 on the base 101. This mounting plate or base 655 also serves as a mounting for the motor 504. Intermediate the bearing standard 654, the worm shaft 653 carries a worm 657 which meshes with and actuates a worm wheel 660. The worm wheel 660 is fixed on a shaft 661 which extends transversely of the machine through bearings formed in upstanding bearing members 662 and 663 formed on the mounting plate 655. The one-revolution clutch mechanism 506 is also mounted on the shaft 661, and through this clutch mechanism rotative movement of the worm wheel 660 is transmitted to a gear 664 which is mounted fixedly on the shaft 661 adjacent to the bearing standard 663. Above the gear 664, a gear 665 is mounted on a supporting bearing structure 666 which is carried by and projects to the left from the left-hand side frame member 413 as shown in Fig. 12. The gear 665 is in mesh with the gear 664 so as to be driven thereby, while a third gear 667 is fixed on the left-hand end of the cam shaft 500 and meshes with and is driven by the gear 665. These gears are so proportioned that the cam shaft 500 makes one revolution for each revolution of the gear 664, so that the one-revolution characteristic of the clutch 506 imparts the same characteristic to the cam shaft 500. To prevent over-running of the driven parts due to the first driving impact caused by clutch closure, frictional retarding or braking means is preferably provided in the train of driven mechanism. In the present instance this means comprises a fiber friction washer 668 surrounding the stationary bearing stud 666 and engaging the outer face of the gear 665. The washer 668 is held in frictional braking or retarding relation to the gear 665 by a spring 668' and a washer 668'', the spring tension of which may be regulated by abutment nuts 669 threaded on the bearing stud 666.

The one-revolution clutch 506 may be of any preferred construction but in the present instance is constructed substantially along the lines of the clutch shown and claimed in co-pending application Serial No. 239,561, filed November 8, 1938. As herein shown, the one-revolution clutch includes a driving member 670 and a driven member 671, both mounted rotatably on the shaft 661 and having clutch teeth 672 on their opposing adjacent ends adapted to be moved into operative drive and transmitting engagement. These driving and driven members 670 and 671 are in the form of sleeves or hubs surrounding the shaft 661, the driving member 670 being secured to the worm wheel 660 so as to be driven thereby, and the driving member 670 is located in a fixed longitudinal position on the shaft 661 by interconnection with the worm wheel 660. The driven member 671 is mounted on the shaft 661 for limited movement axially of the shaft for the purpose of engaging and disengaging the clutch teeth 672 and in such movement the driven member 671 is constantly connected in a driving relation to the gear 663 through a pair of axially extending lugs 674 formed on the hub 663' of the gear 664 so as to project into slots 675 formed in the driven member 671.

The driven member 671 is constantly urged in an endwise direction toward the driving member 670 so as to tend to engage the clutch teeth 672 and such operation is effected by means of a pair of springs 677 mounted in bores 678 formed on opposite sides of the axis in the driven member 671 and acting against the hub 663'.

To control the spring biased engaging movement of the driven member 671 and to effect disengaging movement thereof, means is provided whereby the stop position of the driven member 671 is invariably the same after each printing operation. This control means includes a control arm 680 supported on and depending from an upstanding bracket 681 which is mounted on the mounting base 655 so that its lower end projects downwardly along one side of the driven member 671, as shown in Figs. 46 and 47. The connection of the control arm 680 to its supporting bracket 681 is universal in character for reasons which will hereinafter appear, there being a supporting pin 682 projecting transversely with respect to and somewhat above the shaft 661, and the control arm having an opening therein through which the pin 682 extends. Between the left-hand end of the pin 682 and the control arm 681 an expansive spring 683 is positioned so as to tend to maintain the control arm 680 in the position determined by a flat surface 684 formed on the bracket 681 about the pin 682. In this position, the lower side surface 685, as shown in Fig. 46, bears against the right-hand side of the driven member 671, but by reason of the spring connection provided by the pin 682 and the spring 683, the control member 680 may be rocked so as to move its lower end of the surface 685 away from the surface of the driven member 671. When the clutch teeth 672 are engaged and are being rotated in the direction indicated by the arrows in Figs. 46 and 47, a pin 686 mounted on and projecting radially from the driven member 671 is positioned in the axial relation indicated by the dotted-line position of Fig. 47 so that as the rotation of the driven member 671 progresses, the projecting pin 686 moves to substantially the position shown in dotted lines in Fig. 47 and in continued movement it engages a cam surface 687 formed on the left-hand edge of the control arm 680 (Fig. 47). This cam surface 687 serves in continued rotative movement of the driven member 671 to shift the driven member to the left in Fig. 47, thereby to disengage the clutch teeth. The thrust endwise of the shaft 661 is taken by a pressure roller 689 which is mounted on the control arm 680 and rides against a flange 690.

As the clutch teeth are disengaged the momentum of the driven member 671 and the associated parts serves to shift the pin 686 beyond the leading cam surface 687 and onto a dwell surface 691 which may be termed a stop surface. To guard against undue movement along the stop surface 691, the control arm 680 is provided with an abutment 692 which normally lies in the path of the pin 686 at the lower end of the stop surface 691, as viewed in Fig. 47.

When the clutch teeth 672 are to be engaged to initiate another printing cycle, the control arm 680 is withdrawn from its controlling relation with respect to the pin 686, and this releasing action is effected by shifting the lower end of the control arm to the right in Fig. 46. In the present instance, the releasing action is obtained through the medium of a solenoid 695 which will herein be termed the clutch solenoid. The solenoid 695 has an armature 696 which is operatively connected to the control arm 680 to withdraw the control arm to the right in Fig. 46 whenever the solenoid 695 is energized, and this connection is such that the control arm 680 is permitted to return to its operative relation to the driven member 671 soon after the rotative movement of the driven member 671 has started, thereby to permit the control arm 680 to exercise its stopping action in the terminal portion of the rotative movement of the driven member. In the present instance, this operative connection comprises a release arm 700 pivoted on a horizontal axis to the projecting end of the armature 696 by means of a pivot pin 701, this pivot pin 701 (Figs. 7, 17 and 46) projecting to the left in Fig. 7 to such an extent as to ride in a guide slot 702 formed in an upstanding bracket member 703 which is mounted on the mounting plate 655. The right-hand portion of the release arm 700 is disposed in a vertical plane as shown in Figs. 7 and 46, while intermediate its ends the release arm is twisted about its longitudinal axis as indicated at 704 so that the left-hand end thereof as seen in Fig. 46 is positioned in a substantially horizontal plane and underlies the lower end of the control arm 680 as well as the driven member 671. On the upper face of the left-hand portion of the release arm 700, a lug or tooth 705 is provided in such a position that when the armature 696 and the release arm 700 are in their left-hand positions of Fig. 46, the tooth 705 may be engaged with the lower left-hand side surface of the control member 680. The tooth 705 is maintained in engagement with the lower end of the control arm 680 by means of a spring 706 secured to an anchor pin 707 mounted in the bracket 703 and connected at its other end to an arm 708 which extends downwardly from the release arm 700. This spring 706 tends to rock the release arm 700 in a clockwise direction around its pivot 701, and in addition exerts a force upon the armature 696 tending to draw the armature to the left in Fig. 46.

When the solenoid 695 is actuated to withdraw the control arm 680 to the right in Fig. 46, thereby to allow the clutch to become engaged, the pin 686 on the driven member 671 is released so as to permit endwise clutch-engaging movement of the driven member 671. Upon such engagement of the clutch, the pin 686 moves downwardly as shown in Fig. 46, and engages a portion of the top surface of the release arm 700, thereby rocking the release arm 700 downwardly about its pivot 701 so as to disengage the tooth 705 from the control arm 680. By reason of this action, the control arm 680 is released and is moved back to its active left-hand position of Fig. 46 early in the rotative movement of the driven member 671. Hence, when the pin 686 has been moved substantially through a complete revolution, it engages the cam surface 687 of the control arm so as to disengage the clutch teeth. The driven member 671 may continue its movement until it engages the abutment or shoulder 692, at which point the rotative movement of the driven member is positively stopped. Since the release arm 700 is disengaged from the control arm 680 early in the rotative movement of the driven member 671, its controlling function as to the control arm 680 cannot again be exercised until the solenoid 695 has been deenergized; and even such deenergization is ineffective to reestablish control of the solenoid until after the pin 686 has moved out of engagement with the end of the release arm 700. In the present instance the pin 686 is effective to maintain the release arm 700 in its ineffective downwardly tilted position for substantially one hundred thirty-five degrees of rotation of the driven member 671 of the clutch. Upon such deenergization of the solenoid 695, the armature 696 and the release arm 700 move to the left, and by reason of a sloping cam surface 705' formed on the tooth 705, the arm 700 is tilted down slightly as it moves to the left, with the result that the tooth 705 moves past the lower end of the control arm 680 and is then moved upwardly into its operative engaging relation, as shown in Fig. 46. The clutch mechanism is then conditioned for a succeeding operation when the solenoid is again energized.

Automatic carriage tabulation

The present machine is in many instances used to form a series of control devices wherein most of the control numbers 65 contain the same number of digits, as for example, a particular list from which control devices are being made may be such that most of its numbers contain three digits, and the present machine is arranged to facilitate and simplify the operation and use of the machine where such substantial uniformity in the successive control numbers is present. To this end means is provided whereby the punch carriage and the set-up carriage may be automatically returned to any predetermined tabulated position after the completion of each printing operation. This end is attained in the present embodiment by adjustable cam means 710 located beneath the left-hand end of the carriage supporting rail 111 and having a rotative adjusting handle 711 projecting forwardly from the machine housing 67, as shown in Figs. 1 and 2. This cam mechanism 710 is arranged to impart the desired restoring or return movement to the carriages 110 and 411 in a single rotation of the cam device, and in the present instance the cam mechanism 710 is driven from the one-revolution clutch 506 so as to be rotated through a single revolution in each operation or rotation of the cam shaft 500. As has been pointed out, the gear 663 is fixed to the shaft 661 so that the shaft 661 rotates through one revolution each time the clutch 506 is operated. The drive for the cam mechanism 710 is, therefore, taken from the shaft 661 which has a bevel gear 712 fixed to its left-hand end as shown in Figs. 7 and 12. This bevel gear 712 meshes with a bevel gear 713 of the same size which is fixed on the rear end of a shaft 714, the shaft 714 being mounted in an upstanding bifurcated bearing member 715 formed on the mounting plate 655. The shaft 714 extends in a horizontal direction perpendicular to the front of the machine, and at its forward end has a pinion 716 fixed thereto. This pinion 716 meshes with a pinion 717 which is fixed to the rear end of a parallel shaft 718 which carries the cam mechanism 710. The shaft 718 is mounted in a pair of spaced upstanding bearing members 719 which are formed on the mounting base portion 141 of the punch standard 102. Due to the proportioning of the gearing, the shaft 718 is rotated through a single revolution each time the clutch 506 is operated.

The cam mechanism 710 exerts its returning or tabulating action on the two carriages 110 and 411 through operative connection with the punch carriage 110, and such operative connection is in the present instance provided by a lever 730 pivoted at its lower end at 731 to the base portion 141, and having its upper end operatively connected to the punch carriage 110 by a pin and slot connection 732. Thus by actuation of the lever 730 about its pivot 731, the punch carriage 110 may be actuated to the right in Fig. 8. To effect such actuation a cam roller 733 is mounted on the lever 730 intermediate its ends so as to be in a position to be engaged by the cam mechanism 710 in its rotative movement.

The cam mechanism 710 is so arranged that it may be adjusted to vary the extent of the right-hand movement which it imparts to the punch carriage 110, thereby to permit adjustment or variation of the tabulated position to which the punch carriage 110 is returned by the cam mechanism. The cam mechanism 710, and the construction whereby such variation or adjustment may be obtained, are best shown in Figs. 39 to 45, inclusive, of the drawings. As shown in Fig. 45, the shaft 718 has a flange 735 formed thereon just forwardly of the forward bearing member 719, this flange 735 being concentric with the axis of the shaft 718, and forwardly of the flange 735 a reduced axial extension 736 is formed on the shaft. Immediately adjacent the forward face of the flange 735 an eccentric 737 is provided on the shaft, in the present instance by integral formation with respect to the shaft, and upon this eccentric 737 a cam member 740 is mounted, the cam member 740 having an eccentrically located bearing opening 741 therein embracing the eccentric 737. As herein shown, the cam member 740 is generally circular in form and as hereinabove pointed out, the bearing opening 741 is eccentrically located. Thus by adjustment of the cam 740 about the eccentric 737, the relation of the cam 740 to the axis of the shaft 718 may be varied. In the present instance, the cam 740 and the eccentric 737 are so related that rotative adjustment of the cam 740 through one hundred eighty degrees with respect to the shaft 718 serves to shift the cam 740 from a concentric relation with respect to the shaft 718 to its maximum projecting position with respect to the shaft 718. The concentric relation of the cam 740 is illustrated in Fig. 44, while the maximum projecting position is illustrated in Figs. 39, 40 and 42, and it will be observed that in the present construction this maximum projecting position is so proportioned that the carriage 110 will be returned to its fifth order position, or in other words, to the ten thousands order position.

The cam 740 is adjustable about the eccentric by means of the adjusting mechanism 711, this mechanism in the present instance comprising a spool-like sleeve 741' mounted upon the projecting reduced end 736 of the shaft 718. At its rear end (right-hand end in Figs. 39 and 41), the sleeve 741' has a flange 742 which normally abuts the forward face of the cam 740 as shown in Fig. 39, and in the flange 742 a locking pin 743 is mounted so as to project through a radial slot 744 formed in the cam 740 and into any selected one of a plurality of locking opening 745 formed in the flange 735. When it is desired to rotatively adjust the cam 740, the sleeve 741' is withdrawn forwardly to the position shown in Fig. 41 wherein the locking pin 743 has its end still engaged with the radial slot 744 of the cam but is out of engagement with the locking openings 745 of the flange 735. To hold the cam 740 in the desired endwise position while the sleeve 741' is thus withdrawn, a washer 746 is pinned onto the reduced portion 736 of the shaft 718 so as to abut the forward face of the cam 740, and when the adjusting sleeve 741' is in its rearmost position of Fig. 39, the washer 746 is embraced within a clearance recess 747 formed in the rear end of the sleeve 741'. The sleeve 741' is urged toward its rear-most position by an expansive coil spring 748 which surrounds the reduced portion 736 within a recess 749 formed in the forward end of the sleeve 741'. The spring 748 acts between the rear end of the recess 749 and a nut or head 750 which is threaded onto the reduced forward end 736 of the shaft 718.

When the sleeve 741' is withdrawn to the position in Fig. 41, the cam 740 may be rotated to any one of its five adjusted positions, and when the desired adjusted position has been reached the sleeve 741' is released so that it moves rearwardly and engages the pin 743 with the aperture 745 which pertains to the desired adjusted position. The several apertures 745 vary somewhat in angular positioning about the axis of the shaft 718 so as to attain the desired extent of return movement of the carriage in each of the several adjusted positions of the cam 740. Since the cam mechanism is normally enclosed within the housing of the machine, means is provided on the projecting forward end of the adjusting mechanism 711 whereby the position of adjustment of the cam mechanism is visually indicated, and this indication is arranged to correspond with the indication given by the scale 193 and the pointer 192. In its present form, comprises a radial index mark 751 on the forward face of the head 750 adapted to cooperate with a scale 752 formed on the forward end of the sleeve 741' immediately adjacent to the peripheral edge of the head 750.

The cam mechanism 710, of course, has a normal or rest position in which it remains during the punching operation, this rest position being shown in Figs. 39 to 44, inclusive, of the drawings. When the cam 740 is adjusted to its "1" position, and the cam shaft 718 is in its rest position, a flat side 755 formed on the generally circular cam 740 is positioned opposite the cam roller 733 so that after the punch mechanism has been operated in the units order position of the punch carriage 110, the carriage will be allowed to move slightly past its units order position, thereby to actuate the safety lever 330 and thereby lock the keyboard 69 of the punch.

The cam roller 733 is of such a width that it may extend into the space occupied by the cam 740 between the flanges 735 and 742, and when the cam 740 is adjusted to the concentric relation or "1" position of Fig. 43, the clearance provided by the flat on the cam 740 provides for movement of the cam roller 733 beyond the position which it assumes when the carriage is in its units order position. When, however, the cam 740 is adjusted to one of its other positions such as the "5" position of Fig. 40, the flat surface 755 will be withdrawn in a rotative sense, as illustrated by the two different cam positionings shown in Fig. 42, but in all of its other adjusted relationships the cam 740 assumes a rest position which provides clearance for the required additional movement of the carriage 110.

When, after such locking of the keyboard, the operator attempts to depress another key, such depression of the key is positively prevented, with the result that the operator is warned that due to improper initial tabulation or improper spacing of the carriage 110, all or part of the punching operations thus far performed upon the control device have been performed in an improper columnar relation upon the control device. The operator may, therefore, discard the control device 63 or the card 90 which has been improperly punched, and after clearing the stop mechanism 408 of the printing mechanism in a manner to be hereinafter explained, may proceed with the preparation of a correctly punched control device.

The automatic carriage returning function of the cam mechanism 710 takes place, of course, during the different portions of the rotative movement of the cam shaft 500, as determined by the rotative adjustment of the cam 740, and due to the geared interconnection of the carriage 110 with the set-up carriage 411 of the printing mechanism, the cam mechanism 710 also functions to return the set-up carriage 411 to the desired columnar relationship to the printing mechanism.

The verifying station

When the printing mechanism is to be operated upon a control device 63 positioned at the verifying station 64, the positioning of the control device at the control station is facilitated by guide means which form a part of the verifying station 64. This guide means includes a slot 760 (Figs. 9 and 10) formed in a horizontal top portion 761 of the machine casing immediately forwardly of a downwardly sloping surface 762 of the machine casing, so that when a control device 63 is moved downwardly through the slot 760, it is engaged with additional guide means formed as a part of the platen 406. As shown in Figs. 29 to 32, inclusive, the control device is so positioned at the verifying station 64 that the control card 90 is located along the lower forward edge of the frame, with the result that the spacing flanges 80' extend generally vertically and project in a forward direction with relation to the machine. Thus, as the downward movement of the control device 63 through the slot 760 progresses, the spacing flanges 80' move downwardly within slots 763 formed as a part of the platen 406. The platen 406, as shown in Fig. 32, comprises a relatively rigid bar 764 extending between the two side frame members 413 and secured therein by screws 765. At the printing position, the platen 406 projects somewhat from the rear surface 766 of the bar, as shown in Fig. 32, so as to provide a firm backing for the frame 80, and the two guide slots 763 are formed in the rear surface of the bar 764 on opposite sides of the platen 406. The downward movement of the control member along the platen 406 is limited by suitable stop means so as to insure printing of the verifying number in the desired relation to the then lower edge of the control card 90, and it will be observed that the proper relationship of the control device 63 in an endwise or horizontal direction is determined by the interengagement of the spacing flanges 80' with the guide slots 763, with the result that the verifying number 65 is in each instance printed in a columnar relation on the card 90 which corresponds to the columnar position of the punched representations of the control data.

Printer control switch means

The stop means which limits the downward movement of the control device 63 is in the present instance of such a character that engagement of the control device with the stop means serves to actuate a control means which institutes a printing cycle of the printing mechanism as soon as the control device 63 has reached the predetermined printing position on the platen 406. Thus as shown in Figs. 28 to 32, inclusive, the stop means which limits the downward movement of the control device 63 along the platen 406 comprises a pair of levers 770, one of which is pivoted at each end of the bar 764, so that stop lugs 771 formed on the ends of the levers 770 underlie the lower ends of the guide slots 763 in positions wherein they are engaged by the lower ends of the spacing flanges 80' as the control device is moved downwardly. In the present instance, the pivotal mounting for each of the levers 770 is provided by an angle bracket 772 secured to the lower edge of the bar 764. The angle brackets 772 are located relatively close to the ends of the bar 764 so that each lever 770 projects from its pivot 773 toward the center portion of the bar 764, and the stop lugs 771 are formed on the adjacent ends of the levers 770. Immediately under its stop lug 771 each lever 770 has a stud 775 projecting in a forward direction to a point beyond the forward edge of the bar 764, and the forward ends of the two studs 775 are interconnected by a bar 776 having slots 777 therein embracing the forward ends of the studs 775 and held in place on the studs by means of washers 778. The levers 770 are normally biased so as to raise their stop lugs 771 upwardly, such biasing action preferably being applied thereto by means of springs 779 connected to the forward ends of the studs 775 and anchored to the bar 764. In the present instance the left-hand spring 779 in Fig. 28 has its upper end secured to an anchoring pin 780 while the right-hand spring 779 has its upper end secured to a bracket 781 which extends along the forward face of the bar 764, as shown in Figs. 28 and 29. Means is provided for adjustably limiting the upward movement of the connecting bar 776 and the levers 770 and this means as herein shown is located relatively close to the right-hand end of the bar 776 as shown in Fig. 28. This adjustable limiting means as herein shown comprises a screw 785 extending downwardly through the bracket 781 and adapted to be engaged at its lower end by the bar 776. Thus when a control device 63 is moved downwardly along the rear face of the platen 406, the two stop lugs 771 are engaged and are moved downwardly substantially in unison. This downward movement is utilized to institute a printing cycle of the printing mechanism PR and the operative connection for thus controlling the printing mechanism is provided by an arm 786 formed integrally with the right-hand lever 770 so as to project downwardly along the inner side of the right-hand side frame member 413. At substantially the level of the shaft 541 as shown in Fig. 28, the arm 786 has a laterally projecting end 786' which extends through a clearance opening 788 in the right-hand side frame member 413.

When the arm 786 is rocked in a counterclockwise direction by the action of a control device 63 upon the stop lugs 771, the lateral projection 786' of the arm 786 acts upon a switch means to close the control circuit for the printing mechanism and thereby cause operation of the printing mechanism through a printing cycle. In the present instance, this switch means comprises a pair of switches S3 and S4 which are of the spring blade type and are mounted on the outside of the right-hand side frame member 413 by means of screws 789. The switch S3 has its left-hand blade extended upwardly beyond the right-hand blade so that right-hand movement of the lower end of the lever 786 may act upon the left-hand blade to impart a closing movement to the switch S3. Such closing movement is in the present instance transmitted through a safety lever 795 which, as will hereinafter be explained, is interposed between the extension or projection 786' of the lever 786 and the left-hand blade of the switch S3 when certain conditions are present in the printing mechanism. The other switch S4 is mounted beside the switch S3 so that a transmitting block 796 of insulating material on the right-hand blade member of the switch S3 may when a closing movement is applied to the switch S3 impart a similar closing movement to the switch S4. Thus the two switches S3 and S4 are closed substantially in unison by the rocking action of the arm 786. Such switch closing movement of the arm 786 is limited by an adjustable stop screw 797 which extends through the right-hand side frame member 413 in such a position as to be engaged by the lever 786 when it is rocked in a counterclockwise direction. Thus the stop screw 797 serves to limit the downward movement of the right-hand stop lug 771, so that the downward movement of the control device 63 is terminated at the desired printing position upon the platen 406.

The control circuits

The various electrically energized actuating devices of the punching and printing mechanism of the present machine are controlled through circuit connections which are illustrated diagrammatically in Fig. 53 of the drawings. Power is taken from line voltage leads L1 and L2 through a manual control switch 810 which, as shown in Figs. 7 and 8, is of the toggle type and has its actuating lever projecting through the upper left-hand portion of the enclosing housing 67. In order to simplify the drawings, the switch 810 is shown in Fig. 53 as a knife switch.

From the lead L1, wires 811, 812 and 813 in series extend to one terminal of the punch solenoid 135 while the other terminal of the solenoid is connected to the other lead L2 through circuit means which includes the key actuated control switches S1 and S2. These control switches S1 and S2 serve to govern a relay 814 which when energized acts to close switches 815 and 816. The switch 816 serves when closed to complete the circuit to the punch solenoid 135, while the switch 815 serves merely to provide a holding circuit whereby the desired timing of the operation of the punch solenoid is obtained. One terminal of the switch 816 is therefore connected by a wire 817 to the other terminal of the punch solenoid 135 while the other terminal of the switch 816 is connected by wires 818, 819, 820, and 821 in series to the lead wire L2. Thus the energizing circuit for the punch solenoid 135 is completed upon closure of the relay switch 816, and preferably a condenser 822 is shunted across the switch 816 to prevent arcing.

In obtaining the desired timing in the operation of the punch solenoid 135, the switches S1 and S2 are so related to the actuating bail 301 that the switch S2 is closed relatively early in the downward movement of the bail 301, while the switch S1 is closed only when the bail 301 is relatively close to the downward limit of its travel; and the arrangement is such that the sequence is reversed in the upward movement of the bail 301, the switch S1 in such upward movement being opened relatively soon after such upward movement is started, and the switch S2 being opened only when the bail 301 is relatively close to the upper limit of its travel. This sequence of switch actuation is clearly shown in the accompanying timing chart which constitutes Fig. 54 of the drawings. With this sequence of switch actuation, the switch S1 is arranged to control the initial energization of the relay 814 while the switch S2 is arranged in a relay holding circuit which includes the relay switch 815.

To this end the switch S1 has one of its terminals connected by a wire 823 to the wire 821, while the other terminal of the switch S1 is connected by wires 824 and 825 to one terminal of the relay 814. The other terminal of the relay 814 is connected by a wire 826 to the wire 811, thus to complete the initial energizing circuit to the relay 814 when the switch S1 is closed. In providing the desired holding circuit for the relay 814 one terminal of the switch S2 is connected by the wire 827 to the wire 820, while a wire 828 connects the other terminal of the switch S2 to one terminal of the switch 815. The other terminal of the switch 815 is connected by a wire 829 to the juncture of the wires 824 and 825. Thus after the switch S1 has been closed to initially energize the relay 814, a holding circuit is provided which comprises the wires 811 and 826, the relay 814, wires 825 and 829, the switch 815, the wire 828, the switch S2 and wires 827 and 820 in series to the wire 821. When the upward movement of the bail 301 results in opening the switch S1, the relay 814 is maintained energized through the holding circuit until the bail is relatively close to the end of its upward stroke, at which time the switch S2 is opened. This permits the relay switch 816 to open so as to deenergize the punch solenoid 135.

The drive mechanism for the printing mechanism PR is in the present instance controlled in such a manner that the motor 504 thereof is energized intermittently, that is, the motor operates only during the verifying or printing cycle and is deenergized during the intervening periods when the punching operations are being performed. To produce such operation, the motor 504 is in the present instance energized concurrently with the clutch solenoid 695, and means is provided whereby a running circuit is established for the motor 504 soon after the initiation of a printing operation, with the result that the motor 504 continues its actuation of the printing mechanism through a complete printing cycle independently of continued closure of the switches S3 and S4 during such printing cycle. Thus one terminal of the switch S4 is connected by wires 830 and 831 in series to the wire 812 while wires 832 and 833 in series connect the other terminal of the switch S4 to one terminal of the motor 504. The other terminal of the motor 504 is connected by wires 834 and 835 in series to the wire 819, so that when the switch S4 is closed, the motor 504 is energized so as to start rotation of the driving member of the clutch 506. The clutch control solenoid 695 is concurrently energized to release the driven member of the clutch 506, thereby to initiate operation of the printing mechanism. To provide a circuit to thus energize the clutch solenoid 695, a wire 836 connects the wire 830 to one terminal of the switch S3, while a wire 837 connects the other terminal of the switch S3 to one terminal of the clutch solenoid 695, the other terminal of the clutch solenoid 695 being connected to the wire 835 by a wire 838. Preferably a condenser 839 is shunted across the terminal of the switch S3 to prevent arcing. As shown in Fig. 9, the two condensers 822 and 839 and the relay 814 are mounted along the right-hand side of the base 101 outside of the right-hand side frame member 413.

After the motor 504 and the clutch solenoid 695 have been energized so as to initiate a printing cycle of the printing mechanism PR, completion of the printing cycle is assured by cam mechanism which is driven from the driven member of the clutch 506 and which provides a running circuit for the motor 504. In the form herein shown this mechanism comprises a disc type cam 840 which, as shown in Figs. 10 and 47, is mounted on the hub 664' of the gear 664. The cam 840 is arranged to control a switch 841 which is normally open and is of the spring blade type. A tooth-like follower element 842 on one blade of the switch 841 is arranged to engage the peripheral cam edge or surface of the cam 840, and when the rotation of the gear 664 is terminated, the cam 840 is in the rest position shown in Figs. 10 and 53. In this rest position the cam follower 842 engages a relieved or depressed portion 843 formed in the periphery of the cam 840 so that the switch 841 is open. When rotation of the gear 664 and the cam 840 is initiated, the follower 842 is cammed outwardly from the relieved portion 843 so as to close the switch 841. When thus closed the switch 841 provides the desired running circuit for the motor 504, there being a wire 845 connecting one terminal of the switch 841 to the wire 840 and a wire 846 connecting the other terminal of the switch 841 to the wire 833.

The relieved portion 843 of the cam 840 is relatively short in an angular sense so that the cam 840 serves to maintain the switch 841 closed until the desired single revolution of the gear 664 has been substantially completed. The relieved portion 843 is in the present instance somewhat elongated in an angular sense so as to compensate for the inertia for the driven parts and thereby reduce the strain upon the stop mechanism of the driven parts of the one-revolution clutch mechanism 506.

As hereinabove pointed out, a safety lever 795 is interposed between the switch closing arm 786 and the switches S3 and S4, and this safety arm is arranged to be withdrawn from its active position of Figs. 15 and 53 soon after the initiation of the printing cycle, thereby to make sure that operation of the printing mechanism will terminate at the end of the desired single cycle of operation. The operation of the safety lever 795 is so arranged that in the event that the operator inadvertently maintains the control device 63 at printing position after the printing operation is completed, the operation of the printing mechanism PR will be stopped at the end of the single desired cycle. Additionally the safety lever 795 serves to protect the clutch mechanism 506 against the rather remote possibility that repeated actuation or closure of the switch S3 early in its operative cycle might disrupt its operating characteristics.

In the present embodiment the safety lever 795 comprises one arm of a bell crank structure 845 which is mounted on a stud 846 which projects to the right from the right-hand side frame member 413 just below the cross bar of the hammer bail 551. The other arm 847 of the bell crank 845 extends upwardly and to the right in Fig. 15 so as to underlie the lower edge of the arm 571 of the hammer latching bell crank 551. A spring 848 acting between the arm 552 and a stud 849 on the arm 571 serves to maintain the end of the arm 552 in engagement with the lower edge of the arm 571. The hammer latching bail 551 is shown in Fig. 15 in the latching or acting position which it occupies prior to the commencement of a printing operation and when the bail 551 is in this active position the safety arm 795 is in its active position wherein its end is located between the switch actuating arm 786 and the switch S3. The safety arm 795 is preferably formed from a strip of spring steel so as to allow for bending thereof when the switch actuating arm 786 moves to the right in Fig. 28, and to provide the requisite thickness between the arm 786 and the switch S3, a relatively thick disc or button 795' is mounted on the arm 795, as shown in Fig. 28.

It will be observed in Fig. 15 of the drawings that when the cam shaft 500 starts its one-revolution cycle from the rest position, the leading surface 577 moves into engagement with the cam roller 574 almost immediately so as to start a relatively slow releasing movement of the hammer latch 551. In this movement of the hammer latch the bell crank 845 is rocked in a clockwise direction so that the end of the safety arm 795 is withdrawn gradually from its active relation at about the time the hammers are released. This withdrawal of the safety arm 795 takes place after the pin 686 of the clutch has disengaged the tooth 705 from the control arm 680 so that the control arm 680 has returned to its operative engagement with the side of the driven member 671. Thus, the clutch is at this time conditioned so as to attain its automatic stopping action at the end of the single revolution of the driven element thereof, and the mechanism for closing the switch S3 which controls the clutch solenoid 695 is disabled. Hence the operator during the succeeding portion of the printing cycle during which actual printing operations are being performed, can not reenergize the solenoid 695 and hence cannot disable the control lever 680. The switch actuating mechanism for the switch S3 is positively maintained in this disabled position until the hammers have been restored to their latched positions, and during subsequent portions of the cycle, the return of the safety lever 795 to its active position is governed by the positioning of the control device 63 at the printing position.

When the safety lever 795 is being rocked in a clockwise direction (Fig. 9) by the hammer latch bail 551, the relatively thin resilient lever 795 is bent or tensioned to the right by reason of the engagement of the projection 786' therewith, and upon movement of the lever 795 upwardly beyond the projection 786' (Fig. 53) the lever 795 shifts to the left so as to overlie the projection 786'. Hence, when the return movement of the hammer latching bail 551 tends through the spring 848 to return the safety lever 795 to its active position, such return is prevented by the latching action of the projection 786' upon the safety lever 795. Thus the safety lever 795 tends to return to its active position after the actual printing operations are completed, but such return cannot take place until withdrawal of the control device 63 from the verifying position has caused unlatching movement of the arm 786 and its projection 786'. Thus in the event that the control device is maintained in printing position until the completion of the one-revolution cycle, or even for a period after the completion of this one-revolution cycle, the safety lever 795 will be maintained latched in its inactive position and the switches S3 and S4 will remain open. Hence the printing mechanism PR will invariably stop upon the completion of the desired single printing cycle.

In the event that the operator discovers an error in the punching operations performed upon a control device 63, it is necessary that the stop mechanism 408 be cleared before the operator starts the preparation of a new control device to replace the one which has been incorrectly formed. To enable such a clearing operation to be performed readily and easily, means is provided for operating the printing mechanism PR through an idle stroke or cycle, without the necessity of placing the control device 63 at the verifying station 64. In the present instance this means is arranged to utilize the normal control switches S3 and S4, and comprises a clearing lever 850 projecting from the forward portion 761 of the housing immediately over the recess 100 as shown in Figs. 1, 2, 9, 10 and 11. This clearing lever 850 is located in a generally horizontal position and is pivoted at 851 intermediate its ends on a bracket 852 which is fixed to and projects downwardly from the inner side of the top wall of the housing section 761. At its rear end, or right-hand end as shown in Fig. 9, this lever is arranged so that when the lever is rocked about its pivot 851 its rear end 853 is operable upon the cross bar 776 to impart a switch closing movement to the bell crank arm 786. Such operative connection between the lever 850 and the bar 776 is provided by a vertical slide bar 855 mounted for vertical sliding movement along the rear edge of the bar 764 by means of the bracket 781 as shown in Fig. 28. At its lower end the slide bar 855 has a forwardly projecting arm 856 which overlies and rests upon the bar 776 as shown in Figs. 31 and 32. At its upper end the slide bar 855 has a forwardly projecting arm 857 which underlies the rear end 853 of the clearing lever 850. Thus, when the projecting forward end of the clearing lever 850 is raised, the rear end 853 thereof is forced downwardly to impart a switch closing movement to the bar 776 and the associated bell crank arm 786. Since the springs 779 normally hold the bar 776 upwardly to the extent determined by the adjustment screw 785, it will be evident that the clearing lever 850 is normally maintained in its most counterclockwise position of Fig. 9.

Since the clearing lever 850 is mounted on the wall 761, it will be evident that it will be carried by the housing section 70 when this housing section is pivoted rearwardly about the pivot 860 which is located along the lower rear edge of the housing section 70. When the housing section 70 is thus moved about its pivot to expose the punching mechanism and the printing mechanism, the end 853 of the clearing lever 850 is merely raised from its normal engaging relation with respect to the arm 857, and the clearing lever 850 is maintained in proper relation for reengagement with the arm 857 by forming the opening in the casing section 761 through which the clearing lever 850 extends of such a size as to limit pivotal movement of the clearing lever 850 with respect to the casing. Such limited movement, however, is sufficient to permit switch engaging movement of the clearing lever 850 when it is in its operative relation to the arm 857.

As disclosed herein, the machine of the present invention is adapted to form the representations of the digits of the control number successively from left to right on the control device 63, in natural reading sequence, the representation of the digit of the highest order being first formed, and the representations pertaining to the lower orders being formed in succession so that the representations pertaining to the digit of the units order are last formed in each instance. It will be evident, however, that the representations of the individual digits of the control number could be formed in a reverse sequence, so that the representations pertaining to the digit of the lowest or units order would be first formed, and the representations of the higher orders formed in succession until the control number has been completely formed or represented on the control device.

Operation

In the use of the machine as herein disclosed, the operator is provided with a plurality of control devices 63 which have previously been partially prepared in accordance with a list which also embodies the control data which is to be formed upon each of the control devices through the use of the present machine. When these control devices are received by the operator of the present machine, the printing plates 81 have been embossed and mounted on frames 80 as illustrated in Figs. 3, 4 and 5, impressions from the printing plates 81 have been made upon cards 90, and these cards have been placed in position on frames 80 as shown in Fig. 3. These partially formed printing and control devices are received by the operator of the present machine in drawers or stacks wherein the several printing and control devices are arranged in an order which corresponds to the order of the corresponding names upon the list from which they were prepared, so that the operator of the present machine may then take the first one of the partially prepared printing and control devices from the drawer or magazine and, after placing it in the punch carriage of the present machine, proceed with the formation of the punched representations of the control data which are found on the list opposite the corresponding name.

When such a list and the corresponding group of partially formed printing and control devices are received, the operator must first set the automatic tabulating or carriage resetting mechanism 710, and for this purpose the list is examined to determine what setting of the resetting device 710 will conform to the greatest proportion of the control numbers found on the list. If, for example, it is found that most of the control numbers embodied in the list have four digits, the adjusting sleeve 711 is withdrawn to the position shown in Fig. 41, and then rotated until the number 4 on the sleeve is opposite the index line 751. The sleeve or adjusting device 711 is then released so as to fix the cam mechanism 710 in a position to automatically reset the punch carriage 110 in its number 4 position. The manual line switch 810 is then closed so as to condition the machine for operation. The punch carriage 110 is then shifted or tabulated to the proper position for the performance of the punching operations upon the first one of the partially formed printing and control devices, and such initial positioning may be attained manually by the use of the finger piece 191, or it may be attained by the use of the clearing lever 850 which caused the resetting device 710 to be operated. In the event that the carriage has been tabulated by the resetting device 710 to its number 4 position, for example, and it is found that the first control number contains five digits rather than four, it is then necessary to engage the finger piece 191 to move the carriage 110 one additional space to the right in Fig. 1, such positioning being indicated by the pointer 192 and the cooperating scale 193. If, on the other hand, the pointer 192 indicates that the punch carriage 110 occupies its number 4 position while the control number to be formed includes but three digits, it is necessary to space the carriage 110 one space to the left and this spacing operation is performed by depression of the space key 68'.

In Figs. 3, 4 and 5, the printing and control device has been illustrated as bearing punched representations of the control number "20479," and this number has been printed thereon as the verifying number 65, as shown in Fig. 3, in a position such that each digit of the printed verifying or control number is located immediately above and in the same column as the corresponding punched representations of each digit. In describing the operation of the machine, this control number will be employed as the primary example, and in Figs. 48, 49 and 50, I have illustrated the positions which are assumed by various parts of the printing mechanism PR during the actual printing operation required to print this selected control or verifying number upon the control device 63.

Assuming that the punch carriage 110 has, through the use of the clearing lever 850, been automatically set to its number 4 position, the operator in producing the control device of Fig. 3, shifts the carriage 10 from its number 4 position to its number 5 position through the use of the finger piece 191. The partially formed control device 62, carrying the card 90 in its imperforate form, is then mounted on the punch carriage 110. In such a mounting operation the parts of the supporting mechanism of the carriage are initially in the positions shown in Fig. 35 of the drawings so as to be conditioned for a loading operation, and the control device 63 is moved rearwardly in the two slots 153' and 154' so as to engage the rear edge of the control device 63 with the lug 172' of the bell crank 172. Further rearward movement acts to shift the lug 168 out of its latching relation to the shoulder 170 so as to release the plunger 165 for forward movement by its spring 167. In such forward movement the cam surface 164 operates upon the dog 161 to force the dog against the end edge of the control device 63. When the control device reaches the proper position in the slots 153' and 154', the pointed end 163 of the dog 161 engages the notch 169 in the end edge of the control device so as to hold the control device in the proper position on the punch carriage.

The control device 63 and the machine are then conditioned for the performance of the first punching operation which is to form a coded representation of the numeral 2 in the first or ten thousands columnar position on the control device 63. To form such a representation, the "2" key of the key board 69 is depressed, such depression of the "2" key being operative to engage its supporting lever 220 with one of the angle brackets 245 of the transmitting lever 240a, as shown in Fig. 18. Such depression of the transmitting lever 240a causes the other or left-hand angle bracket 245 to press the associated plunger 251 downwardly, thereby to actuate the Bowden wire 250' of the associated Bowden cable 250a. This actuating movement is transmitted by the Bowden wire of the Bowden cable 250a to the associated plunger 255 which underlies the arm 265 of the associated bell crank 260. The associated bell crank 260 is thereby rocked in a counterclockwise direction (Figs. 18 and 19) until the pointed end of its arm 265 is disengaged from the lower notch 273 of its retaining pawl 270 and is engaged with the upper notch 273 thereof. In such rocking movement the actuated bell crank operates to shift the associated selector bar 130a to its active position which corresponds to the dotted-line position shown in Fig. 19, thereby to position the blocking head 131 thereof in a position wherein it overlies the head of the punch 105a. Thus, when the punch actuating bell crank 115 is rocked through an operating cycle, the punch 105a will operate to punch a hole 95 in the lower one of the five positions (Fig. 6) in the ten thousands order columnar position on the control device 63, thus to form a coded representation of the digit "2" in accordance with the five-unit code illustrated in Fig. 6.

The actuation of the punch bell crank 115 takes place in proper timed relation after the selector bar 130a has been moved into its active position. Thus, during the downward movement of the "2" key, its supporting lever 220 operatively engages and imparts downward rocking movement to the bail 301 so that near the lower limit of the downward stroke of the "2" key, the control switch S1 is closed. Such switch closure provides an initial energizing circuit to the control relay 814 so that the relay 814 is energized only after the desired setting movement of the selector bar 130 has been effected. Energization of the relay 814 closes the punch control switch 816 whereby to complete an energizing circuit to the punch solenoid 135 and cause the solenoid to act through its transmitting bell crank 138 to rock the punch actuating bell crank 115 through the clockwise portion of its cycle. The sequence and timing of these operations are shown in the timing chart of Fig. 54 although the timing chart illustrates the operation of the machine for but a three-order control number. It will be recognized, however, that the timing of the elements of the punching mechanism and control are the same for each punching cycle. Thus, it will be evident from the timing chart of Fig. 54 that the switch S1 is closed relatively late in the downward stroke of the selected number key, and that upon such closure of the switch S1, the relay 814 is energized so as to close the punch switch 816 and the holding circuit switch 815. The holding circuit, of course, includes the switch S2 which, as shown in the timing chart, is closed early in the downward stroke of the key. The switch S2 remains closed until relatively late in the upward stroke of the key, so that even though the switch S1 is subsequently opened, the relay 814 is maintained energized through its holding circuit until relatively late in the upward stroke of the selected key. Hence the punch solenoid 135 is maintained energized until the return stroke of the key is substantially completed. When the relay 814 is deenergized so as to break the solenoid circuit, return or counterclockwise movement of the punch bell crank 115 takes place under the influence of the return spring 145, and in such return movement serves to effect the desired carriage spacing operation as well as a positive restoring or normalizing action upon the selector bar 130a.

During the period of depression of the "2" key, the balls 230 of the keyboard interlock are spread apart beneath the lever 220 of the "2" key so as to block the paths of all of the other levers 220, and thereby lock the keyboard as indicated in the timing chart of Fig. 54 and prevent depression of any of the other keys. Similar locking operation results during the depression of any of the other keys of the keyboard 68.

When the "2" key is thus depressed, it also acts through the set-up carriage 411 to set up the stop 409 which pertains to the numeral "2" in the ten thousands order portion or group of the stop mechanism 408. The action of the mechanism of the set-up carriage 411 upon proper or corresponding group or order of the stop mechanism 408 results from the interconnection of the punch carriage 110 and the set-up carriage 411 which connection is such that the two carriages move in unison and are at all times positioned in corresponding columnar positions. Thus, as shown in Figs. 48 and 49, the depression of the "2" key as hereinafter described rocks the rear end of its lever 220 upwardly from the position shown in Fig. 48 to the position shown in Fig. 49, so as to act upon the transverse portion of the bail 443 which pertains to the numeral "2" and rock this bail upwardly. Such actuation of the bail 443 serves to actuate the corresponding actuating pin 440 upwardly from the position of Fig. 48 to the position of Fig. 49, so as to engage and actuate the stop pin 409 which pertains to the numeral "2" in the ten thousands order group of the stop mechanism 408. In Fig. 23, the set-up carriage 411 is shown in its left-hand or ten thousands order position, and the pin pertaining to the numeral "2" in that order, and which is thus actuated to set position, is indicated in Fig. 23 by the circled reference numeral 2.

When the "2" key is released for return to its normal elevated position, the associated actuating pin 440 and bail 443 return to their lower or inactive positions of Fig. 48 under the influence of the return spring 455. However, the stop pin pertaining to the numeral "2" in the ten thousands order remains in its elevated or set position of Fig. 48, due to the frictional action of its retaining spring 486.

In the return or counterclockwise movement of the punch bell crank 115, as hereinabove described, it acts to impart a positive return or restoring movement to the selector bar 130a, and also operates to impart a character spacing or advancing movement to the carriages 110 and 411. This action is attained through the latch device 213 shown in Fig. 19, the latching arm 215 having been engaged with the arm 211 of the cam shaft 200 during the clockwise movement of the punch bell crank 115. Thus, as the return or counterclockwise movement of the bell crank 115 progresses, the tooth 115' engages the arm 211 and rocks the cam shaft 200 in a counterclockwise direction (Fig. 19). In such counterclockwise rocking movement of the shaft 200, the link 284 and the restoring bail 280 act on the bell crank 260 of the selector bar 130a to restore the bar 130a to its inactive position in which position it is maintained by the lower notch 273 of its latch 270.

As the cam shaft 200 rocks in a counterclockwise direction, it moves the pawl 205 of the escapement 190 from its inactive position of Fig. 18 to its elevated or active position, and thereafter withdraws the pawl 204 downwardly so as to permit the carriages 110 and 411 to advance through a part of a character spacing movement. When the punch bell crank 115 has substantially reached the limit of its return movement, the latch device 213 engages the stop 218 so as to be unlatched from the arm 211, and the spring 210 then acts to return the shaft 200 in a clockwise direction to its initial position of Fig. 19. In this return movement the restoring bail 280 is elevated to its inactive position of Fig. 19, while the pawl 205 of the escapement mechanism 190 is returned to its elevated active position of Fig. 18, and the pawl 204 is withdrawn so as to complete the advancing movements of the carriages 110 and 411. Thus, the punch carriage 110 and the set-up carriage 411 are properly positioned for the performance of the punching and set-up operations pertaining to the thousands order of the control number.

In the control number "20479" which has been selected as an illustrative working example, the thousands order columnar position on the control device is to bear a physical representation and a printed representation of a zero, and since the code shown in Fig. 6 requires a blank or imperforate area as a physical representation of zero, no punching operation is required. The printing mechanism PR must, however, be set up for the printing of a zero. The zero key of the punch keyboard 69 is, therefore, depressed, and since this key is independent of all of the selector bars 130, these bars will remain in their normal or inactive positions. Hence, when the punch solenoid 135 is energized due to the depression of the zero key, the punch bell crank 115 moves idly through the clockwise portion of its stroke, the several punches 105 merely moving down to rest positions on the control card 90 and remaining in this ineffective position or relation while the punch supporting bail 120 idles downwardly along the punches 105. Such movement of the punch bell crank 115 engages the latch 213 with the arm 211 of the cam shaft 200 so as to condition the mechanism for the performance of a carriage spacing operation in the return movement of the punch bell crank.

In the downward actuation of the zero key, the rear end of its supporting lever engages the bail 443 which pertains to zero, thereby to impart as upward shift movement to the actuating pin 409 pertaining to zero in the thousands order of the stop mechanism 408. This pin 409 is indicated in Fig. 23 by the circled representation of zero. As the zero key returns to its elevated position, the bail 443 and the actuating pin 440 return to their normal positions of Fig. 48, while the stop pin 409 pertaining to zero in the thousands order of the stop mechanism 408 remains in its extending or set position of Fig. 48.

When the return movement of the zero key causes the switch S2 to be opened, the solenoid 135 is deenergized and the return movement of the punch bell crank 115 is initiated. Such movement causes carriage spacing operation of the escapement 190 so that the punch carriage 110 and the set-up carriage 411 are advanced to their hundreds order positions and are thereby conditioned for performance of the punching and set-up operations pertaining to that order of the control member.

With the carriages 110 and 411 thus positioned, the "4" key is depressed, and in its downward movement the right-hand angle bracket 245 (Fig. 18) of the transmitting lever 240b is engaged so as to correspondingly depress the lever 240b. The left-hand angle bracket 245 of the transmitting lever 240b therefore acts on its associated plunger 251 to actuate the Bowden wire of the Bowden cable 250b. This actuation or movement is transmitted to the associated plunger 255 which elevates the arm 265 which is associated therewith and thereby shifts the associated selector bar 130b to its active position. The depression of the "4" key also acts through the bail 301 to close the control switches S1 and S2 in the same manner as has been described in connection with the formation of the representation of the numeral "2," so that after the selector bar 130b has been set in its active position, the punch solenoid is energized and operates the punch bell crank 115 through the active punching portion of its cycle.

Since the selector bar 130b has been set in its active position, while all the other selector bars 130 are in their inactive positions, such operation of the bell crank 115 causes punching operation of the punch 105b, thereby to form a punched hole or perforation 95 in position shown as representing the numeral "4" in the code of Fig. 6.

In the actuation of the "4" key, the rear end of its supporting lever 220 actuates the bail 443 pertaining to the numeral "4," and thereby moves the actuating pin 440 pertaining to "4" in an upward direction. Since the set-up carriage 411 is in its hundreds order position, the stop pin 409 pertaining to "4" in the hundreds order group of the stop mechanism 408, is shifted to its active or set position of Fig. 48. This pin 409 is indicated in Fig. 23 by the circled numeral "4." The set "4" pin, of course, is frictionally retained in its set position, while the actuating pin 440 and the bail 443 pertaining to "4" return to their inactive positions as the "4" key returns to its normal elevated position.

When the "4" key is allowed to return to its elevated position, the cam shaft 200 is actuated through its operating cycle, as has been described, so as to return the selector bar 130b to its inactive position and effect carriage spacing or advancing movement of the carriages 110 and 411. In this spacing operation the carriages 110 and 411 are advanced to their tens order positions so as to be conditioned for the next punching and set-up operation.

The "7" key is then depressed to form the desired representation in the tens order columnar position on the control device, and in such movement the supporting lever 220 of the "7" key acts upon the left-hand angle bracket 245 (Fig. 18) of the transmitting lever 240d to actuate the wire of the Bowden cable 250d. Simultaneously, the projection 244, formed on the rear end of the lever 220 pertaining to "7" engages the bail 242 which is connected to the transmitting lever 240e. As a result, the transmitting lever 240e is simultaneously rocked so as to actuate the wire of the Bowden cable 250e.

The two selector bars 130d and 130e are therefore shifted to their active positions, so that in the operating cycle of the punch bell crank 115, as explained in connection with the punching operations relative to the preceding numbers, the two punches 105d and 105e are actuated through a punching stroke. Such operation forms two punched holes or perforations in such positions as to represent the numeral "7" in the tens order columnar position in accordance with the code of Fig. 6.

The downward actuation of the "7" key also acts on the bail 443 pertaining to "7" to rock the same upwardly from the normal position of Fig. 48 to the position of Fig. 49, thereby to project the corresponding actuating pin 440 upwardly as indicated in Fig. 49. Since the set-up carriage 441 is in its tens order position, the upward shifting of the actuating pin 440 pertaining to "7" causes setting of the corresponding stop pin 409 in the tens order of the stop mechanism 408. This pin is indicated in Fig. 23 by the circled numeral "7".

When the upward return of the "7" key causes the return movement of the punch bell crank 115, as described in connection with the preceding punching operations, the cam shaft 200 is moved through its operating cycle so as to restore the two selector bars 130d and 130e to their normal positions, and also to impart an advancing movement to the carriages 110 and 411 through actuation of the escapement 190. The carriages 110 and 411 are thereby shifted to their units order positions so as to be conditioned for the performance of the punching and set-up operations pertaining to that order of the control number.

To form the desired punched representation in the units order columnar position of the control device, the "9" key is depressed, and in the downward movement of the key, its supporting lever 220 engages the angle bracket 245 of the transmitting lever 240e, so that the wire of the Bowden cable 250e operates to shift the selector bar 130e to its active position. Operation of the punch bell crank 115 therefore causes the punch 105e to move through a punching cycle, thereby to form a single perforation 95 in the proper location in the units order columnar position to represent the numeral 9 in accordance with the code of Fig. 6.

As the "9" key is depressed, the rear end thereof acts through the bail 443 pertaining to "9" to project the corresponding actuating pin 440 in an upward direction. Since the set-up carriage 411 is positioned in its units order position, the upward movement of the actuating pin 440 pertaining to "9" results in setting of the corresponding stop pin 409 in the units order group of the stop mechanism 408. This stop pin 409, which is indicated in Fig. 23 by the circled numeral "9", is frictionally retained in its set position of Fig. 49, while the actuating pin 440 and the associated bail 443 return to their normal positions.

When release of the "9" key causes the punch solenoid to be deenergized, the return movement of the punch bell crank 115 operates the cam shaft 200 through its cycle, thereby to restore the selector rod 130e to its normal position and impart an actuating movement to the escapement 190.

In such actuating movement of the escapement 190 in the punching cycle performed in the units order columnar position, the pawl 205 is first moved into operative relation to the right-hand tooth of the ratchet 203, after which the pawl 204 is withdrawn and the carriages 110 and 411 are allowed to move slightly beyond their units order positions as indicated in the timing chart of Fig. 54. In this additional movement the abutment screw 335', carried on the bracket 335 which depends from the carriage 110, engages and actuates the bell crank 339 from its normal position of Fig. 18 to its active position of Fig. 37. Such rocking movement depresses the safety lever 330 into the ball race of the keyboard locking means, thereby to take up the space between the several balls 230 and lock the keyboard 69 against depression of any of the keys thereof.

Such locking of the keyboard after the performance of the punching operation in the units order columnar position of the control device is of particular importance in facilitating prompt detection of errors in the formation of the control data. One example of such detection of error occurs when the punch carriage 110 has been incorrectly tabulated one or more spaces to the left from the desired correct tabulated position. In such an instance each punched representation formed in the control device 63 is displaced to the right in an incorrect columnar position. Consequently, the punched representation which is formed in the units order columnar position will represent the digit which pertains to the tens order or some higher order of the control number. As a result, the operator will attempt to depress another number key corresponding to the next lower order of the control number, but since the keyboard 69 has been locked by the safety lever 330 as an incident to the performance of the incorrectly positioned punching operation in the units order position on the control device, the operator will be unable to depress the intended key. The unexpected resistance of the locked key will, of course, warn the operator of the error, so that the incorrectly formed control device or the card 90 thereof may be discarded and a new control device formed in place thereof. When such an incorrectly formed control device is discarded, the stop mechanism 408 is cleared by manual actuation of the clearing lever 850, thereby to condition the stop mechanism for proper and correct setting as the subsequent punching operations progress.

The keyboard locking action attained by the safety locking lever 330 also serves to give a similar warning to the operator in the event that one or more added or extra digits have been inadvertently formed in the punching operations after proper initial tabulation of the punch carriage. Thus, in the example which has been hereinbefore discussed in detail, the punching of any key 68, or the inadvertent operation of the spacing key 68', at any point in the series of desired punching operations, would, of course, result in columnar displacement of subsequently formed representations to the right from their correct columnar positioning. In such an instance the keyboard would be locked after the formation of the representation of the "7," since this representation would, by reason of the inadvertently introduced number or space, be formed in the units position rather than in the tens position. The keyboard 69 would then be locked when the operator attempted to depress the "9" key, thereby to warn the operator that an error had occurred.

As another important function of the final keyboard lock-up, it will be evident that a careful operator may utilize this keyboard lock-up as a simple and convenient means for checking against other possible errors which may occur. Thus, if the operator makes it a habit to press the space key 68' after the completion of the punching operation pertaining to the units order digit of each control number, the presence or absence of the locked relationship will serve as an indication in the event that certain errors have been made. Thus, if the carriage 110 has been initially tabulated to its number 5 position, while the control number to be represented is but a four order number, all of the punched representations will be displaced to the left from their correct columnar positions on the control device 63. As a result, the representation of the units order digit of the control number will be formed in the tens order columnar position on the control device. If, in such an instance, the operator attempts to actuate the space key 68', this key will be unlocked, rather than locked, and the operator will be thereby warned that an error has occurred.

Similarly, if the initial tabulation of the carriage 110 has been correct, but the operator has inadvertently failed to perform a punching operation corresponding to one or more of the orders of the control number, a corresponding incorrect location of the punched representation of the units order digit of the desired control number will result. The unlocked condition of the keyboard after the formation of the representations of the units order digit of the control number may here again be utilized to indicate incorrectness of the control device 63.

It is to be understood, however, that the presence of the expected locked condition in the keyboard, after the performance of the punching operation pertaining to the units order digit of the control number, is not to be taken as an indication of correctness of the denominational positioning of the punched representations, but merely that the unexpected detection of an unlocked condition at this time is to serve as a warning to the operator that the control device should be carefully verified.

When the several punching and set-up operations have been completed as hereinabove described, the unloading plunger 175 of the punch carriage 110 is pressed rearwardly so as to release the control device 63 from the restraining action of the dog 161, and the spring-biased actuating lever 172 then acts to shift the control device 63 forwardly to a position wherein it may be easily grasped and removed by the operator. As the lever 172 imparts its ejecting movement to the control device, the latching lug 168 thereof engages the shoulder 170 of the plunger 175, thereby to latch the plunger in its rear position, and condition the mechanism for a succeeding loading operation.

Upon its removal from the punching carriage, the control device 63 is transferred immediately to the verifying station 64 for the printing of the verifying number 65 thereon. In such transfer the operator grasps the edge of the control device along which the printing plate 81 is positioned, so that as the other edge of the control device is inserted downwardly through the slot 760, the control card 90 faces rearwardly, while the spacing flanges 80' extend forwardly of the machine so as to be engaged with and guided and positioned by the guide slots 763 during continued downward movement of the control device along the platen 406. As the control device approaches the desired printing position the lower ends of the spacing flanges 80' engage lugs 771 on the pivoted arms 770, thereby to rock these arms downwardly substantially in unison to an extent determined by the adjustable stop 797. Movement of the control device is thereby arrested in the desired printing position, with the area of card 90 upon which the verifying number 95 is to be printed positioned in registry with the opening 610 of the shield 609, and the inking ribbon 405 extending across the opening 610 between the card 90 and the type segments 402.

As the control device approaches the lower limit of its travel, and imparts rocking movement to the levers 770, the control arm 786 which is carried by one of the arms 770 is actuated through a switch closing movement which initiates the operation of the printing mechanism PR through a printing cycle. In such switch closing movement, the laterally projecting end 786' of the lever 786 engages the safetly lever 795, which, as shown in the timing chart, is at this time in its active position and flexes the safety lever 795 to the right so as to impart switch closing movement to the two switches S3 and S4. Closure of the switch S4 serves to energize the motor 504, while closure of the switch S3 energizes the clutch control solenoid 695 so as to withdraw the control arm 680 from its restraining relation to the driven clutch member 671. The driven member 671 is thereby released for clutch engaging movement by its springs 677, so that the desired operation of the various parts of the printing mechanism is initiated.

After a relatively small rotational movement of the driven clutch member 671 from its initial rotative position, the cam 840 which is driven thereby acts upon the switch 841 to establish a running circuit for the motor 504 which is maintained for throughout substantially one revolution of the driven clutch member 671 independently of continued closure of the switch S4. Since the stop pin 686 acts on the arm 700 to disengage the same from the control arm 680 after substantially 45° of rotation of the driven member, as indicated in the timing chart of Fig. 54, the control arm 680 at this time reengages the side of the driven clutch member 671 and is in condition to act upon the stop pin 686 to disengage the clutch and stop the rotation of the driven clutch member 671 and the associated parts after 360° of rotation of the driven clutch member 671.

In its rotation through such a one-revolution cycle, the driven clutch member 671 serves to operate the carriage restoring or tabulating device 710 and to operate the printing mechanism PR through a printing cycle in which a verifying number 65 is printed on the control device 63 in accordance with the setting of the stop mechanism 408.

The actual restoring or tabulating movement of the carriages 110 and 411 by the cam device 710 may take place at different times in the printing cycle as determined by the rotative setting of the cam device, and as shown in the timing chart of Fig. 4, this movement, for the No. 3 positioning or adjustment of the cam device 710, starts after the driven clutch member 671 has moved through 90° of its cycle, and is completed by the time such rotative movement has progressed through 180°. In every adjustment of the cam device 710, the carriages 110 and 411 are restored or automatically tabulated in the desired columnar positions prior to completion of the printing cycle so as to be conditioned for the mounting of the next control device 63 and the performance of the punching and set-up operation relating thereto. As the automatic tabulating movement of the punch carriage proceeds, the keyboard lock is, of course, released so that the keys 68 are conditioned for actuation.

When the printing mechanism PR is at rest, the cam shaft 500 is in the rotative position shown in Fig. 13, and upon engagement of the clutch 505, as hereinbefore described, the cam shaft 500 is rotated in a clockwise direction, as indicated in Fig. 9, through a single revolution during which the various elements of the printing mechanism PR are actuated through the operations required to constitute a printing cycle.

Early in the rotative movement of the cam shaft 500, the dwell surfaces 526 of the cams 522 move out of engagement with the cam rollers 524 of the type carrier restoring bail 520, so that the bail 520 rocks in a clockwise direction to its ineffective or released position of Fig. 48. Such releasing movement of the bail 520 permits individual rocking movement of the several type carriers 400 in a clockwise direction, so that the associated stop arm 511 of each type carrier 400 sweeps downwardly and forwardly along the path defined by the associated group of stops 409. In the event that none of the stops 409 pertaining to a particular type carrier 400 has been set in its active or projecting position, this particular type carrier will be rocked by its spring 515 to the extreme limit of its travel as determined by the abutment of its arm 511 with the restoring bail 530. In this instance the blank type member 403' will be located at the printing position so that no printing impression will be made in the order to which this type carrier 400 pertains.

In the illustrative control number "20479" chosen to illustrate the operation of the machine, a stop pin 409 has been actuated or set in each order of the stop mechanism, so that when the bail 520 is released by its control cams 522, all of the five type carriers 400 move to set positions so that each type carrier has an operative type member 403 located in printing position.

The releasing movement or stroke of the releasing bail 520 is completed within the first 105° to 110° of cam shaft rotation as shown in the timing chart of Fig. 54, so that during this interval all of the type carriers 400 are set in their printing or blank positions as determined by the setting of the stop mechanism 408. In the printing of the verifying number "20479," in accordance with the chosen illustrative example, the various type carriers 400 assume the set positions illustrated in Figs. 48 and 50. In order that the several type carriers 400 may be identified in Fig. 48 with respect to the particular orders to which they pertain, the digital values for which they are set have been indicated on the stop arms 511 of the several type carriers. Thus, the units order type carrier 400 has terminated its movement by engagement with the set stop pin 409 which pertains to "9" in the units order, and a circled numeral "9" has therefore been shown on the stop arm 511 of the units order type carrier. In this set relation of the units order type carrier 400, its upper type member 403, bearing the type figure, "9," is located in printing position as shown in Figs. 48 and 50.

Similarly the tens order type carrier 400 has a circled numeral "7" shown in Fig. 48 on its stop arm 511, this type carrier having been stopped or set with its "7" type member 403 opposite printing position due to the engagement of its stop arm 511 with the set stop pin 409 pertaining to "7" in the tens order of the stop mechanism. Similar setting of the type carriers 400 pertaining to the hundreds, thousands and ten thousands order also takes place during the release movement of the bail 520, and these type carriers are identified and distinguished in Fig. 48 by circled numerals "4," "0" and "2" shown on the arms 511 of these type carriers.

Thus, the type carriers 400 are set to print the number "20479" as best shown in Fig. 50, and it will be observed that the type which are in printing position are there indicated or emphasized by heavy lined figures. The figures of the type members 403 are of course inverted, since the control member 63 is positioned in an inverted position during the printing operation.

After the setting of the type carriers 400 has been completed, the hammer latch bail 551 is gradually actuated from its latched position of Fig. 13 toward its released position of Fig. 48, as indicated in the timing chart of Fig. 54, and after somewhat less than 90° rotation of the cam shaft 500, the hammer latch 551 is disengaged from the latching shoulders 552 of the hammers 540. Upon such release, the hammers 540 are actuated through an impression forming stroke by their springs 546, so as to strike the rear ends of the set type members 403. Thus the set type members 403 are driven forwardly and act through the ribbon 405 to form corresponding printing impressions on the card 90. Since the control device has been guided by the flanges 80' and the grooves 763 to a predetermined position, the several digits of the verifying number thus printed are located in the same columnar positions as the corresponding physical representations thereof.

Almost immediately after the release of the hammers 540, the hammer reset bail 560 starts through its resetting stroke from its normal inactive position of Fig. 48 to the right-hand position of Fig. 52. During such hammer resetting movement, the hammer latch 551 is retracted to the spaced relation shown in Fig. 48 so as to insure proper clearance, and the resetting movement of the hammers 540 is continued somewhat beyond the normal set or latched position of Fig. 13 so as to insure proper clearance for the latch 551 as it returns to its active or latching relation with respect to the latching shoulders 552. While the hammers 540 are thus conditioned for relatching, as indicated in the timing chart of Fig. 54, the latch 551 is returned to its normal position, in which return movement it moves through the position of Fig. 52 and into engagement with the hammers 540 adjacent to but out of contact with the latching shoulders 552. The hammer reset bail 560 then starts, upon its return movement from the position of Fig. 52 to the left, toward its normal position of Fig. 48, and in such movement the hammers 540 follow the bail movement for a short distance until engagement of the shoulders 552 with the latch 551 restrains the hammers 540 in their latched or loaded positions wherein they are conditioned for the next printing operation.

As indicated in the timing chart, the type carriers 400 remain in their set positions until shortly after the resetting movement of the hammers 540 has started, after which the type carrier restoring bail 520 is rocked in a counterclockwise direction from its position of Fig. 48 to the normal position of Fig. 13, thereby to restore all of the type carriers 400 to their normal positions.

After the type carriers 400 have been thus restored, the clearing bail 530 starts its movement in a counterclockwise direction from the full-line position of Fig. 51 to the dotted-line position of said figure, and in such movement the cam surface 530' thereof engages any projecting or set stop pins 409 and forces them downwardly to their inactive positions. Prior to the completion of the cam shaft revolution, the clearing bail 530 is returned to its normal position of Fig. 51, as indicated in the timing chart of Fig. 54.

Thus, the operative movements of all of the elements of the printing mechanism PR are completed in a single revolution of the cam shaft 500, and simultaneously with the printing cycle thus completed, the carriages 110 and 411 are returned to their desired tabulated positions determined by the setting of the cam device 710. Hence, upon completion of the one revolution cycle of the cam shaft 500, the entire machine is conditioned for operation upon the next control device 63.

The printing mechanism PR of the present machine invariably stops or comes to rest at the end of the one-revolution cycle of the cam shaft 500 and remains stopped in this position even though the operator maintains the switch-closing lever 786 in its actuated position after completion of the desired printing cycle. This action is attained by the operation of the safety lever 795 which is withdrawn to its safety position by the bail 551 as indicated in the timing chart of Fig. 54. When the safety lever 795 reaches its safety position, it shifts to the left in Fig. 53 so as to overlie the end 786' of the lever 786, and is thus latched in its safety position until withdrawal of the control device 63 from the printing position causes the lever 786 to unlatch or release the safety lever 795. Hence, if the operator maintains the control device at printing position for too long a period, the resulting positioning of the switch closing lever 786 in its actuated position is ineffective to close the switches S3 and S4. Another cycle of the printing mechanism PR is therefore prevented until the starting circuit has been reconditioned by withdrawal of the control device 63 from printing position.

After withdrawal of the control device 63 from the printing position, it is verified by comparison of the printed verifying number 65 with the control number on the list from which it was taken. This comparison may be performed quickly, and correspondence of the printed verifying number 65 with the control number on the list will disclose correctness of the punched representations. The presence of an unusual blank space at the right-hand end of the verifying number will, of course, enable the operator to detect improper columnar positioning of the punched control data, while blank spaces between printed digits will disclose error resulting from inadvertent spacing operations.

Such verification by means of comparison and inspection of the printed verifying number 65, when taken in connection with the warnings given the operator by the keyboard lock, give maximum assurance of accuracy of the finished control devices.

Since the present machine delays all of the printing operations until after completion of all of the punching operations, there can be no tendency on the part of the operator to independently verify each digit of the control number between successive punching operations. Hence the sequence of individual punching operations is performed rapidly and with the same timing and sequence in each cycle, with the result that greater production speed and unusual accuracy are attained.

From the foregoing description it will be apparent that the present invention facilitates the preparation and verification of control devices, and this end is attained in such a manner as to insure maximum accuracy and speed. The machine provided by the present invention embodies an inherent mode of operation which requires the operator to follow a definite and predetermined sequence of movements and operations which are so correlated as to promote speed and accuracy. Since the operator must follow this same predetermined sequence in the preparation and verification of each control device, skill, speed and accuracy are rapidly developed by the operator.

It will also be evident that the machine of the present invention embodies means for mechanically detecting improper columnar positioning of the control data and upon such detection, warning is given to the operator that such error has occurred. This mechanical detection and warning of error supplements the novel visual verification, so that the present invention gives maximum assurance of accuracy in the completed control devices.

It will also be evident that the present invention simplifies the work of the operator by automatically tabulating the machine to a selected average relation such that manual tabulating operations are minimized with the resultant increase in speed and accuracy.

Thus, while I have illustrated and described a selected embodiment of my invention it is to be understood that it is capable of variation and modification and I therefore do not wish to be limited to the precise details set forth but desire to avail myself of such changes and alterations as fall within the purview of the following claims.

I claim:

1. In a machine for forming and verifying control devices to provide codified numerical control data thereon representing the several digits of a desired plural order control number, said machine comprising punching mechanism including a plurality of selectively operable punches, a punch carriage for supporting and automatically advancing such a control device with relation to said punches, manually operable punch control means for operating said punching mechanism through a punching cycle and operable in each cycle to selectively operate said punches to form a coded representation of one digit of the desired control number on the control device supported on said punch carriage, and means for verifying the coded data thus punched order by order in a control device, said last-mentioned means including a variable printer having printer set-up means operable directly by said manually operable punch control means order by order as the coded representation of each digit of the control number is punched to set up said printer to print a plural order verifying number corresponding with the coded data thus formed in the control device, and means for operating said printer through a printing cycle after the completion of all of the punching operations to print all of the digits of the verifying number on the same control device in a single printing cycle.

2. In a machine for forming and verifying control devices to provide codified numerical control data thereon representing the several digits of a plural order control number, said machine comprising punching mechanism, manually operable punch control means for operating said punching mechanism through a punching cycle and operable in each cycle to cause said punching mechanism to form a positional representation of one digit of the desired control number on a control device, means for verifying the positional representations of the desired control number which have thus been formed order by order upon the control device, said last-mentioned means including a multiple order variable printer operatively associated with said punch control means to set up said printer to print a verifying number corresponding with the positional representations formed in the control device by said punching mechanism, and means for operating said printer through a printing cycle after the completion of all of the punching operations to print all of the digits of the verifying number on the control device in a single printing cycle.

3. In a machine for forming and verifying control devices to provide codified numerical control data thereon representing the several digits of a plural order control number, said machine comprising punching mechanism, manually operable punch control means for operating said punching mechanism through a punching cycle and operable in each cycle to cause said punching mechanism to form a positional representation of one digit of the desired control number on a control device, means for verifying the positional representations of the desired control number which have thus been formed order by order upon the control device, said last-mentioned means including a multiple order variable printer operatively associated with said punch control means to set up said printer to print a verifying number corresponding with the positional representations formed in the control device by said punching mechanism, and means for operating said printer through a printing cycle after the completion of all of the punching operations to print all of the digits of the verifying number on the control device in a single printing cycle in which the digits of the printed verifying number are printed in predetermined columnar positions on the control device corresponding to the columnar positions in which the corresponding positional representations of the several digits were formed by the punching mechanism.

4. In a machine for forming and verifying control devices, punching mechanism having means including a plurality of punches defining a punching station at which a control device may be positioned, punch control means operable to selectively operate said punches to form coded representations of desired control data on a control device located at said punching station, means including a variable printer defining a verifying printing station to which such a control device may be shifted after the formation of such coded control data thereon, and printer governing means operable by said punch control means to effect printing operation of said printer to print a verifying number on the control device corresponding with the coded data previously formed in the control device by said punching mechanism.

5. In a machine for forming and verifying control devices, punching mechanism having means including a plurality of punches defining a punching station at which a control device may be positioned, punch control means operable to selectively operate said punches to form coded representations of desired control data on a control device located at said punching station, means including a variable printer defining a verifying printing station to which such a control device may be shifted after the formation of such coded control data thereon, printer governing means operable by said punch control means to set said variable printer for the printing of a verifying number on the control device corresponding with the coded data formed in the control device by said punching mechanism, and means for effecting operation of said printer in accordance with such setting to print said verifying number on the control device after it has been transferred from said punching station to said verifying printing station.

6. A machine for forming and verifying control devices, said machine comprising a plurality of punches, a punch carriage upon which a control device may be mounted in position for the punching of coded representations of selected control data thereon, character spacing means for said punch carriage operable to advance said carriage step by step so that successive punching operations are performed in different columnar positions on the control device, a plurality of control keys, codifying means actuated by said keys and operable to control said punches to selectively operate the punches in accordance with a predetermined positional code, variable printing means having a single printing position at which a control device may be positioned, and including individually variable printing means pertaining to a plurality of columnar positions, a plurality of groups of stops for setting up the printing means, one of said groups of stops pertaining to each columnar position, and stop-setting means for setting up said stops, said stop-setting means being operable upon said groups of stops successively and being operated by the control keys of said punch.

7. A machine for forming control devices with punched representations and printed verifying representations of the desired control data located thereon in predetermined positional relationship on each control device, said machine comprising a plurality of punches for selective operation to form coded numerical data on a control device, a movable punch carriage for positioning such a control device with relation to said punches, variable printing mechanism having set-up means and a printing position, key-controlled means for selectively operating said punches, means governed jointly by said key-controlled means and the position of said punch carriage to operate said set-up means of said printing mechanism, and means for operating said printing mechanism to print a verifying number upon a control device, positioned at said printing position, in accordance with the setting of said set-up means.

8. A machine for forming and verifying control devices, said machine comprising punching mechanism including a plurality of punches, a punch carriage upon which a control device may be mounted for a punching operation, a plurality of manually actuable control keys each operable selectively upon said punches to form coded representations on a control device corresponding to the actuated key, means operable to impart character spacing movement to said punch carriage, a variable printer including a plurality of variably positionable type segments each pertaining to a different position of said punch carriage, a plurality of groups of stop pins each group of which pertains to a particular one of said type segments, a shiftable set-up carriage having setting means thereon for selectively actuating any one of the stop pins of any group with which the set-up carriage is positionally associated, means operable to shift said set-up carriage into operative positional relation with respect to said groups of stop pins successively in accordance with the position of said punch carriage, and transmitting means operated by said keys and operable to actuate the setting means of said set-up carriage in any such position of said set-up carriage.

9. A machine for forming and verifying control devices, said machine comprising punching mechanism including a plurality of punches, a punch carriage for supporting and automatically advancing a control device in an operative relation to said punches, actuating means for said punches, a plurality of manually actuatable control keys each operable selectively upon said actuating means to cause selective operation of said punches to form coded representations on a control device corresponding to the actuated key, a variable printer including a plurality of variably positionable type segments each pertaining to a different position of said punch carriage, a plurality of groups of stop pins each group of which pertains to a particular one of said type segments, a shiftable set-up carriage having a plurality of setting pins thereon, one for selectively actuating each of the stop pins of any group with which the set-up carriage is positionally associated, means operable to shift said set-up carriage into operative positional relation with respect to said groups of stop pins successively in accordance with the position of said punch carriage, and transmitting means operatively connecting said keys and said setting means and comprising a plurality of bails each having its cross bar portion extending parallel to the path of movement of said set-up carriage and each operatively associated with a particular one of said setting pins to impart a setting movement to its associated setting pin in any position of said set-up carriage along its path of movement, and means operatively associating each of said keys with one of said bails.

10. A machine of the character described for forming control devices, said machine comprising a plurality of punches, a carriage for supporting and automatically advancing such a device with relation to said punches, an actuating means for said punches including a plurality of selector elements individually shiftable from normally inoperative positions to operative positions for rendering said actuating means operable selectively with relation to said punches, means for shifting each of said selector elements including a plurality of depressible number keys, an escapement for controlling the advancing movement of said carriage, a rock shaft having cam means thereon operable to actuate said escapement in a rocking movement of said rock shaft, and means operated by said rock shaft in such an escapement actuating rocking movement to impart a positive return movement to said selector bars to their normal inoperative positions.

11. A machine of the character described for forming control devices, said machine comprising a plurality of punches, a carriage for supporting and automatically advancing such a device with relation to said punches, actuating means for said punches including a bell crank lever to one arm of which the actuating force is applied, means for rendering said bell crank actuating lever operative selectively upon said punches in accordance with a predetermined number code, a solenoid actuator operatively connected to said arm of said actuating bell crank to operate said bell crank in one direction, spring means operable to return said bell crank in the other direction thereby to complete an operating cycle of said bell crank actuator, escapement means controlling the automatic advancing movement of said carriage and including a rock shaft having cam means thereon for actuating said escapement means in a rocking movement of said rock shaft, and means forming an operative connection between said arm of said bell crank and said rock shaft to impart a rocking movement to said rock shaft at a predetermined point in the cycle of movement of said bell crank.

12. A machine of the character described for forming control devices, said machine comprising a plurality of punches, a carriage for supporting and automatically advancing such a device with relation to said punches, actuating means for said punches including a bell crank lever to one arm of which the actuating force is applied, means for rendering said bell crank actuating lever operative selectively upon said punches in accordance with a predetermined number code, a solenoid actuator operatively connected to said arm of said actuating bell crank to operate said bell crank in one direction, spring means operable to return said bell crank in the other direction thereby to complete an operating cycle of said bell crank actuator, escapement means controlling the automatic advancing movement of said carriage and including a rock shaft having means thereon for actuating said escapement means in a rocking movement of said rock shaft, means whereby said bell crank in its operating cycle imparts a rocking movement to said rock shaft, said last-mentioned means comprising a latch member mounted on said arm and adapted, when said arm is moved by said solenoid, to be operatively engaged with said rock shaft to impart a rocking movement to said rock shaft when said arm returns in the opposite direction, means operable upon said latch member at a predetermined point in such return movement to release said latch from its operative engagement with said rock shaft, and means operable with a yielding force upon said rock shaft to return the same to its initial position when it is thus released by said latch member.

13. A machine for forming control devices comprising punching mechanism having a plurality of punches adapted for selective operation to form coded representations on a control device, a movable punch carriage operable to support a control device in the desired operative relation to said punches and to impart step by step character-spacing advancing movement to said control device from its initial tabulated position to a final position so that in its successive punching operations said punching mechanism acts successively upon the control device in each of such positions, and means rendered operative as an incident to the operation of said punching mechanism in said final position to disable said punching mechanism.

14. A machine for forming control devices comprising punching mechanism having a plurality of punches adapted for selective operation to form coded representations on a control device, a movable punch carriage operable to support a control device in the desired operative relation to said punches, carriage advancing means operable to impart step-by-step character-spacing advancing movement to said control device from its initial tabulated position to a final position so that in its successive punching operations said punching mechanism acts successively upon the control device in each of such positions, a keyboard having a plurality of keys through selective actuation of which coded selection of said punches is effected, any one of said keys when actuated being operable to initiate a punching cycle of said punching mechanism, and means rendered operative as an incident to the operation of said punching mechanism through a punching cycle while said punch carriage is in said final position to lock all of the keys of said keyboard against normal actuation.

15. A machine for forming control devices comprising punching mechanism having a plurality of punches adapted for selective operation to form coded representations on a control device, a movable punch carriage operable to support a control device in the desired operative relation to said punches, carriage advancing means operable to impart step-by-step character-spacing advancing movement to said control device from its initial tabulated position to a final position so that in its successive punching operations said punching mechanism acts successively upon the control device in each of such positions, a keyboard having a plurality of keys through selective actuation of which coded selection of said punches is effected, any one of said keys when actuated being operable to initiate a punching cycle of said punching mechanism, said keyboard including a space key operable upon said carriage, advancing means when said space key is actuated to produce spacing movement of said carriage, and means rendered operative as an incident to the operation of said punching mechanism through a punching cycle while said punch carriage is in said final position to lock all of the keys of said keyboard against normal actuation.

16. A machine for forming control devices comprising punching mechanism having a plurality of punches adapted for selective operation to form coded representations on a control device, a movable punch carriage operable to support a control device in the desired operative relation to said punches, spacing mechanism operable to impart character-spacing advancing to said carriage to move said control devices from any selected initial tabulated position step by step through any intermediate positions to a final position so that in its successive punching operations said punching mechanism acts successively upon the control device in each of such positions, said spacing mechanism being operable in the terminal portion of a punching operation performed while said carriage is in said final position to permit said carriage to move through a limited range beyond said final position, and means operated by said carriage as it moves through said limited range to disable said punching mechanism.

17. A machine for forming control devices comprising punching mechanism having a plurality of punches adapted for selective operation to form coded representations on a control device, a movable punch carriage operable to support a control device in the desired operative relation to said punches and to impart step-by-step character-spacing advancing movement to said control device from its initial tabulated position to a final postion so that in its successive punching operations said punching mechanism acts successively upon the control device in each of such positions, a keyboard having a plurality of keys through selective actuation of which coded selection of said punches is effected, any one of said keys when actuated being operable to initiate a punching cycle of said punching mechanism, escapement means operable to control the step-by-step advancing movement of the carriage, said escapement means being operable when said punching mechanism is operated with said carriage in its final order position to permit movement of said carriage through a limited range beyond said final position, a keyboard interlock operable by and during depression of any one of said keys to prevent depression of any other of said keys, and means operable upon said keyboard interlock by said carriage in advancing movement through said limited range to lock all of said keys against depression.

18. A machine for forming control devices comprising, in combination, a plurality of punches, actuating means for said punches including a solenoid, means for selectively rendering said actuating means operable upon said punches, said selecting means including a plurality of number keys adapted to be depressed from a normal elevated position through a predetermined stroke, means for energizing said solenoid when any one of said keys is depressed, said energizing means including a relay having two relay switches which are closed when said relay is energized, an energizing circuit for said solenoid including one of said relay switches, a holding circuit for said relay including the other of said relay switches, said holding circuit also including a first key-controlled switch arranged to be closed relatively early in the downward movement of any one of said keys and to be opened at a point relatively close to the upward limit of movement of said keys, and an initial energizing circuit for said relay including a second key-controlled switch arranged to be closed at a point relatively close to the lower limit of the key movement and to be opened relatively early in the upward return movement of the keys.

19. A machine for forming control devices comprising, in combination, a plurality of punches, actuating means for said punches including a solenoid, punch selecting means for selectively rendering said actuating means operable upon said punches, said selecting means including a plurality of number keys adapted to be depressed from a normal elevated position through a predetermined stroke, control means for energizing said solenoid when any one of said keys is depressed, said control means including a relay having two switches which are closed when said relay is energized, an energizing circuit for said solenoid including one of said relay switches, a holding circuit for said relay including the other of said relay switches, said holding circuit including a first key-controlled switch, a bail adapted to be actuated when any one of said keys is depressed, means operatively associating said first key-controlled switch with said bail to close said first key-controlled switch relatively early in the downward movement of said bail and to open the same at a point relatively close to the upward limit of movement of said bail, an initial energizing circuit for said relay including a second key-controlled switch operatively associated with said bail to be closed at a point relatively close to the downward limit of the bail movement, and to be opened relatively early in the upward return movement of said bail, and adjustable means forming individually adjustable operative connections between the several keys and said bail whereby the switch closing action of the several keys may be correlated with said punch selecting means.

20. A machine for forming and verifying control devices comprising, in combination, a plurality of punches for forming coded representations of numerical data on such control devices, actuating means for said punches including a solenoid, punch selecting means for selectively rendering said actuating means operable upon said punches, said selecting means including a plurality of number keys adapted to be depressed from a normal elevated position through a predetermined stroke, variable printer means for printing a verifying number on a control device in accordance with the punched representations formed thereon, printer control means actuated by said number keys, control means for energizing said solenoid when any one of said keys is depressed, said control means including a relay having two switches which are closed when said relay is energized, an energizing circuit for said solenoid including one of said relay switches, a holding circuit for said relay including the other of said relay switches, said holding circuit including a first key-controlled switch, a bail adapted to be actuated when any one of said keys is depressed, means operatively associating said first key-controlled switch with said bail to close said first key-controlled switch relatively early in the downward movement of said bail and to open the same at a point relatively close to the upward limit of movement of said bail, an initial energizing circuit for said relay including a second key-controlled switch operatively associated with said bail to be closed at a point relatively close to the downward limit of the bail movement, and to be opened relatively early in the upward return movement of said bail, and adjustable means forming individually adjustable operative connections between the several keys and said bail whereby the switch closing action of the several keys may be correlated with said punch selecting means while maintaining the same operative relation between said keys and said printer control means.

21. A machine for forming and verifying control devices comprising, in combination, a plurality of punches adapted for selective operation to form coded representations of numerical data on a control device, punch actuating means, punch selecting means for selectively rendering said actuating means operable upon said punches, said selecting means including a plurality of number keys adapted to be depressed from a normal elevated position through a predetermined stroke, a variable printer mechanism for printing a verifying number on the control device in accordance with the punched representations formed thereon, printer control means operable to set said printer mechanism under the control of said keys, control means for said punch actuating means including a bail adapted to be actuated when any one of said keys is depressed and means operable in the actuated movement of said bail to cause operation of said punch actuating means, and adjustable means forming individually adjustable operative connections between the several keys and said bail whereby the action of the several keys upon said bail in producing operation of said punch actuating means may be correlated with said punch selecting means while maintaining the same operative relation of said keys to said printer control means.

22. A machine for producing and verifying control devices comprising a plurality of punches, a punch carriage for supporting and automatically advancing a control device past said punching means, key-controlled means for rendering said punches selectively operable in accordance with a predetermined positional code, variable printing mechanism adapted to be set up by said key-controlled means as an incident to the selective operation of said punches, operating means for operating said variable printing mechanism through a printing cycle and including a manually-actuated control for initiating such a cycle of operation, and safety means operable as an incident to the operation of said printing means to disable said manually-actuated control means during a portion of the printing cycle.

23. A machine for producing and verifying control devices comprising a plurality of punches, a punch carriage for supporting and automatically advancing a control device past said punching means, key-controlled means for rendering said punches selectively operable in accordance with a predetermined positional code, variable printing mechanism adapted to be set up by said key-controlled means as an incident to the selective operation of said punches, operating means for said variable printing mechanism including a manually-actuated control for initiating operation of said actuating means, a safety member forming a shiftable force transmitting connection in said manually-actuated control, and means operable as an incident to the operation of said printing means to shift said safety member to an inactive position and thereby disable said manually-actuated control means during a portion of the printing cycle.

24. In a machine of the character described for forming control devices and the like, a variable printing mechanism, operating means for said variable printing mechanism including a manually-actuated control for initiating operation of said actuating means, a safety member forming a shiftable force transmitting connection in said manually-actuated control, and means operable as an incident to the operation of said printing means to shift said safety member to an inactive position and thereby disable said manually-actuated control means during a portion of the printing cycle.

25. A machine for producing and verifying control devices comprising a plurality of punches, a punch carriage for supporting and automatically advancing a control device past said punching means, key-controlled means for rendering said punches selectively operable in accordance with a predetermined positional code, variable printing mechanism adapted to be set up by said key-controlled means as an incident to the selective operation of said punches, means forming part of said printing mechanism defining a printing station at which the control device is positioned during a printing operation, operating means for said variable printing mechanism including a manually-actuated control for initiating operation of said actuating means, safety means comprising a safety member shiftable from an active position wherein it functions as a part of said manual control in initiating a printing operation to an inactive position wherein it renders said manual control ineffective to initiate a printing operation, means operable as an incident to the operation of said printing means to shift said safety member to its inactive position to disable said manually-actuated control means during a portion of the printing cycle, and latch means operable when said safety member has been thus shifted to latch said safety member in said inactive position until the control device is withdrawn from said printing station.

26. In a machine of the character described for forming control devices, a variable printing mechanism, means forming part of said printing mechanism defining a printing station at which the control device is positioned during a printing operation, operating means for said variable printing mechanism including a manually-actuated control for initiating operation of said actuating means, safety means comprising a safety member shiftable from an active position wherein it functions as a part of said manual control in initiating a printing operation to an inactive position wherein it renders said manual control ineffective to initiate a printing operation, means operable as an incident to the operation of said priting means to shift said safety member to its inactive position to disable said manually-actuated control means during a portion of the printing cycle, and latch means operable when said safety member has been thus shifted to latch said safety member in said inactive position until the control device is withdrawn from said printing station.

27. In a machine for forming and verifying control devices to provide codified numerical control data thereon representing the several digits of a desired plural order control number, said machine comprising punching mechanism including a plurality of selectively operable punches, a punch carriage for supporting and automatically advancing such a control device to different columnar positions with relation to said punches, punch control means for operating said punching mechanism through a punching cycle and operable in each cycle to selectively operate said punches to form a coded representation of one digit of the desired control number on the control device supported on said punch carriage, means for verifying the coded data thus punched, said last-mentioned means including a variable printer having printer set-up means operable by said punch control means order by order as the coded representations of each digit of the control number are punched to set up said printer to print a plural order verifying number corresponding with the coded data thus formed in the control device, means for operating said printer through a printing cycle after the completion of all of the punching operations to print all of the digits of the verifying number on the control device in a single printing cycle, and means operable by said printing mechanism during said printing cycle to return said punch carriage to a predetermined one of said columnar positions.

28. In a machine for forming and verifying control devices to provide codified numerical control data thereon representing the several digits of a desired plural order control number, said machine comprising punching mechanism including a plurality of selectively operable punches, a punch carriage for supporting and automatically advancing such a control device to different columnar positions with relation to said punches, the last one of said positions constituting the position at which the representation of the units order digit of a control number is formed, punch control means including a plurality of selectively actuatable number keys for operating said punching mechanism through a punching cycle and operable in each cycle to selectively operate said punches in accordance with the actuated number key to form a coded representation of one digit of the desired control number on the control device supported on said punch carriage, locking means operable as an incident to the performance of a punching operation in said units order position to prevent further operation of said punches, means for verifying the coded data thus punched, said last-mentioned means including a variable printer having printer set-up means operable by said punch control means order by order as the coded representations of each digit of the control number are punched to set up said printer to print a plural order verifying number corresponding with the coded data thus formed in the control device, means for operating said printer through a printing cycle after the completion of all of the punching operations to print all of the digits of the verifying number on the control device in a single printing cycle, and means operable by said printing mechanism during such a printing cycle to unlock said locking means so as to permit operation of said punches.

29. In a machine for forming and verifying control devices to provide codified numerical control data thereon representing the several digits of a desired plural order control number, said machine comprising punching mechanism including a plurality of selectively operable punches, a punch carriage for supporting and automatically advancing such a control device to different columnar positions with relation to said punches, the last one of said positions constituting the position at which the representation of the units order digit of a control number is formed, punch control means including a plurality of selectively actuatable number keys for operating said punching mechanism through a punching cycle and operable in each cycle to selectively operate said punches in accordance with actuated number keys to form a coded representation of one digit of the desired control number on the control device supported on said punch carriage, locking means operable as an incident to the performance of a punching operation in said units order position to prevent further operation of said punches, means for verifying the coded data thus punched, said last-mentioned means including a variable printer having printer set-up means operable by said punch control means order by order as the coded representations of each digit of the control number are punched to set up said printer to print the plural order verifying number corresponding with the coded data thus formed in the control device, means for operating said printer through a printing cycle after the completion of all of the punching operations to print all of the digits of the verifying number on the control device in a single printing cycle, and means operable by said printing mechanism during such a printing cycle to return said punch carriage to a predetermined one of said columnar positions and unlock said locking means whereby to condition said punching means for a subsequent punching operation.

30. A machine for forming and verifying control devices, said machine comprising punching mechanism including a plurality of punches, a punch carriage upon which a control device may be mounted for a punching operation, a plurality of manually actuatable control keys each operable selectively upon said punches to form coded representations on a control device corresponding to the actuated key, means operable to impart character-spacing movement to said punch carriage to render said punches operative in successive columnar relationship with respect to the control device, a variable printer including a plurality of variably positionable type segments each pertaining to a different columnar position of said punch carriage, a plurality of groups of stop pins each group of which pertains to a particular one of said type segments, a shiftable set-up carriage having setting means thereon for selectively actuating any one of the stop pins of any group with which the set-up carriage is positionally associated, means operable to shift said set-up carriage into operative positional relation with respect to said groups of stop pins successively in accordance with the position of said punch carriage, transmitting means operated by said keys and operable to actuate the setting means of said set-up carriage in any such position of said set-up carriage, and means operable as an incident to printing operation of said printer to return said carriages to predetermined corresponding columnar positions.

31. A machine for forming and verifying control devices so as to form thereon individual representations of the several digits of a desired plural order control number, said machine comprising a plurality of punches, a punch carriage operable to support and automatically advance a control device successively from one columnar position to another with relation to said punches for the punching of coded representations of selected control data thereon, character-spacing means for controlling said automatic advance of said punch carriage operable to advance said carriage step by step so that successive punching operations are performed in different columnar positions on the control device, a plurality of control keys, codifying means actuated by said keys and operable to control said punches to selectively operate the punches in accordance with a predetermined positional code, variable printing means having a single printing position at which a control device may be positioned, and including individually variable printing means pertaining to a plurality of columnar positions, a plurality of stops for setting up the printing means, one of said groups of stops pertaining to each columnar position, stop-setting means for setting up said stops, said stop-setting means being operable upon said groups of stops successively and being operated by the control keys of said punch, means for clearing said stops during the operation of said printing means through a printing cycle, a cam device driven through an operating cycle during each such printing cycle and operable in such operating cycle to impart a carriage return movement to said carriage, and means operable to adjust the extent of the carriage return movement induced by said cam device whereby the carriage may be returned to any desired columnar position by said cam device.

32. In a machine for forming and verifying control devices to provide codified numerical control data thereon representing the several digits of a desired plural order control number, said machine comprising punching mechanism including a plurality of selectively operable punches, a punch carriage for supporting and automatically advancing such a control device to different columnar positions with relation to said punches, the last one of said positions constituting the position at which the representation of the units order digit of a control number is formed, punch control means including a plurality of selectively actuatable number keys for operating said punching mechanism through a punching cycle and operable in each cycle to selectively operate said punches in accordance with the actuated number key to form a coded representation of one digit of the desired control number on the control device supported on said punch carriage, locking means operable as an incident to the performance of a punching operation in said units order position to prevent further operation of said punches, means for verifying the coded data thus punched, said last-mentioned means including a variable printer means providing a verifying station to which a control device may be transferred after the completion of the punching operations thereon, printer set-up means operable by said punch control means order by order as the coded representations of each digit of the control number are punched to set up said printer to print a plural order verifying number corresponding with the coded data thus formed in the control device, means for operating said printer through a printing cycle when the control device is transferred to said verifying station to print all of the digits of the verifying number on the control device in a single printing cycle, and means operable as an incident to the transfer of the control device to said verifying station to unlock said locking means and thereby condition said punches for operation in the formation of the next control device.

33. In a machine for forming and verifying control devices to provide codified numerical control data thereon representing the several digits of a desired plural order control number, said machine comprising punching mechanism including a plurality of selectively operable punches, a punch carriage for supporting and automatically advancing such a control device to different columnar positions with relation to said punches, punch control means for operating said punching mechanism through a punching cycle and operable in each cycle to selectively operate said punches to form a coded representation of one digit of the desired control number on the control device supported on said punch carriage, means for verifying the coded data thus punched, said last-mentioned means including a variable printer, means providing a verifying station to which a control device may be transferred after the completion of the punching operations, printer set-up means operable by said punch control means order by order as the coded representations of each digit of the control number are punched to set up said printer to print a plural order verifying number corresponding with the coded data thus formed in the control device, means for operating said printer through a printing cycle after the completion of all of the punching operations to print all of the digits of the verifying number on the control device in a single printing cycle, and means operable as an incident to the transfer of a control device to said verifying station to return said punch carriage to a predetermined one of said columnar positions.

34. In a machine for forming and verifying control devices to provide codified numerical data thereon representing the several digits of a plural order control number, said machine comprising punching mechanism having means including a plurality of punches, a punch carriage for supporting and automatically advancing such a control device with relation to said punches, punch control means for operating said punching mechanism through a punching cycle and operable in each cycle to selectively operate said punches to form a coded representation of one digit of the desired control number on the control device supported on said punch carriage, means for verifying the coded data thus punched, said last-mentioned means including a variable printer comprising a platen at which the control device may be located for the performance of a printing operation, a plurality of type carriers each having a type segment including a plurality of type members, means supporting said carriers for individual movement to set any selected type member thereof in printing position opposite said platen, stop mechanism for determining the set positions of said carriers and including a group of stops for each carrier, spring means urging said type carriers individually toward set positions determined by set ones of said stops, a bail for restoring said type carriers to normal positions against the force of said spring means, a plurality of hammers spring biased toward operative relation to the type members opposite said printing position, a hammer restoring bail for withdrawing said hammers against the force of their biasing springs, a latching bail for retaining said hammers in withdrawn positions, stop setting means adapted for cooperation with said groups of stops successively for setting one stop in each group during such association, means for bringing said stop setting means into cooperative association with each of said groups successively, a stop pin restoring bail for restoring said stop pins to inactive positions, cam means operable through a one-revolution cycle and operable in such cycle to produce a printing operation of said printing means, and means operable as an incident to the operation of said cam means to impart an automatic return movement to said pin setting means to an operative relation to a selected one of said groups of pins.

35. In a machine of the character described for making control devices and the like, a variable printer comprising a platen at which the control device may be located for the performance of a printing operation, a plurality of type carriers each having a type segment including a plurality of type members, means supporting said carriers for individual movement to set any selected type member thereof in printing position opposite said platen, stop mechanism for determining the set positions of said carriers and including a group of stops for each carrier, key means for selectively setting said stops, spring means urging said type carriers individually toward set positions determined by set ones of said stops, a bail for restoring said type carriers to normal positions against the force of said spring means, a plurality of hammers spring biased toward operative relation to the type members opposite said printing position, a hammer restoring bail for withdrawing said hammers against the force of their biasing springs, a latching bail for retaining said hammers in withdrawn positions, stop setting means controlled by said key means adapted for cooperation with said groups of stops successively for setting one stop in each group during such association, means for bringing said stop setting means into cooperative association with each of said groups successively, a stop pin restoring bail for restoring said stop pins to inactive positions, cam means operable through a one-revolution cycle and operable in such cycle to produce a printing operation of said printing means, and means operable to impart an automatic return movement to said pin setting means to an operative relation to a selected one of said groups of pins.

36. In a machine of the character described having a variable printer, stop mechanism for said printer comprising a mounting structure having a plurality of guideways extending therethrough, a plurality of stop pins mounted for endwise sliding movement in said guideways, means for limiting such sliding movement comprising a stop plate having an elongated slot therein, means mounting said stop plate on one face of said mounting structure with one bordering edge of said slot registered with one edge of the adjacent open ends of a plurality of said guideways, said mounting means being adapted to permit limited sliding movement of said stop plate parallel to said slot from an initial position to a final position, the other edge of said slot being of serrated form with projecting portions adapted in said final position of said stop plate to project partially across said open ends of said plurality of guideways and in said initial position to provide clearance for endwise insertion of said stop pins into said guideways, and abutment means formed on each of said stop pins adapted in said final position of said stop plate to engage opposite sides of said stop plate to limit endwise sliding movement of said pins.

37. In a machine of the character described having a variable printer, stop mechanism for said printer comprising a mounting structure having a plurality of guideways extending therethrough, a plurality of stop pins mounted for endwise sliding movement in said guideways, means for limiting such sliding movement comprising a stop plate having an elongated slot therein, means mounting said stop plate on one face of said mounting structure with one face of said stop plate against said face of said mounting structure and with one bordering edge of said slot positioned adjacent one edge of the adjacent open ends of a plurality of said guideways, said mounting means being adapted to permit limited sliding movement of said stop plate along said mounting structure parallel to said slot from an initial position to a final position, the other edge of said slot being of serrated form with projecting portions adapted in said final position of said stop plate to project partially across said open ends of said plurality of guideways and in said initial position to provide clearance between said projecting portions for endwise insertion of said stop pins into said guideways, and abutment means formed on each of said stop pins adapted in said final position of said stop plate to engage said face of said stop plate to limit endwise sliding movement of said pins in one direction.

38. In a machine for forming and verifying control devices to provide codified numerical control data thereon representing the several digits of a plural order control number, said machine comprising punching mechanism, manually operable punch control means for operating said punching mechanism through a punching cycle and operable in each cycle to cause said punching mechanism to form a coded representation of one digit of the desired control number on a control device, means for verifying the coded representations of the desired control number which have thus been formed order by order upon the control device, said last-mentioned means including a multiple order variable printer having set-up means operatively associated with said manually operable punch control means to be set up by said manually operable punch control means order by order as said manual control means are operated, to thereby set up said printer to print a verifying number corresponding with the coded representations formed in the control device by said punching mechanism, and means for operating said printer through a printing cycle after the completion of all of the punching operations to print all of the digits of the verifying number on the control device in a single printing cycle in which the digits of the printed verifying number are printed in predetermined columnar positions on the control device indicative of the columnar positions in which the corresponding coded representations of the several digits were formed by the punching mechanism.

GASPAR P. BENES.